United States Patent [19]
Nakata et al.

[11] Patent Number: 5,732,195
[45] Date of Patent: Mar. 24, 1998

[54] PROFILE CONTROL SYSTEM FOR ROBOTS

[75] Inventors: Yasuyuki Nakata, Sagamihara; Akihiko Yabuki, Isehara; Yutaka Yoshida; Katsushi Nishimoto, both of Kawasaki, all of Japan

[73] Assignee: Fujitsu Limited, Kawasaki, Japan

[21] Appl. No.: 693,960

[22] Filed: Aug. 7, 1996

Related U.S. Application Data

[62] Division of Ser. No. 374,997, Jan. 18, 1995, Pat. No. 5,590,244, which is a continuation of Ser. No. 943,158, Sep. 10, 1992, abandoned, which is a continuation of Ser. No. 524,487, May 17, 1990, abandoned.

[30] Foreign Application Priority Data

| May 17, 1989 | [JP] | Japan | 1-123275 |
| Jul. 14, 1989 | [JP] | Japan | 1-182071 |
| Sep. 20, 1989 | [JP] | Japan | 1-241897 |
| Dec. 14, 1989 | [JP] | Japan | 1-322652 |
| Dec. 14, 1989 | [JP] | Japan | 1-322654 |

[51] Int. Cl.$^6$ .................. G06F 15/50; G06F 15/46; G05B 19/42
[52] U.S. Cl. .................. 395/95; 395/86; 395/87; 395/89; 395/96; 318/568.17
[58] Field of Search .................. 395/95, 86, 87, 395/89, 96; 318/568.17

[56] References Cited

U.S. PATENT DOCUMENTS

| 4,485,453 | 11/1984 | Taylor | 364/191 |
| 4,529,921 | 7/1985 | Moribe | 318/568.15 |
| 4,580,229 | 4/1986 | Koyama et al. | 395/95 |
| 4,621,332 | 11/1986 | Sugimoto et al. | 395/95 |
| 4,672,562 | 6/1987 | Egli et al. | 364/525 |
| 4,672,564 | 6/1987 | Egli et al. | 364/525 |
| 4,791,588 | 12/1988 | Onda et al. | 395/95 |
| 4,808,063 | 2/1989 | Haley | 395/95 |
| 4,819,184 | 4/1989 | Jönsson | 395/96 |
| 4,826,392 | 5/1989 | Hayati | 395/95 |
| 4,835,710 | 5/1989 | Schnelle et al. | 395/97 |
| 4,853,603 | 8/1989 | Onoue et al. | 395/97 |
| 4,860,215 | 8/1989 | Seraji | 395/95 |
| 4,868,474 | 9/1989 | Lancraft et al. | 318/573 |
| 4,895,788 | 1/1990 | Stelzer | 395/89 |
| 4,967,127 | 10/1990 | Ishiguru et al. | 318/578 |
| 4,974,210 | 11/1990 | Lee | 395/95 |
| 4,987,356 | 1/1991 | Yamada et al. | 318/578 |
| 5,006,999 | 4/1991 | Kuno et al. | 395/88 |
| 5,019,968 | 5/1991 | Wang et al. | 395/800 |
| 5,023,533 | 6/1991 | Ishikawa et al. | 395/95 |
| 5,023,808 | 6/1991 | Seraji | 395/95 |
| 5,056,038 | 10/1991 | Kuno et al. | 395/95 |
| 5,129,044 | 7/1992 | Kashiwagi et al. | 395/95 |

FOREIGN PATENT DOCUMENTS

0240048A2 10/1987 European Pat. Off. .

OTHER PUBLICATIONS

Whitney, D.E., "Historical Perspective and State of the Art in Robot Force Control", International Journal of Robotics Research, vol. 6, No. 1, 1987, pp. 3–14.

Yoshikawa et al, "Dynamic Hybrid Position/Force Control of Robot Manipulators–Controller Design and Experiment", Robotics and Automation Conference, IEEE 1987 Procs., vol. 3, pp. 2005–2010.

Miyazaki et al, "Position and Force Control of Robot in Task Related Cartesian Corodinate", Industrial Electronics Control and Instrumentation, IEEE 1984 Procs., vol. 1, pp. 416–420.

*Primary Examiner*—George B. Davis
*Attorney, Agent, or Firm*—Staas & Halsey

[57] ABSTRACT

A robot profile control system permits a force control robot to perform a profiling operation on a surface of a work object having curved surfaces of unknown contours. The robot profile control system resets a profile coordinate system for the profile operation on the basis of force acting between the end of the robot and the work object. The force is detected by a force detecting section of the robot profile control system.

54 Claims, 52 Drawing Sheets

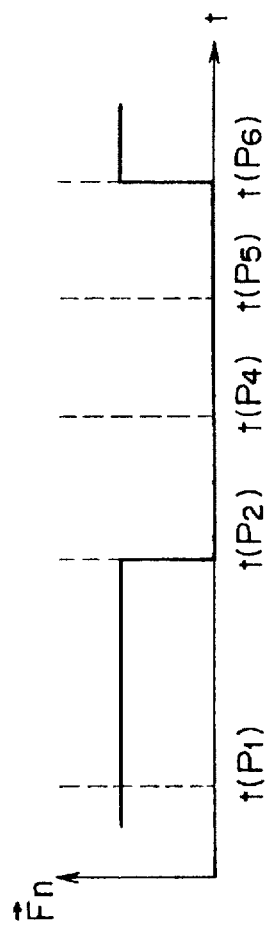
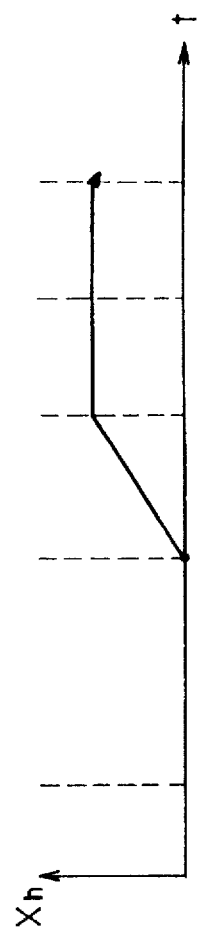
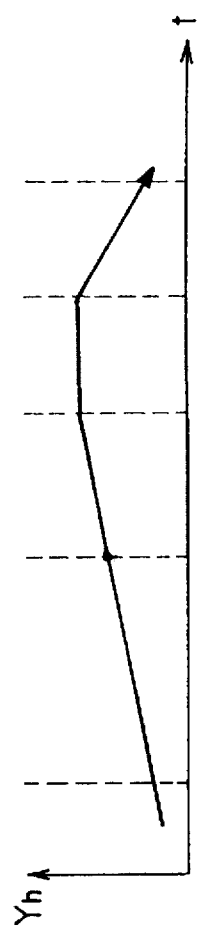
Fig.36A
Fig.36B
Fig.36C

PROFILE CONTROL SYSTEM FOR ROBOTS

This application is a divisional of application Ser. No. 08/374,997, filed Jan. 18, 1995, U.S. Pat. No. 5,590,244 which is a continuation of application Ser. No. 07/943,158, filed Sep. 10, 1992, now abandoned which is a continuation of application Ser. No. 07/524,487, filed May 17, 1990, now abandoned.

BACKGROUND OF THE INVENTION

The present invention relates to a robot control system and, more specifically, to a profile control system for a robot which permits the robot to perform a profiling operation along a surface of a work object having curved surfaces of unknown contours on the basis of force acting between the end of the robot and the work object that is sensed by, for example, an inner force sensor while resetting a coordinate system for the profiling operation.

With a force control robot system, in order to perform a profiling operation to move the end of a robot from a work start point to an end point while pressing it on a surface of a work object, the direction n in which the end of the robot is pressed which coincides with the direction of the normal line of the work object at a point of contact between the end of the robot and the work object and a profile coordinate system Ow −Xw, Yw, Zw defined by the direction o in which the robot moves while performing the profiling operation need to be entered into a robot controller.

FIG. 1 is a diagram illustrating the profile coordinate system. As shown, reference coordinate axes Xo, Yo and Zo are taken with, for example, the center O of the bottom surface of the robot body at the origin 1 of a reference coordinate system. Provided are joints 2 and 3 on coordinate axis Zo, a manipulator 5 having an arm between joints 3 and 4, and an inner force sensor 8 between a joint 6 in front of joint 4 and a hand 7. The hand 7 is shown in contact with a work object 9. The point of contact between hand 7 and work object 9, the direction of the inward normal line of the work object at the point of contact between the hand and the work object and the direction of movement of the hand are used as the origin Ow, the coordinate axes Xw and Yw of the profile coordinate system, respectively. The direction normal to the coordinate axes Xw and Yw is used as the coordinate axis Zw. Unit vectors in the directions of the coordinate axes Xw, Yw and Zw are given by $\vec{n}$, $\vec{o}$ and $\vec{a}$, respectively.

As described above, the profile coordinate system is determined by the position and attitude of the tip (the hand) of the robot relative to the work object. Unit vector $\vec{n}$ represents the direction in which the robot is pressed on the work object in applying force to it, and unit vectors $\vec{o}$ and $\vec{n}$ representing the directions of movement of the robot's tip are normal to each other. The other unit vector $\vec{a}$ is given as an outer product of $\vec{n}$ and $\vec{o}$ as follows.

$$\vec{a} = \vec{n} \times \vec{o}$$

Here the three unit vectors $\vec{n}$, $\vec{o}$ and $\vec{a}$ may be represented in the reference coordinate system O −Xo, Yo, Zo and is generally given by $$\vec{n} = (n_x\ n_y\ n_z)^T \quad \vec{o} = (o_x\ o_y\ o_z)^T$$

$$\vec{a} = \begin{pmatrix} n_y o_z - n_z o_y \\ n_z o_x - n_x o_z \\ n_x o_y - n_y o_x \end{pmatrix} = (a_x\ a_y\ a_z)^T$$

where T represents a transposed matrix.

FIG. 2 illustrates a relation between a work object with curved surfaces and the profile coordinate system. It is assumed that the robot performs a profiling operation on a side surface of work object 9 and the origin of the profile coordinate system is first placed at point P1. At this time the vector $\vec{n}$ is normal to the side surface of work object 9 and the vectors $\vec{o}$ and $\vec{a}$ are on the tangent plane. When the robot performs a profiling operation to move in the direction of vector $\vec{o}$, the direction $\vec{n}$ of the normal line on the surface will not coincide with the direction in which the robot is pressed on the work object. Then the force applied to the work object by the robot will deviate from a preset value. In order to perform the profiling operation with an accurate force, therefore, it is required to change the profile coordinate system set at point p1 to a profile coordinate system for a point P2.

As described above, in order to perform the profile control by a force control robot, it is required to enter profile coordinate systems into a robot controller. In prior art systems the profile coordinate systems have usually been set by teaching the robot by an operator. In such a case, when a work object has curved surfaces as shown in FIG. 2, the teaching of the profile coordinate systems to the robot will inevitably become troublesome.

Another method of entering working coordinate systems into the robot controller involves the prediction of the direction of movement of the robot by the use of information on the current position of the robot. In this case, since the vectors in the direction of movement of the robot will be represented by estimated values, a deviation will be produced between an estimated position and a position to which the robot is actually moved.

SUMMARY OF THE INVENTION

It is a first object of the present invention to provide a robot profile control system which permits a robot to perform a profiling operation while applying a predetermined constant force to a work object having curved surfaces of unknown contours and automatically generating profile coordinate systems utilizing detected force by an inner force sensor mounted, for example, between a wrist and a hand of the robot.

It is a second object of the present invention to provide a robot profile control system which permits a robot to return to its original trajectory quickly and to perform a profiling operation again on a surface of a work object having discontinuous surfaces of any contours when its hand separates from the surface of the object.

It is a third object of the present invention to provide a robot profile control system which permits position error correction to keep force applied to a work object constant by generating a force velocity command calculated from an estimated position error of a robot's hand at a point of contact between the robot and the work object at the time of setting of the next profile coordinate system which is obtained by estimating from the curvature of a surface of the object when the robot performs a profiling operation on the work object having surfaces of unknown contours.

It is a fourth object of the present invention to provide a robot profile control system which permits a robot to perform a profiling operation while applying a constant force to a side surface of an unknown work object rectangular in shape without teaching from an operator.

It is a fifth object of the present invention to provide a robot profile control system which permits a robot to perform a profiling operation while applying a constant force to a work object having a surface which is in the process of being profiled and a surface for the next profile operation which makesan acute angle therebetween.

A feature of the present invention resides in a profile control system for a force control robot system including a robot, a force detecting section for detecting a force acting between the end of said robot and a work object and a position detecting section for detecting the position of the end of said robot and permitting said robot to perform an profiling operation on a surface of said work object, comprising normal vector calculating means responsive to an output of said force detecting section for calculating a normal vector at a point of contact between the end of said robot and said work object, movement calculating means responsive to outputs of said normal vector calculating means and a vector in the direction of movement of the end of said robot at an end point or a start point of an profile operation provided from an operator for calculating a vector in the direction of movement of the end of said robot, control command generating means responsive to outputs of said movement calculating means and said normal vector calculating means for generating control commands to said robot, and force and position control means responsive to outputs of said control command generating section, said force detecting section and said position detecting section for controlling the force of said robot and the position of the end of said robot, thereby permitting said robot to perform an profiling operation on a surface of said work object having an unknown contour while resetting a profile coordinate system defined by said normal vector and said vector in direction of movement.

BRIEF DESCRIPTION OF THE DRAWINGS

FIGS. 36A, 36B and 36C illustrate time responses of the force and position in the profile operation in the fifth embodiment;

DETAILED DESCRIPTION OF THE PREFERRED EMBODIMENTS

Figure 3:
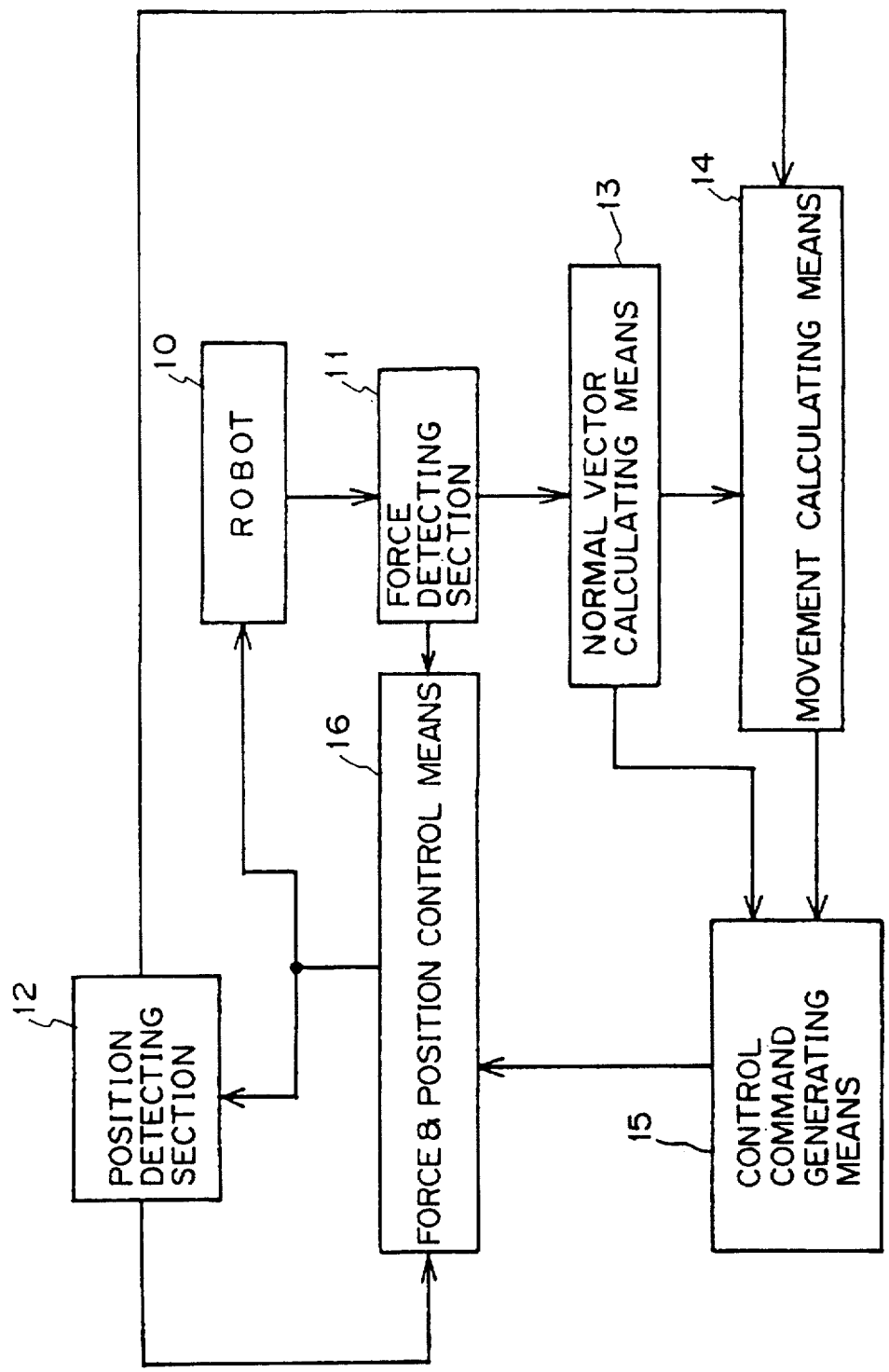
FIG. 3 is a basic block diagram of a robot profile control system.

FIG. 3 is a basic block diagram of a profile control system for a force control robot which includes a force detector 11, e.g., an inner force sensor, for detecting the force applied to a work object by a robot 10 and a position detector 12 for detecting the position of the robot, e.g., the position of its hand by use of an encoder mounted on a motor for driving a manipulator of the robot.

In FIG. 3, a normal vector calculating means 13 calculates a normal vector at a point of contact between the end (hand) of the robot and the work object from an output of force detector 11. Movement calculating means 14 calculates a vector in direction of movement of robot 10 from an output of normal vector calculating means 13, the current position of the robot's end output from position detector 12 and, for example, the end position of a profile work which has been entered in advance by an operator.

A control command generating means 15 is responsive to the outputs of normal vector calculating means 13 and movement calculating means 14 to provide desired values of the force and position of robot 10 and a feedback gain serving as a control parameter. Normal vector calculating means 13, movement calculating means 14 and control command generating means 15 may be implemented by a computer.

A force and position control means 16 is responsive to a deviation of a force detect output of force detector 11 from a force desired value output from control command generating means 15 and a deviation of a robot's end position from position detector 12 from a position desired value output from control command generating means 12 to control the force and position of robot 10.

Figure 4:
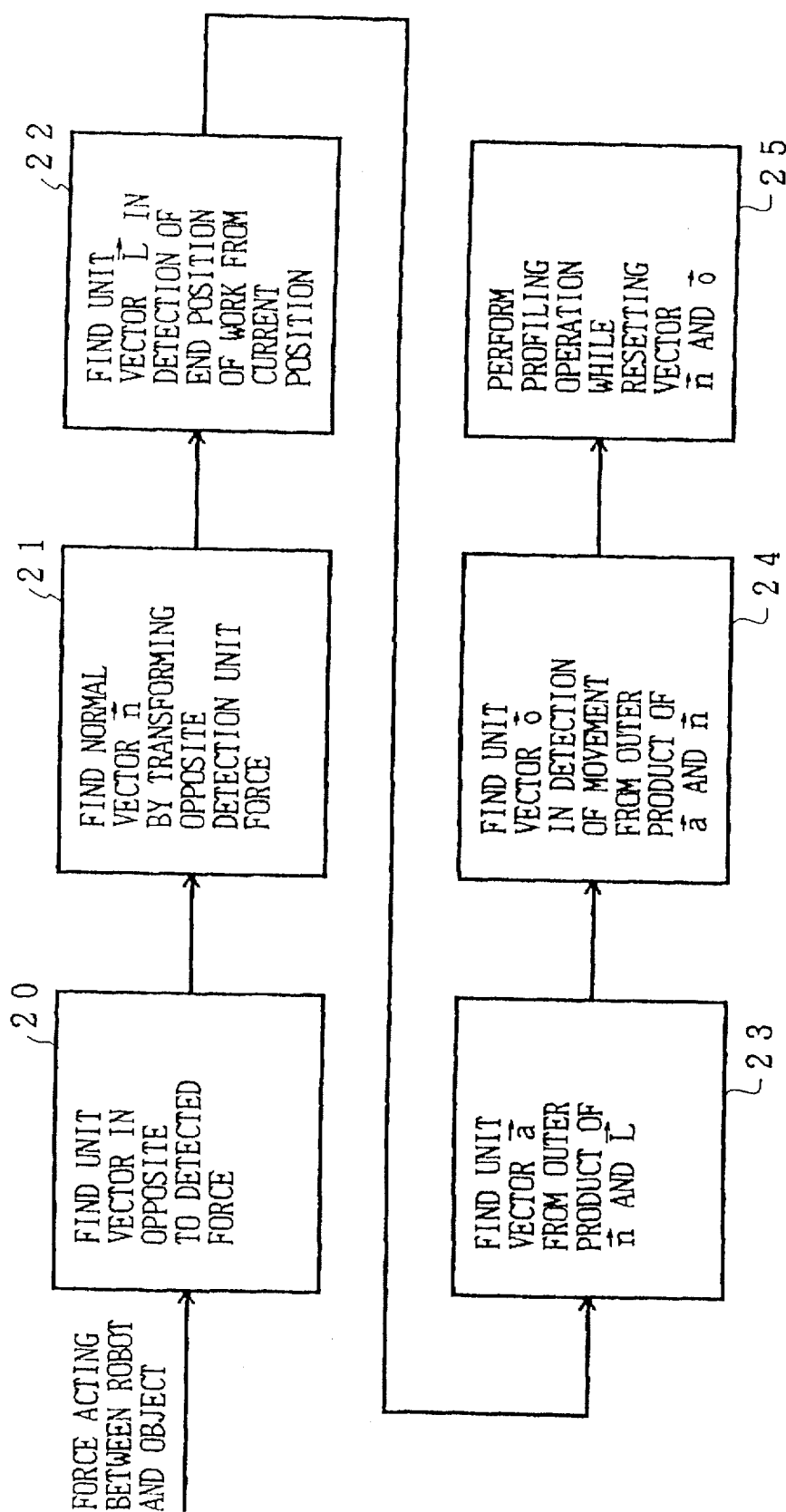
FIG. 4 is a functional block diagram illustrating a robot profile control method.

FIG. 4 is a functional block diagram illustrating a profile control method of a force control robot. From the force detected between the robot and the work object a unit vector in the opposite direction to the force is first obtained in block 20. The opposite direction unit vector is transformed from a profile coordinate system to a reference coordinate system to obtain a normal vector n at the point of contact between the robot and the work object in block 21.

In block 22 a unit vector $\vec{L}$ which points in the direction of the end position of a profile operation from the current position of the robot's end is obtained. From the outer product of the normal vector $\vec{n}$ and the unit vector $\vec{L}$ in the direction of the end position a unit vector $\vec{a}$ on the tangent plane is obtained in block 23 as a unit vector in the same direction as the outer product. From the outer product of $\vec{a}$ and $\vec{n}$ a unit vector $\vec{o}$ pointing in the direction of the outer product, that is, in the direction in which the robot's end moves is obtained in block 24. In block 25, assuming that the work object for the profile operation has surfaces of unknown contours, the normal vector $\vec{n}$ and the unit vector $\vec{o}$ which points in the direction in which the robot's end moves are reset at regular intervals to continue the profiling operation until its end position is reached.

Namely, in the present invention, the normal vector $\vec{n}$ is calculated by normal vector calculating means 13 by transforming the unit vector, which points in the opposite direction to the force acting between robot 10 and the work object detected by force detector 11, to the reference coordinate system. Next, the unit vector $\vec{a}$ on the tangent plane between the robot's end and the work object is obtained by movement calculating means 14 from the normal vector $\vec{n}$ and the unit vector $\vec{L}$ which points in the direction of the end position. Also, the unit vector $\vec{o}$ pointing in the direction in which the robot's end moves is obtained from $\vec{a}$ and $\vec{n}$. Using those vectors $\vec{n}$ and $\vec{o}$ the force and position control commands are entered into force and position control means 16 by control command generating means 15 as desired values for controlling the force and position of robot 10. Assuming that the surface of the work object is unknown, the normal vector $\vec{n}$ and the unit vector $\vec{o}$ which points in the direction in which the robot's end moves are reset at regular intervals, thereby performing the profiling operation.

As can be seen, according to the present invention, a profiling operation for a work object having curved surfaces can be performed automatically.

A first embodiment of the present invention will be described first, which corresponds to a first object of the present invention, that is, a robot profile control system which permits a robot to perform a profiling operation on a work object having curved surfaces of unknown contours while automatically generating profile coordinate systems by use of detected force by an inner force sensor.

Figure 5:
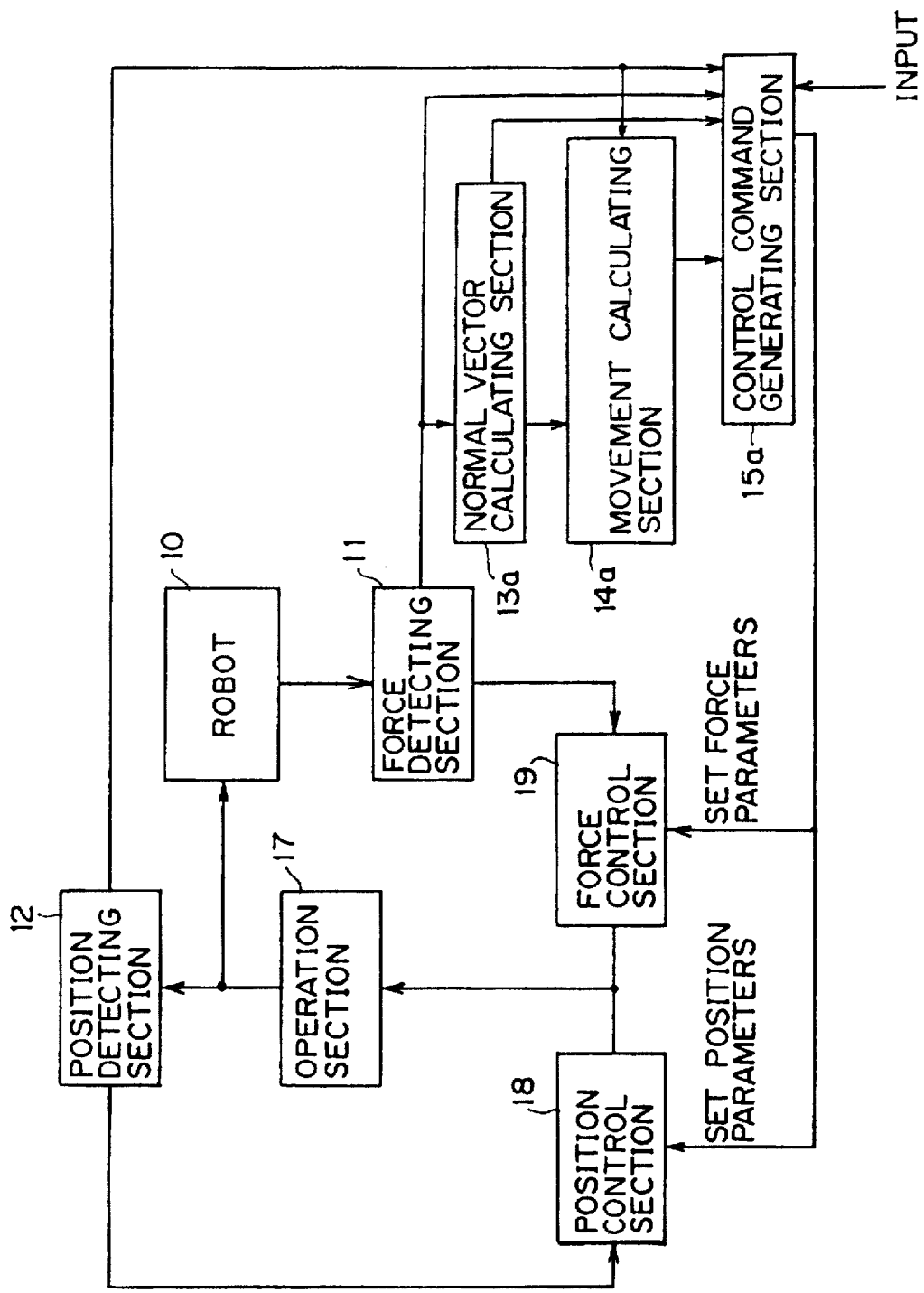
FIG. 5 is a basic block diagram of a first embodiment of the present invention.

FIG. 5 is a basic block diagram of the first embodiment of the present invention. In comparison with FIG. 3, FIG. 5 is the same except that normal vector calculating section 13a, movement calculating section 14a and control command generating section 15a correspond to normal vector calculating means 13, movement calculating means 14 and control command generating means 15, respectively, and force and position control means 16 is divided into an operation section 17, a position control section 18 and a force control section 19.

Figure 6:
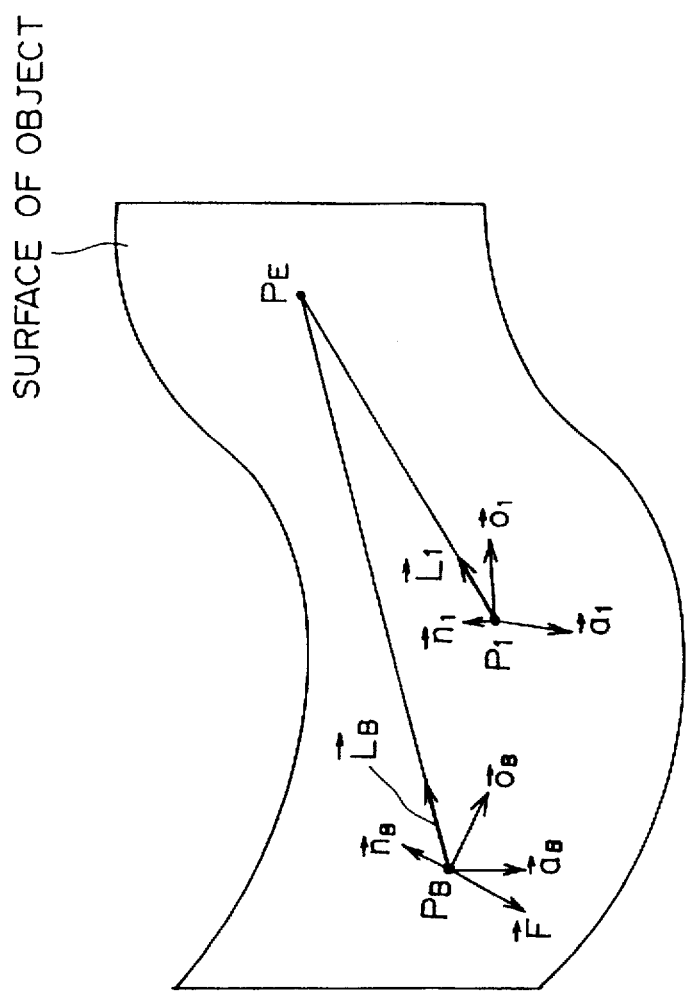
FIG. 6 is a diagram illustrating a method of setting a profile coordinate system in the first embodiment.

FIG. 6 illustrates a method of setting profile coordinate systems according to the present invention. It is assumed that a profiling operation is performed from a starting point Pb to an end point Pe on a surface of a work object as shown. A description will first be given of the method of calculating the profile coordinate system at the start position of the profile operation, that is, the starting point Pb. In the present invention, when the starting and end points of a profiling operation is given, control is performed such that constant force is applied to the work object, and a vector $\vec{o}$ in direction of movement of the robot's end always lies on the plane formed by a straight line connecting a point of contact between the robot and the work object with the end point of the profile operation and a normal vector $\vec{n}$ at the point of contact.

Figure 7A:
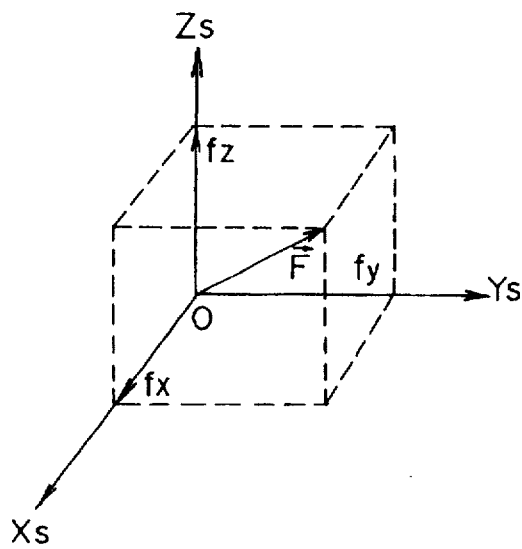
FIGS. 7A and 7B are diagrams illustrating method of calculating reaction force and set force Fr at a point of contact between the robot and the work object.
Figure 7B:
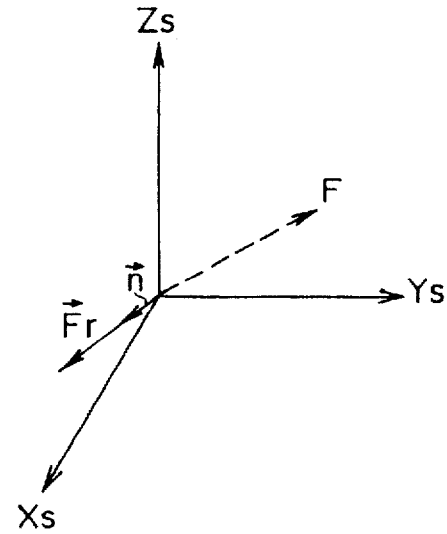

The normal vector $\vec{n}_B$ at the starting point is found from reaction force $\vec{F}$ that the robot's hand receives from the work object at the starting point. FIGS. 7A and 7B illustrates a relation between the reaction force F that the robot's hand receives from the work object and an inner force sensor coordinate system Os −Xs, Ys, Zs. The inner force sensor detects components fx, fy and fz in the directions of the sensor coordinate axes Xs, Ys and Zs. Thus, the reaction force $^s\vec{F}$ will be given in vector representation as follows.

$${}^s\vec{F} = (f_x, f_y, f_z)^T \tag{1}$$

Here s indicates that the reaction force F is described in the inner force sensor coordinate system Os –Xs, Ys and Zs. A description of torque components detected by the inner force sensor is omitted herein.

The normal vector ${}^s\vec{n}_B$ represented in the inner force sensor coordinate system is a vector opposite in direction to ${}^s\vec{F}$ and given in component representation as follows.

$${}^s\vec{n}_B = \frac{-{}^s\vec{F}}{|{}^s\vec{F}|} = \frac{-1}{|{}^s\vec{F}|}(f_x, f_y, f_z)^T \tag{2}$$

The magnitude of vector F is given by $$|{}^s\vec{F}| = (f_x^2 + f_y^2 + f_z^2)^{1/2} \tag{3}$$

The representation of the normal vector ${}^s\vec{n}_B$, which is represented in the inner force coordinate system, in a reference coordinate system needs a coordinate transformation matrix for transformation from the inner force sensor coordinate system to the reference coordinate system. It is assumed that the component representation in the reference coordinate system of unit vectors in the directions of the coordinate axes Xs, Ys and Zs in the sensor coordinate system is given by $${}^o\vec{n}_s = (n_{sx}, n_{sy}, n_{sz})^T$$

$${}^o\vec{o}_s = (o_{sx}, o_{sy}, o_{sz})^T$$

$${}^o\vec{a}_s = (a_{sx}, a_{sy}, a_{sz})^T \tag{4}$$

Note that, for example, the superscript o of the unit vector ${}^o\vec{n}_s$ in the direction of the coordinate axis Xs in the sensor coordinate system indicates that the unit vector is described in the reference coordinate system. The transformation matrix ${}^oA_s$ for transformation from the sensor coordinate system to the reference coordinate system is given by $${}^oA_s = ({}^o\vec{n}_s, {}^o\vec{o}_s, {}^o\vec{a}_s) \tag{5}$$

By the use of the transformation matrix the normal vector ${}^o\vec{n}_B$ in reference coordinate system representation will be given by $${}^o\vec{n}_B = {}^oA_s \cdot {}^s\vec{n}_B \tag{6}$$

Next, the calculation of a vector in direction of movement of the robot's hand at the starting point PB using the above normal vector ${}^o\vec{n}_B$ will be described. The vector in direction of movement ${}^o\vec{o}_B$ is a vector that is normal to the normal vector ${}^o\vec{n}_B$ and exists on the plane made by a straight line connecting the starting point PB with the end point PE and the normal vector ${}^o\vec{n}_B$. A unit vector $\vec{L}_B$ in the direction of the straight line connecting the starting point Pb with the end point PE is given, using position vectors ${}^o\vec{P}_B$ and ${}^o\vec{P}_E$ of the starting and end points in the reference coordinate system, by $${}^o\vec{L}_B = ({}^o\vec{P}_E - {}^o\vec{P}_B)/|{}^o\vec{P}_E - {}^o\vec{P}_B| \tag{7}$$

At this time ${}^o\vec{a}_B$, which is on the tangent plane contacting a surface of the work object at the starting point PB and one of the unit vectors in the directions of coordinate axes of the profile coordinate system, is given, using ${}^o\vec{n}_B$ and ${}^o\vec{L}_B$, by $${}^o\vec{a}_B = ({}^o\vec{n}_B \times {}^o\vec{L}_B)/|{}^o\vec{n}_B \times {}^o\vec{L}_B| \tag{8}$$

Moreover, ${}^o\vec{O}_B$, the vector in direction of movement of the robot's hand, is also given, as a vector on the tangent plane, by $${}^o\vec{o}_B = {}^o\vec{a}_B \times {}^o\vec{n}_B \tag{9}$$

In the profiling operation of the force control robot, control commands for force and position, namely, a desired force and a desired position, output from control command generating section 15a of FIG. 5 are applied to force control section 19 and position control section 18. The generation of the desired force $\vec{F}_r$ will be described first. To generate a force Fr (scalar quantity) set for the work object at the starting point Ps of the profiling operation, it is only required to generate a force which has a magnitude of Fr and a direction of nB as shown in FIG. 7B. Thus, the set force vector ${}^o\vec{F}_r$ is given, using equation (8), by $${}^o\vec{F}_r = F_r \cdot {}^o\vec{n}_B \tag{10}$$

Figure 2:
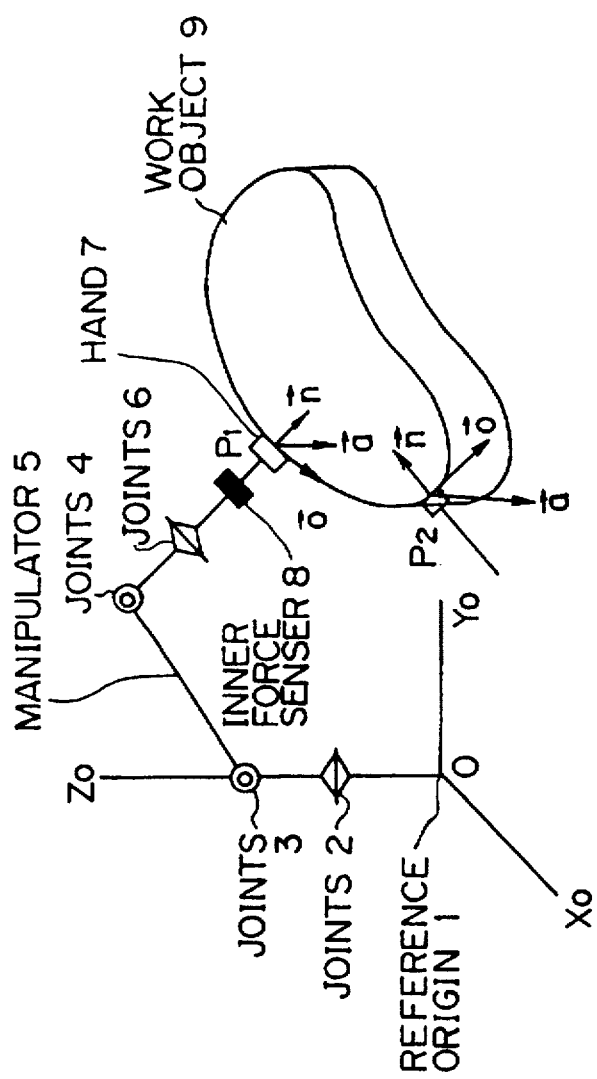
FIG. 2 is a diagram illustrating a relation between a work object having curved surfaces and a profile coordinate system.

Next, a desired position to which the robot is to move, which is given at the starting point PB, is given as a command for a position relative to the starting point PB. The direction of movement from the starting point PB is given by the vector ${}^o\vec{O}_B$ in direction of movement in equation (9). The relative position command is given, using equation (8), by $${}^o\vec{X}_r = \alpha \cdot {}^o\vec{o}_B \tag{11}$$

where α is an appropriate constant corresponding to a distance to be corrected in the profile coordinate system as described in connection with FIG. 2. The correction of the profile coordinate system may be made:

(1) when a fixed time elapses;
(2) when the reaction force of the work object is deviated from the set force to some extent or more; or
(3) when the robot moves a fixed distance.

In the present embodiment, it is assumed that the correction of the profile coordinate system is made under the condition (1), namely, when a fixed time elapses. Under the conditions (2) and (3) as well, the principle of the present invention remains unchanged as under the condition (1).

In FIG. 6, the setting of a normal vector $\vec{n}$, a vector $\vec{o}$ in direction of movement, a desired force $\vec{F}_r$ and a desired position $\vec{X}$ at a midway point, e.g., point Pi in the profiling operation is made in exactly the same way as at the starting point PB. That is, the normal vector $\vec{n}i$ and the vector $\vec{o}i$ in direction of movement are found using equations (1) through (9) and the set force vector and the relative position command are found using equations (10) and (11).

The calculation of the normal vector is performed, using $\vec{^{s}F}i$ as the reaction force at point Pi and the coordinate transformation matrix oAsi for transformation from the sensor coordinate system to the reference coordinate system, such that $$\vec{n_i} = \frac{-\vec{^{s}F_i}}{|\vec{^{s}F_i}|} = \frac{-1}{\sqrt{f_{xi}^2 + f_{yi}^2 + f_{zi}^2}} (f_{xi} f_{yi} f_{zi})^T \quad (12)$$

$$^{o}\vec{n}_i = {^{o}A_{si}} \vec{n}_i \quad (13)$$

Figure 8:
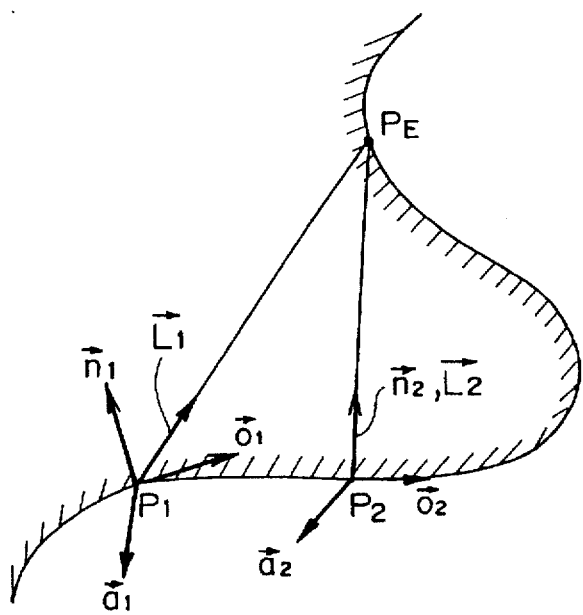
FIG. 8 is a diagram illustrating a method of setting a vector $\vec{a}$ when vectors $\vec{n}$ and $\vec{L}$ coincide with each other.

In the present embodiment, as described above, the vector $\vec{a}$ on the tangent plane is found from the normal vector $\vec{n}$ at a point of contact between the robot's hand and the work object and the unit vector $\vec{L}$ in the direction of the end point of the profile work seen from the point of contact. In a special case the vectors $\vec{n}$ and $\vec{L}$ may correspond to each other. FIG. 8 shows such a case. In the case of FIG. 8, the normal vector $\vec{n}2$ at the point P2 of contact and the unit vector $\vec{L}2$ in the direction of the end point PE correspond with each other. In such a case, the outer product of vectors $\vec{n}2$ and $\vec{L}2$ cannot be found. Thus, the vector $\vec{a}2$ on the tangent plane cannot be found by the use of equation (8). It is therefore decided to find the vector $\vec{a}2$ on the tangent plane, using the vector $^{o}\vec{o}1$ in direction of movement of the robot's hand at the previous point P1 of contact near to the contact point P2, as follows:

$$^{o}\vec{a}_2 = (^{o}\vec{n}_2 \times ^{o}\vec{o}_1)/|^{o}\vec{n}_2 \times ^{o}\vec{o}_1| \quad (14)$$

It is assumed here that the point P1 is a set point of a profile coordinate system immediately before the correction of the profile coordinate system at the point P2. The vector $^{o}\vec{o}2$ in direction of movement is given, as the outer product of two unit vectors $^{o}\vec{a}2$ and $^{o}\vec{n}2$, by $$^{o}\vec{o}_2 = ^{o}\vec{a}_2 \times ^{o}\vec{n}_2 \quad (15)$$

When $^{o}\vec{n}2 = ^{o}\vec{o}1$, a vector on the tangent plane cannot be found using equation (14). Such a case, which will arise from a collision of the robot with the work object, will not be taken into consideration in the present invention.

Figure 9:
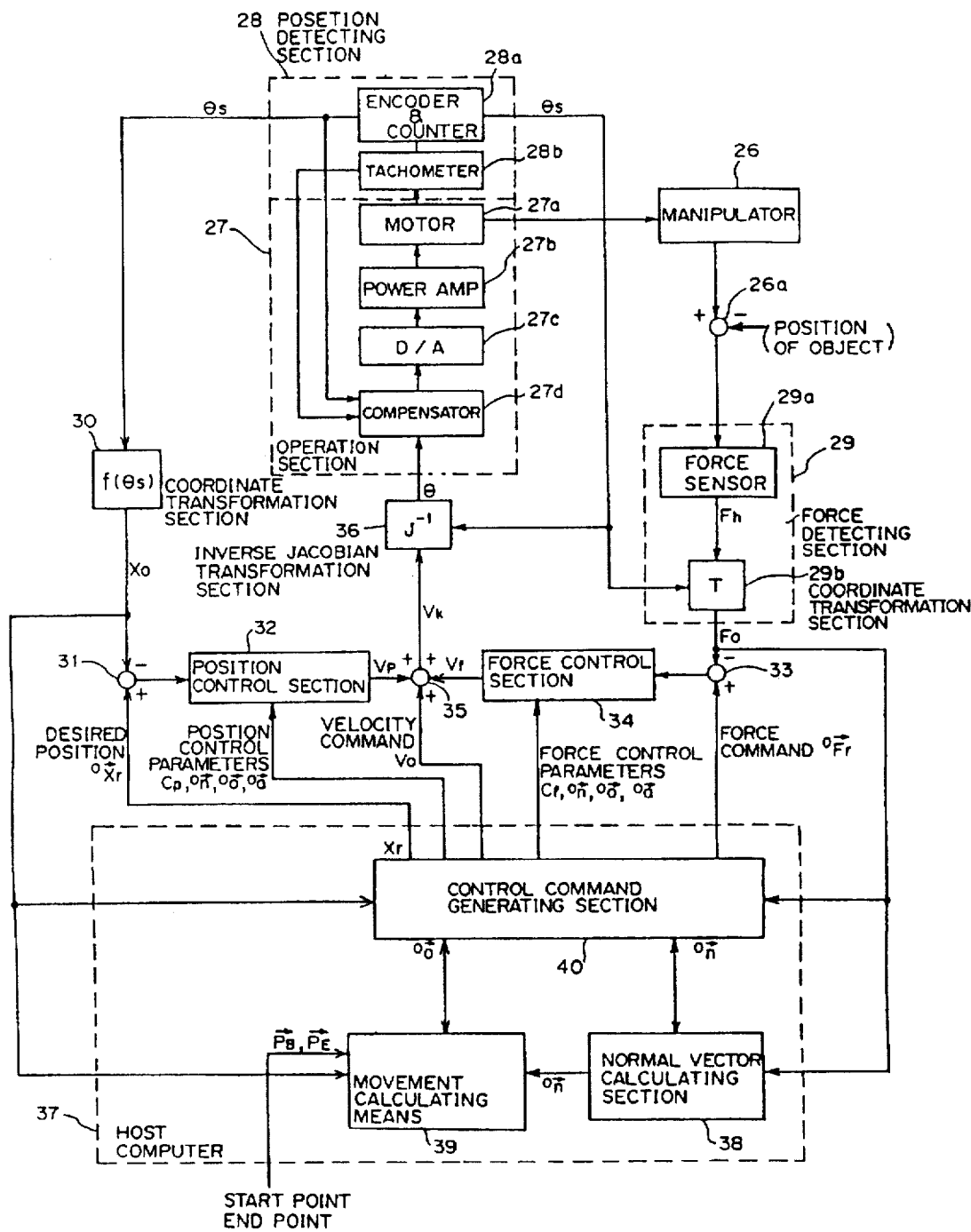
FIG. 9 is a block diagram of a robot profile control apparatus according to the first embodiment.

FIG. 9 is a block diagram of a robot profile control apparatus in the first embodiment of the present invention. The control apparatus comprises a manipulator 26 of the robot, an operation section 27 of the manipulator, a position detecting section 28 of the manipulator, a force detecting section 29 of the manipulator, a coordinate transforming section 30 for transforming an angle $\theta_s$ of a drive motor of manipulator 26, which is an output of position detecting section 28, to the position Xo of the end of the robot's hand, a deviation section 31 for obtaining a difference between a desired position supplied from a host computer 37 and an output of coordinate transforming section 30, a position control section 32 for providing a velocity command signal Vp specifying a velocity in the direction of position control using an output of deviation section 31 and a position control parameter from host computer 37, a deviation section 33 for obtaining a difference between a force command supplied from host computer 37 and an output Fo of force detector 29, a force control section 34 for providing a velocity command Vf specifying a velocity in the direction of force control using an output of deviation section 33 and a force control parameter from host computer 37, an adder section 35 for computing the sum of an output Vp of position control section 32, an output Vf of force control section 34 and a speed command Vo from host computer 37, and an inverse Jacobi transformation section 36 for transforming an output Vk of adder section 35 to a rotating speed $\dot{\theta}$ of each joint of the manipulator. The inverse Jacobian matrix J–1 refers to an inverse matrix of a Jacobian matrix J which is defined by the structure of each joint in an equation relating a small displacement (velocity V) of the robot's hand and a small-angle displacement (angular velocity $\dot{\theta}$) with respect to a little time, which is given by $$V = J\dot{\theta} \quad (16)$$

Deviation section 26a on the output side of manipulator 26 is adapted to apply a displacement to inner force sensor 29a, for example, a strain gauge. That is, the instant the end of the robot's hand of manipulator 26 contacts the work object, no displacement is applied to sensor 29a so that its output is 0. When the end of the robot's hand is further pressed against the work object, a difference, $\Delta XE = X_a - XE$, is produced between the position $X_a$ of the hand's end (no deformation of the sensor is involved) which is held in the controller and the position XE of the work object. Consequently a reaction force Fh proportional to the difference will be output form sensor 29a.

In FIG. 9, operation section 27 comprises a servo motor for driving manipulator 26, a power amplifier 27b, a D/A converter 27c and a compensator 27d. Position detecting section 28 comprises an encoder and counter 28a and a tachometer 28b. In addition, force detecting section 29 comprises an inner force sensor 29a and a coordinate transforming section 29b for transforming an output of sensor 29a represented in the sensor coordinate system to the reference coordinate representation. Encoder and counter 28a and tachometer 28b in position detecting section 28 provide signals for compensatory calculation to compensator 27 in operation section 27. The output of encoder and counter 28a, i.e., an angle $\theta_s$ of rotation of each joint, is entered into coordinate transforming section 29b of force detecting section 29 and inverse Jacobi transforming section 36.

Host computer 37 comprises a normal vector calculating section 38, a movement calculating section 39 and a control command generating section 40. Normal vector calculating section 38 calculates the normal vector $^{o}\vec{n}$ at a point of contact between the manipulator and the work object from an output of force detecting section 29, that is, a detected force Fo subjected to transformation to the reference coordinate system, the resultant normal vector being applied to movement calculating section 39 and control command generating section 40.

Movement calculating section 39 calculates the vector in direction of movement $^{o}\vec{o}$ using the current position Xo of the robot's hand from coordinate transforming section 30 and the normal vector $^{o}\vec{n}$ from normal vector calculating section 38 and applies it to control command generating section 40.

Control command generating section 40 transmits a desired position Xr, a force command Fr and position and force control parameters used in switching between profile coordinate systems to the robot controller using the outputs of normal vector calculating section 33 and movement calculating section 39, the detected force Fo output from force detecting section 29 and the hand current position Xo output from coordinate transforming section 30. In addition, control command generating section 40 generates status control signals to vector calculating sections 38 and 39.

The start and end points $\vec{PB}$ and $\vec{PE}$ of an profiling operation are specified by an operator to movement calculating section 39. $\vec{PB}$ and $\vec{PE}$ may be specified via control command generating section 40.

The control signals supplied from control command generating section 40 to the robot controller include desired position Xr applied to deviation section 31, unit vectors in the profile coordinate system and position feedback gain Cp to be described later which are applied to position control section 32 as the position control parameters, force command Fr applied to deviation section 33, unit vectors in the profile coordinate system and force feedback gain Cr to be described later which are applied to force control section 34 as the force control parameters and velocity command Vo applied to adder section 35 to move the hand's end at a high speed. Here the value of Vo may be provided directly from the operator or may be given by Vo=l/t using a distance l to move and a time t required to move the distance which are set by the operator.

The aim of entering the detected force Fo output from force detecting section 29 into control command generating section 40 is to detect the reaction force of the work object so as to decide whether or not the pressing of the robot against the work object has succeeded. Also, the aim of entering the hand current position Xo output from coordinate transforming section 30 into control command generating section 40 is to decide whether or not the end point of the profile work is reached.

Figure 10:
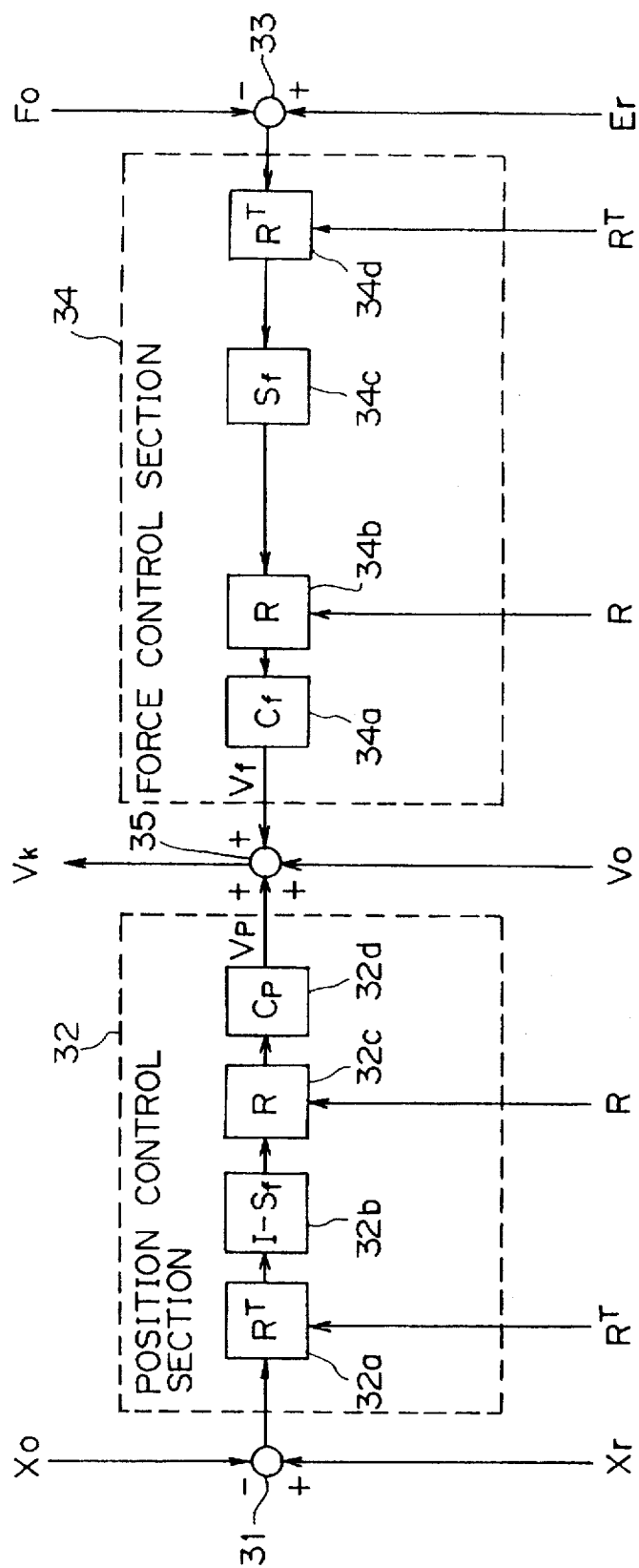
FIG. 10 is a detailed block diagram of the position controller and the force controller of FIG. 9.

FIG. 10 is a detailed block diagram of position control section 32 and force control section 34 of FIG. 9. Position control section 32 comprises a transposed orthogonal transformation matrix (RT) calculating section 32a for transforming an output of deviation section 31, that is, a position deviation represented in the reference coordinate system to the profile coordinate system, a selection matrix (I−Sf) calculating section 32b, an orthogonal matrix (R) calculating section 32c and a position feedback gain (Cp) calculating section 32d. Force control section 34 comprises a transposed orthogonal transformation matrix (RT) calculating section 34d for transforming a force deviation represented in the reference coordinate system output from deviation section 33 to the profile coordinate system, a selection matrix (Sf) calculating section 34c, an orthogonal matrix (R) calculating section 34b and a force feedback gain (Cf) calculating section 34a.

The orthogonal coordinate transformation matrix R used for coordinate transformation from the profile coordinate system (Xw, Yw, Zw) to the robot reference coordinate system (Xo, Yo, Zo) is given, using vectors $\vec{n}$, $\vec{o}$ and $\vec{a}$, by $$R = \begin{pmatrix} \vec{n} & \vec{o} & \vec{a} & | & o & o & o \\ \hline o & o & o & | & \vec{n} & \vec{o} & \vec{a} \end{pmatrix} \quad (17)$$

The matrix R is a matrix with 6 rows and 6 columns. The elements in the first to third columns, the first to third rows of the matrix correspond to the transformation of coordinates x, y and z on X, Y and Z axes, and the elements in the fourth to sixth columns, the fourth to sixth rows of the matrix correspond to the transformation of angles of rotation α, β and τ about X, Y and Z axes. The other elements of the matrix are all 0.

Figure 1:
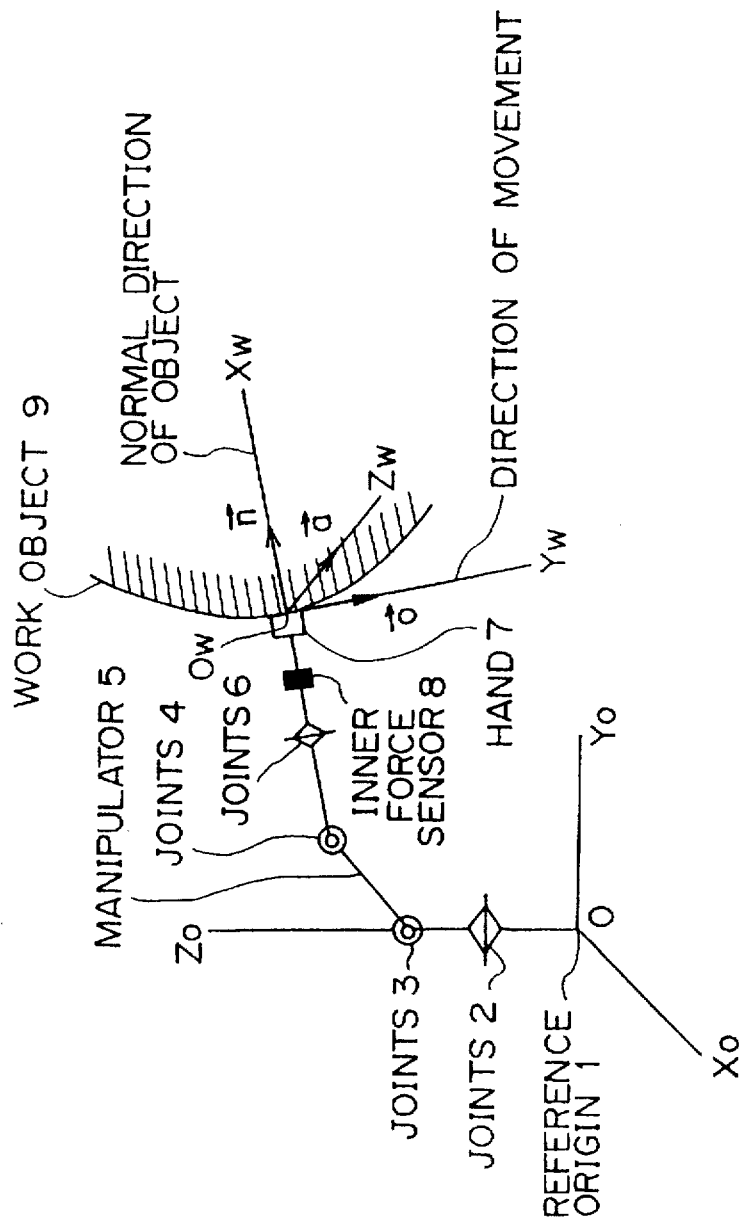
FIG. 1 is a diagram for use in explanation of a profile coordinate system.

If force is controlled in the direction of Xw and position is controlled in the directions of Yw and Zw in the profile coordinate system as shown in FIG. 1, then the selection matrix Sf of selection matrix calculating section 34c will be given by $$S_f = \begin{pmatrix} 1 & 0 & 0 & 0 & 0 & 0 \\ 0 & 0 & 0 & 0 & 0 & 0 \\ 0 & 0 & 0 & 0 & 0 & 0 \\ 0 & 0 & 0 & S & 0 & 0 \\ 0 & 0 & 0 & 0 & 0 & 0 \\ 0 & 0 & 0 & 0 & 0 & 0 \end{pmatrix} \quad (18)$$

If, in this case, torque is applied to an axis in the direction of press like thread fastening, the element S in the fourth row, the fourth column is 1, otherwise S=0. The selection matrix I−Sf used in selection matrix calculating section 32b of position control section 32 is obtained by subtracting Sf in equation (18) from a sixth order unit matrix I.

The position feedback gain Cp used in position feedback gain calculating section 32d of position control section 32 is generally given, in terms of the reference coordinate system, by $$C_p = \begin{pmatrix} C_{px} & 0 & 0 & 0 & 0 & 0 \\ 0 & C_{py} & 0 & 0 & 0 & 0 \\ 0 & 0 & C_{pz} & 0 & 0 & 0 \\ 0 & 0 & 0 & C_{p\alpha} & 0 & 0 \\ 0 & 0 & 0 & 0 & C_{p\beta} & 0 \\ 0 & 0 & 0 & 0 & 0 & C_{p\gamma} \end{pmatrix} \quad (19)$$

Also, the force feedback gain Cf used in force feedback gain calculating section 34a of force control section 34 is given, in terms of the reference coordinate system, by $$C_f = \begin{pmatrix} C_{fx} & 0 & 0 & 0 & 0 & 0 \\ 0 & C_{fy} & 0 & 0 & 0 & 0 \\ 0 & 0 & C_{fz} & 0 & 0 & 0 \\ 0 & 0 & 0 & C_{f\alpha} & 0 & 0 \\ 0 & 0 & 0 & 0 & C_{f\beta} & 0 \\ 0 & 0 & 0 & 0 & 0 & C_{f\gamma} \end{pmatrix} \quad (20)$$

As described above, in position control section 32, a position deviation, which is an output of deviation section 31, is subjected to coordinate transformation from the reference coordinate system to the profile coordinate system by transposed orthogonal matrix calculating section 32a and then multiplied by the selection matrix I−Sf to extract only a component in the direction of position control. The component is again transformed to the reference coordinate system by orthogonal matrix calculating section 32c and then multiplied by position feedback gain Cp to be sent to adder 35 as a velocity command Vp in the direction of position control.

Figure 11:
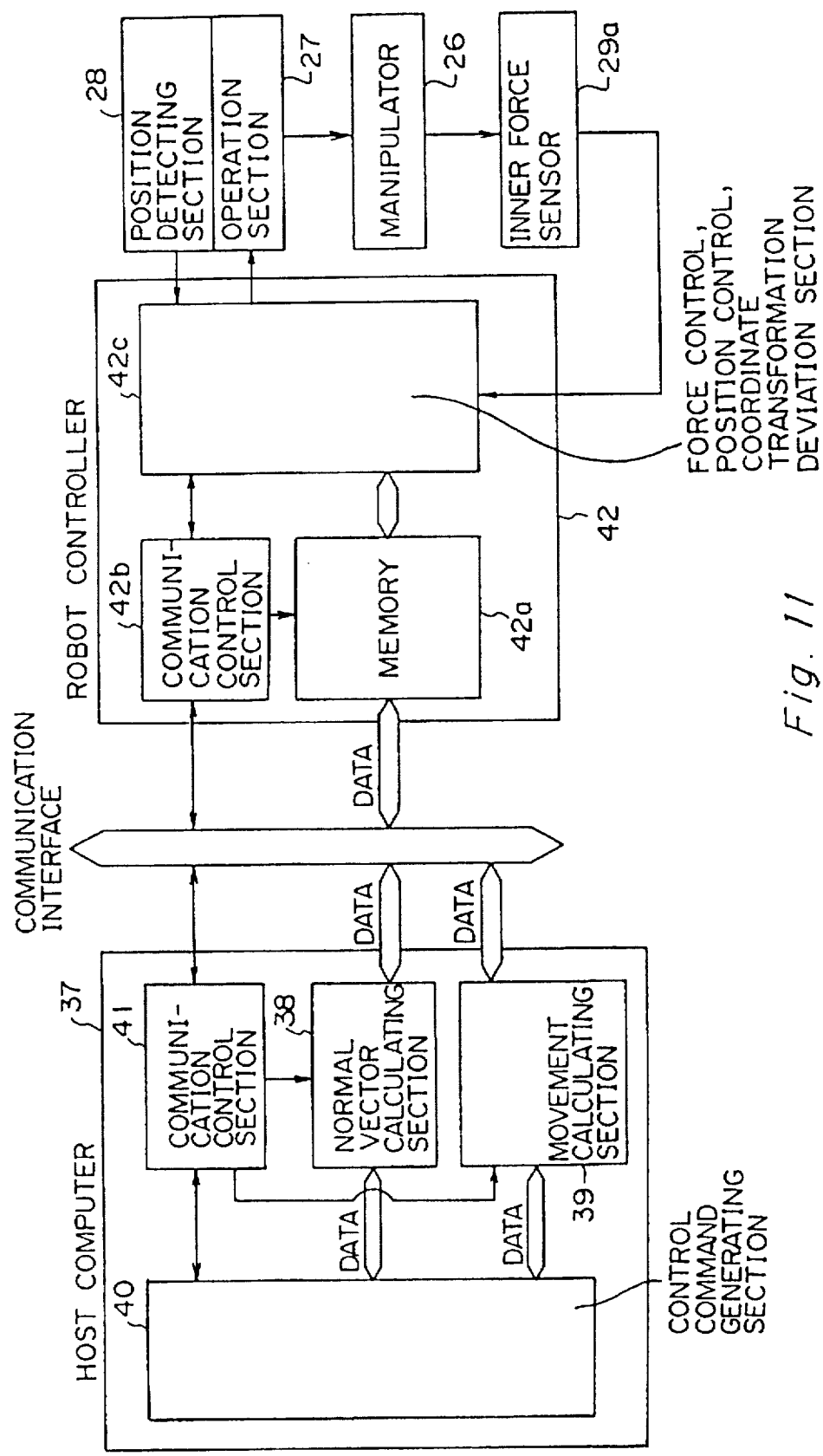
FIG. 11 is a block diagram illustrating a system configuration of the profile control apparatus according to the first embodiment.

FIG. 11 illustrates a system configuration of the profile control apparatus in the first embodiment. Host computer 37 has normal vector calculating section 38, movement calculating section 39, control command generating section 40 and communication control section 41. Robot controller 42 has memory 42a, communication control section 42b and force control, position control, coordinate transformation, deviation sections 42c. The robot controller controls manipulator 26 through operation section 27, position detecting section 28 and inner force sensor 29a. Host computer 37 and robot controller 42 are interconnected by a communication interface, such as a bus. Data are transferred between memory 42a and normal vector calculating section 38, movement calculating section 39 under the control of communication control sections 41 and 42 for controlling the timing of signal transmission and reception.

Figure 12A:
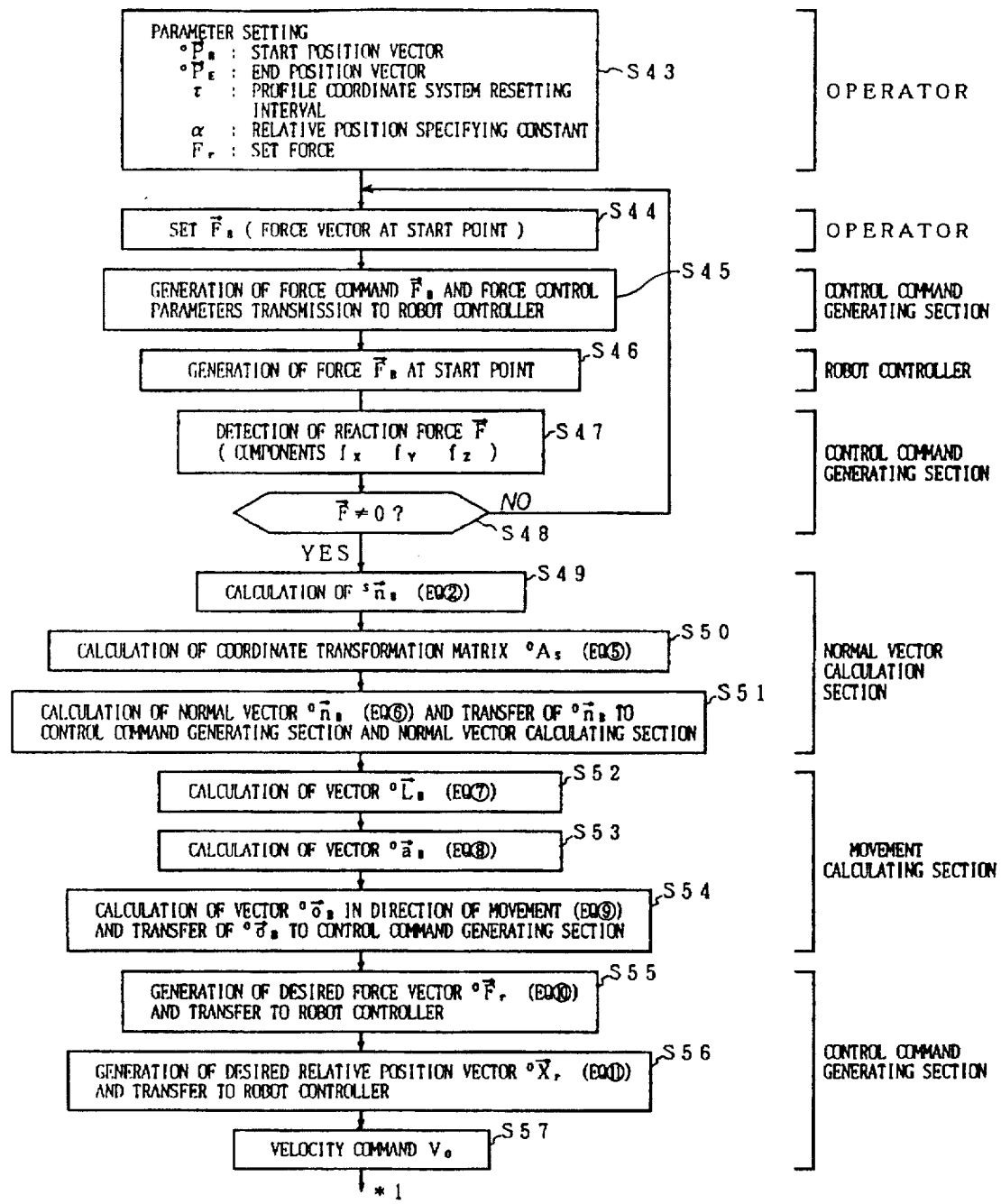
FIGS. 12A, 12B and 12C are flowcharts of the profile operation in the first embodiment.
Figure 12B:
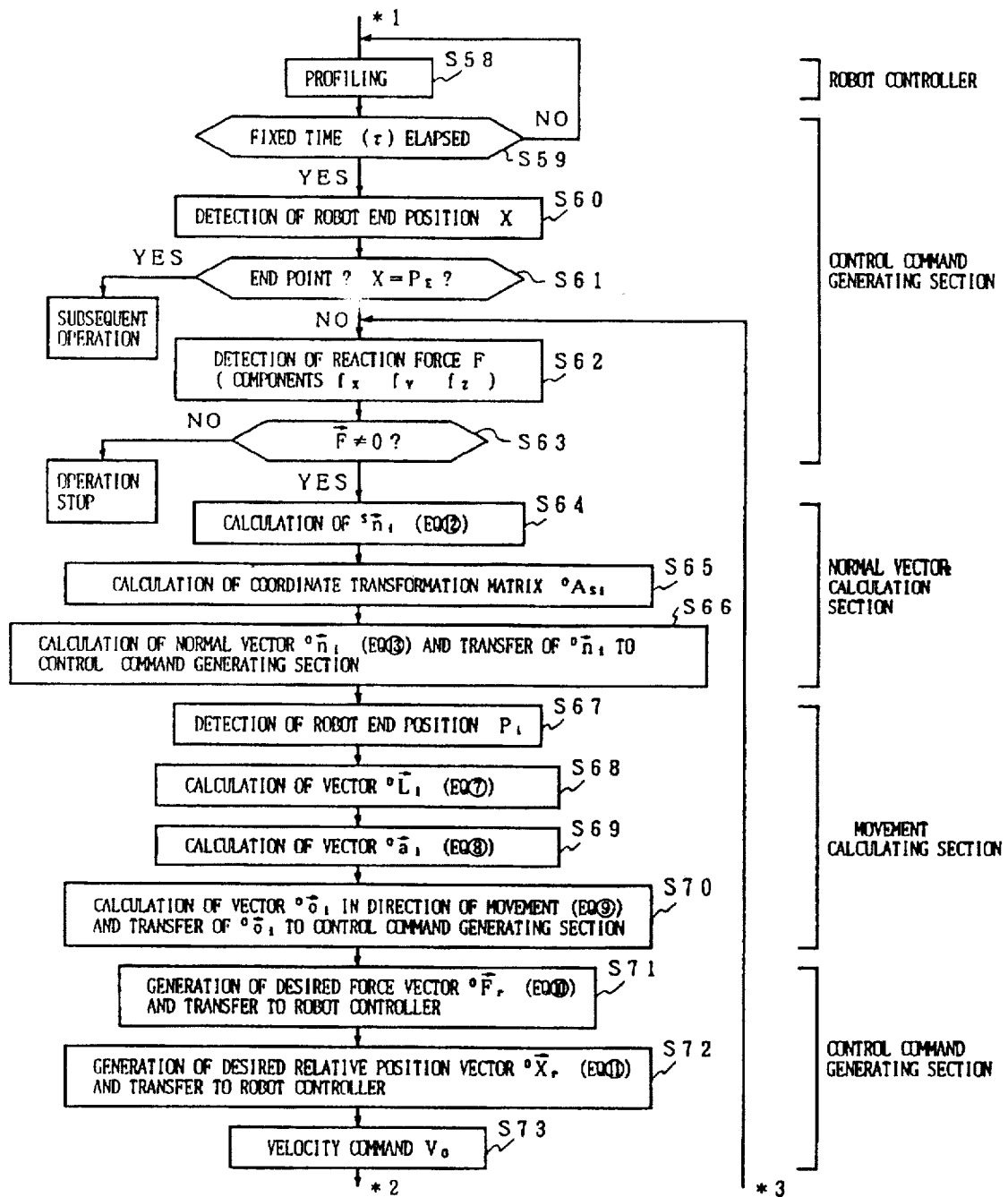
Figure 12C:
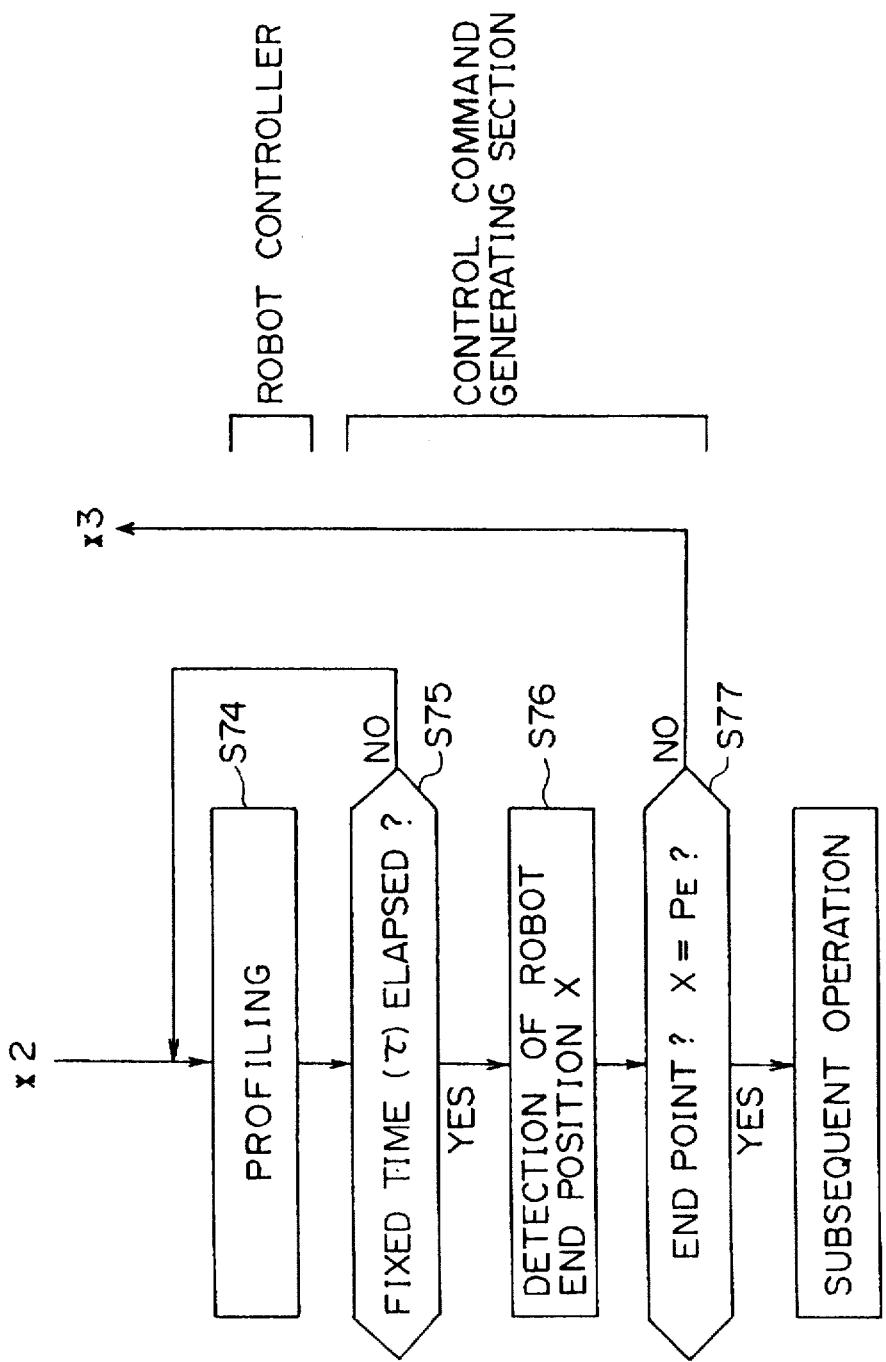

FIGS. 12A to 12C are flowcharts of the profiling operation in the first embodiment. The Figure is a flowchart of the profiling operation for a work object having curved surfaces of unknown contours in particular and illustrates the flow of processes performed by control command generating section 40, normal vector calculating section 38, movement calculating section 39 in host computer 37 and the robot controller. It is assumed here that the start and end points of the profile operation shown in FIG. 6 have already been given. The description of a method of moving the manipulator to the end point of the profile operation is omitted. In the Figure a subscript B corresponds to a process at the start point and a subscript i corresponds to a process at the time of setting of the i-th profile coordinate system.

In step S43 operator sets a start point PB, an end point PE, a set force Fr, a switching time τ of profile coordinate systems and a coefficient α for specifying a desired position. The operator further sets a force vector $\vec{FB}$ for calculating a normal vector at the start point in step S44. The control command generating section generates a force command $\vec{FB}$ and force control parameters for generating a force $\vec{FB}$ at the start point and transfers them to the robot controller in step S45. The robot controller responds to the command to generate force $\vec{FB}$ and presses the manipulator against the work object in step S46. If a reaction force $\vec{F}$ to be detected in step S47 is found to be 0 by the control command generating section in step S48, then the operation returns to step S44 so that force vector $\vec{FB}$ is set again. Note that a reaction force of 0 means that the robot is separated from the work object.

When reaction force $\vec{F}$ is not 0 in step S48, the normal vector calculating section calculates a normal vector $^s\vec{nB}$ in sensor coordinate system in step S49, calculates a coordinate transformation matrix $^oA_s$ step S50 and calculates a normal vector $^o\vec{nB}$ represented in reference coordinate system in step S51. The normal vector $\vec{nB}$ is transferred to the control command generating section and the movement calculating section.

The movement calculating section calculates a unit vector pointed in the direction of the end point using equation (7) represented by position vectors at the start and end points of the profiling work in step S52, calculates a vector $^o\vec{aB}$ on the tangent plane using equation (8) in step S53 and calculates a vector $^o\vec{oB}$ pointing in the direction of movement in step S54. The vector $^o\vec{oB}$ is transferred to the control command generating section.

The control command generating section generates a desired force vector $^o\vec{Fr}$ using equation (10) and transfers it to the robot controller in step S55. Moreover, the control command generating section generates a desired relative position vector $^o\vec{Xr}$ using equation (11) and transfers it to the robot controller in step S56. The control command generating section applies a velocity command Vo for moving the robot's hand at high speed to the robot controller in step S57 so that the controller starts the profiling operation in step S58. The control command generating section monitors in step S59 whether or not a fixed time (τ) has elapsed after the start of the profiling operation. The profiling operation is continued in step S58 until the time elapses. When it is decided in step S59 that the fixed time has elapsed, the position X of the robot's end is detected by the control command generating section in step S60 and a decision is made in step S61 as to whether or not the end point of the profiling operation is reached, that is, whether or not X=PE. When the end point is reached, the profiling operation comes to an end and subsequent operations will be performed.

When the end point is not reached in step S61, the setting of a new profile coordinate system and a profiling operation using the new coordinate system are repeated in steps following step S61. That is, first, a reaction force $\vec{F}$ is detected in step S62 and then a decision is made in step S62 by the control command generating section as to whether or not $\vec{F}=0$. In case $\vec{F}=0$, the operation is stopped because the robot has been separated from the work object for some cause.

When $\vec{F}\neq 0$ in step S63, a normal vector is calculated by the normal vector calculating section in steps S64 through S66 as in steps S49 through S51 and a vector pointed in the direction of movement is calculated by the movement calculating section in steps beginning with step S67. In this case, however, the current position of the robot's end is detected in step S67 before the same processes as in steps S52 to S54 are performed and the vector in direction of movement is calculated on the basis of the detection of the robot current position. Subsequently the control command generating section a desired force vector, a desired relative position vector and a velocity command in steps S71 to S73 as in steps S55 to S57. A profiling operation is performed by the robot controller in step S74.

The control command generating section monitors whether or not the fixed time τ has elapsed after the start of the profiling operation in step S75. If the time has not elapsed, the profiling operation is continued in step S74. When it is decided in step S75 that the fixed time has elapsed, the position of the robot's end is detected by step S76 and a decision is made in step S77 as to whether or not the detected position corresponds with the end point PE. When the detected position corresponds with the end point, the profiling operation is stopped and subsequent operations are performed. When the end point is not reached in step S77, a new profile coordinate system is set again and the profiling operation is continued under the new profile coordinate system from step S62. The above operations are repeated until it is decided in step S77 that the robot has arrived at the end point of the profiling operation.

In the first embodiment described in detail, the vector in direction of movement $\vec{Oi}$ of the robot's hand is obtained on the basis of the unit vector $\vec{Li}$ pointed from the current point Pi of contact on the work object in the direction of the end point PE of the profile operation as depicted in FIGS. 4 and 6. In a case where the end point PE of the profile operation is not given definitely as coordinates, the operator may provide a rough direction of movement of the robot's hand from the start point PB as a vector in direction of movement $\vec{Oop}$.

Figure 13:
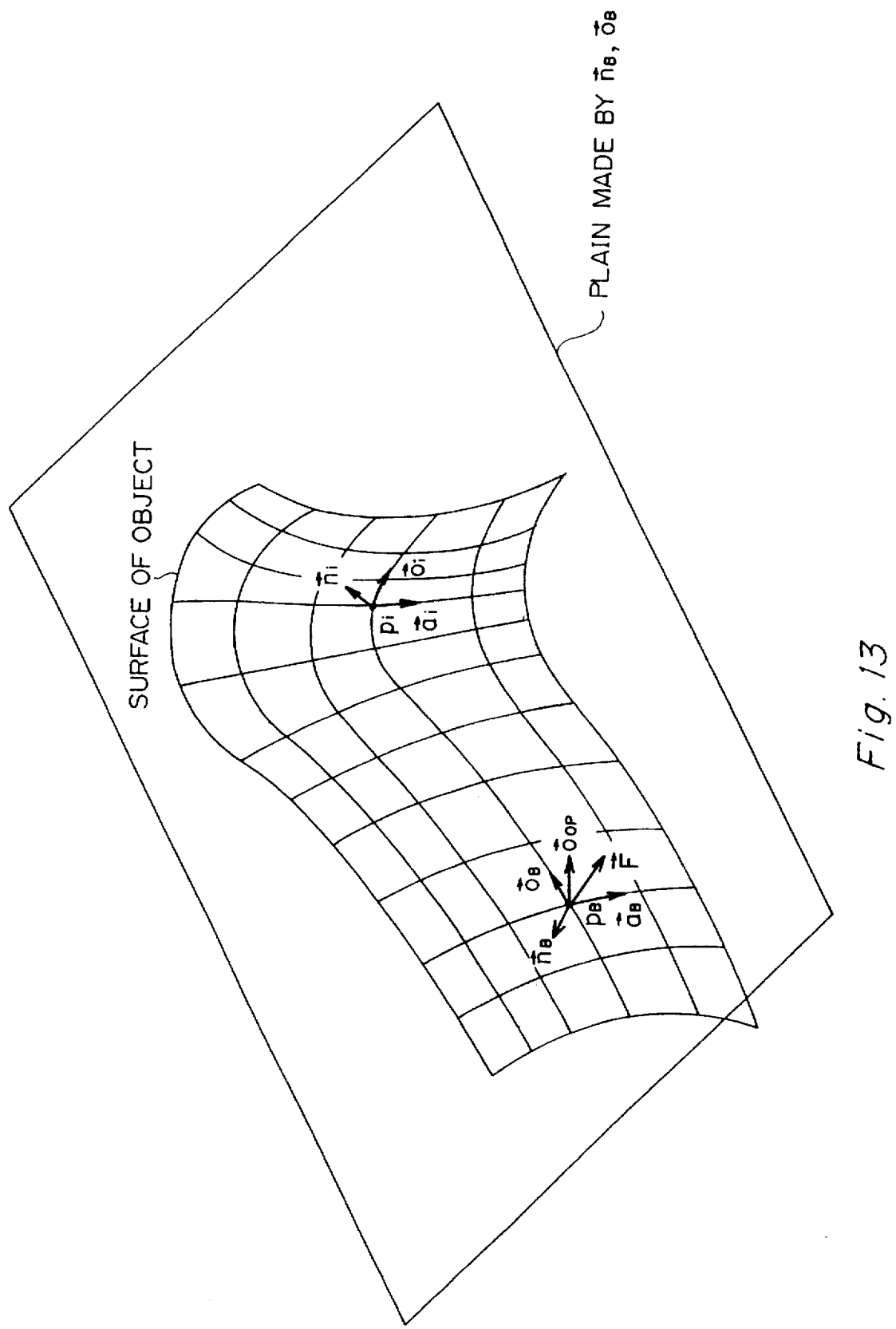
FIG. 13 is a diagram for use in explanation of a method of setting a profile coordinate system when a vector $\vec{O}op$ in direction of movement is provided by an operator.

FIG. 13 illustrates a method of setting a profile coordinate system when a vector in direction of movement $\vec{Oop}$ at the start point PB of the profiling operation is set by operator. To obtain the vector in direction of movement $\vec{O}op$ at the start point PB, $\vec{a}$B, which is one of unit vectors representing the coordinate axes of the profile coordinate system, is found, using $°\vec{nB}$ and $\vec{O}op$, to be $$°\vec{a}_B = (°\vec{n}_B \times \vec{o}_{op})/|°\vec{n}_B \times \vec{o}_{op}| \tag{21}$$

The vector in direction of movement $°\vec{OB}$ can be obtained in exactly the same way as equation (9).

Where the vector in direction of movement is provided from the operator at the time of starting of the profiling operation, vectors in direction of movement at points of the profiling operation are controlled such that they always exist on the plane made by the normal vector at the start point PB of the profile operation and the vector in direction of movement provided from the operator.

In FIG. 13, a locus that the robot's end draws on a surface of a work object forms a curved line on the plane made by the normal vector $\vec{n}$B and the vector in direction of movement $\vec{O}$B at the start point. Thus, a vector in direction of movement $\vec{O}i$ at each point Pi of the profiling operation will be normal to a third unit vector $\vec{a}$B found at the start point. The vector in direction of movement $\vec{O}i$ is also normal to the normal vector $\vec{n}i$ obtained by equation (13) and will be given by $$°\vec{o}_i = (°\vec{a}_B \times °\vec{n}_i)/|°\vec{a}_B \times °\vec{n}_i| \tag{22}$$

$\vec{a}$i, which is one of unit vectors representing the coordinate axes of the profile coordinate system, is given, using equation (22), by $$°\vec{a}_i = °\vec{n}_i \times °\vec{o}_i \tag{23}$$

When $°\vec{a}B = °\vec{n}i$ or $°\vec{a}B = -°\vec{n}i$, equation (22) will not hold. In this case, the direction of movement of the robot's hand can be maintained by using the vector in direction of movement $\vec{O}opi$ given by the operator at the start point as a vector in direction of movement at point Pi.

The profile control apparatus when the vector in direction of movement $\vec{O}op$ at the start point of the profiling operation is provided from operator may be the same as that in FIG. 9 except that the vector in direction of movement $\vec{O}op$ is applied to vector in direction of movement calculating section 39 or control command generating section 40 in place of the end point PE of the profiling operation.

Figure 14A:
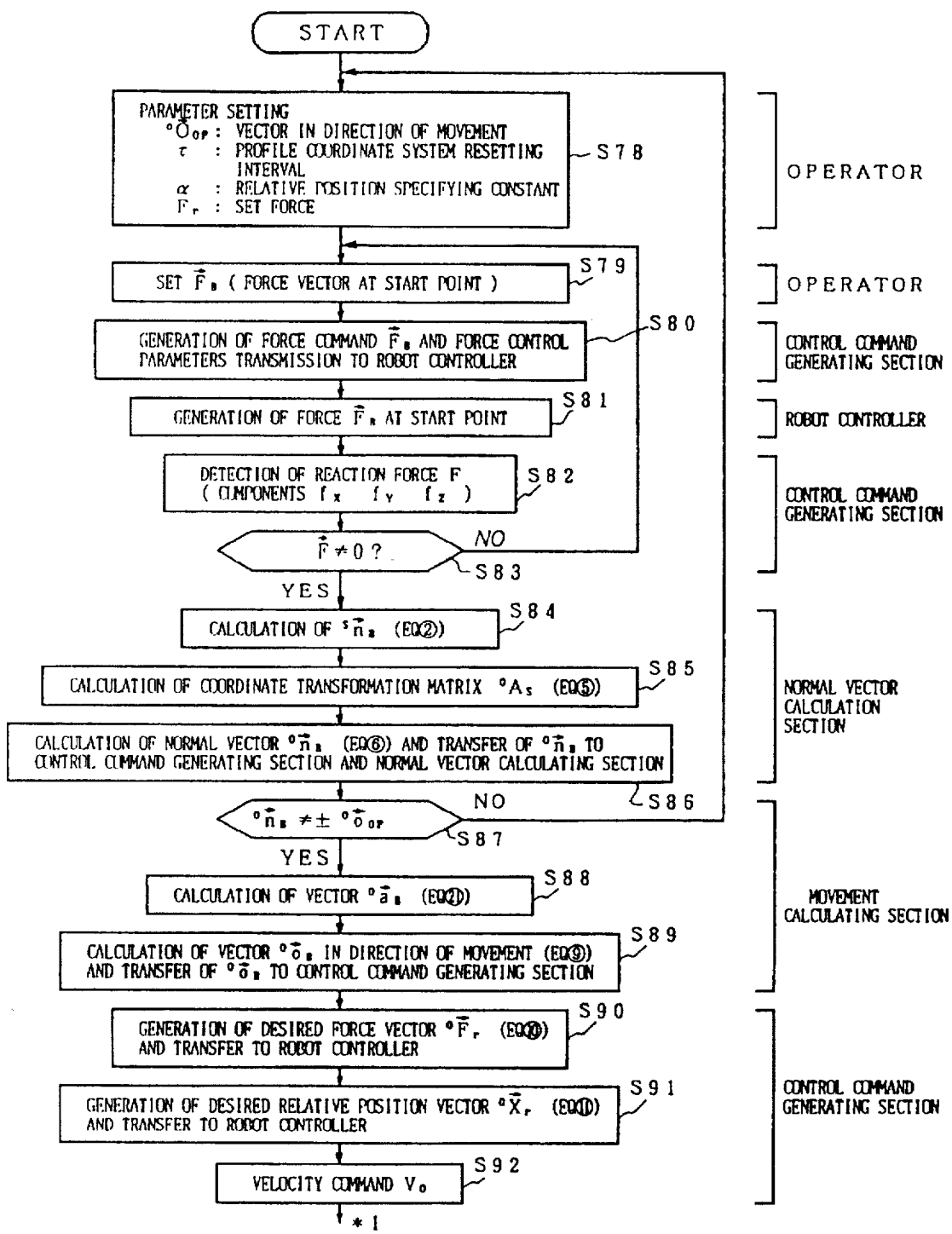
FIGS. 14A, 14B and 14C are flowcharts of the profile operation in the first embodiment when the vector in direction of movement is provided by an operator.
Figure 14B:
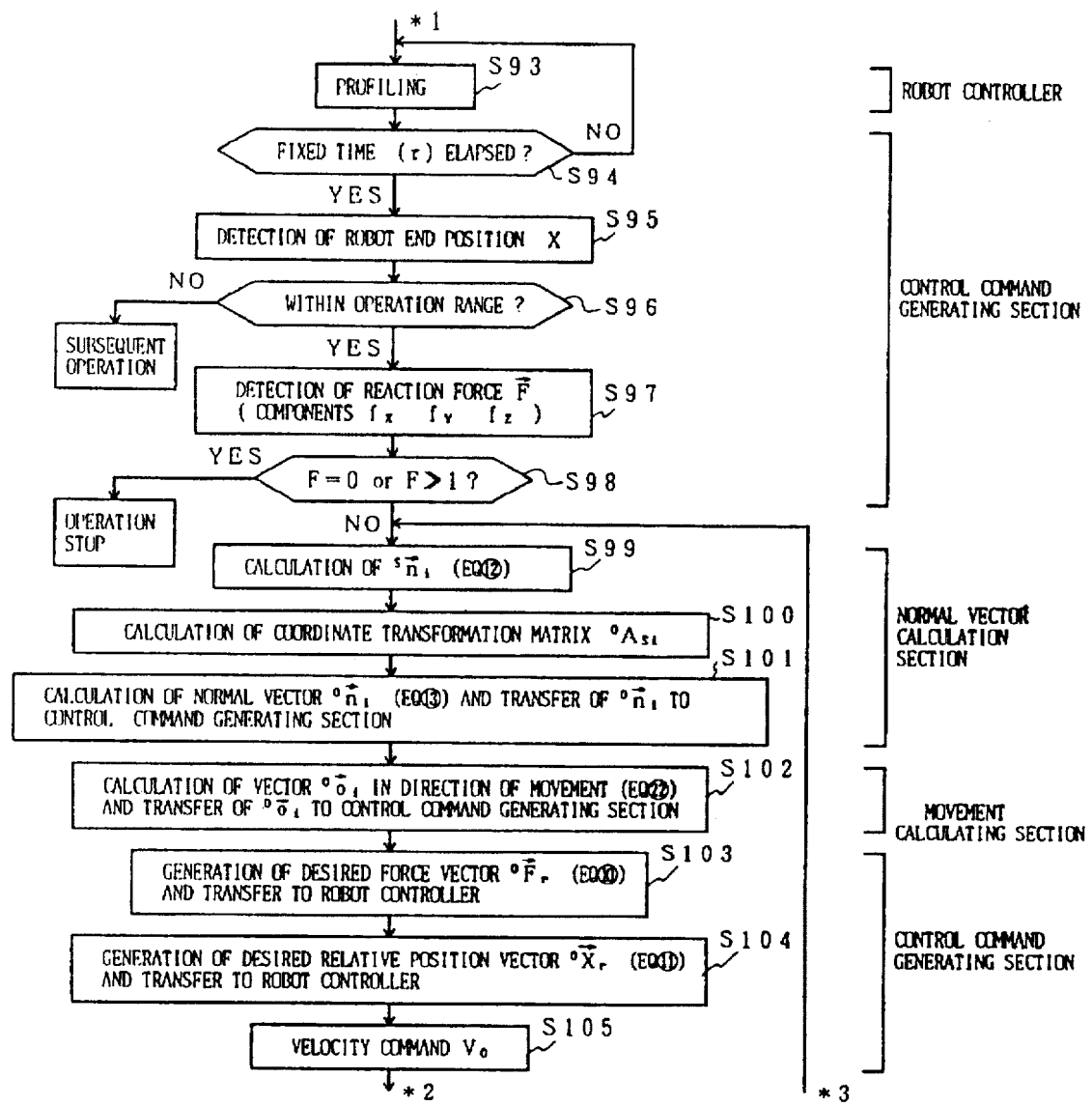
Figure 14C:
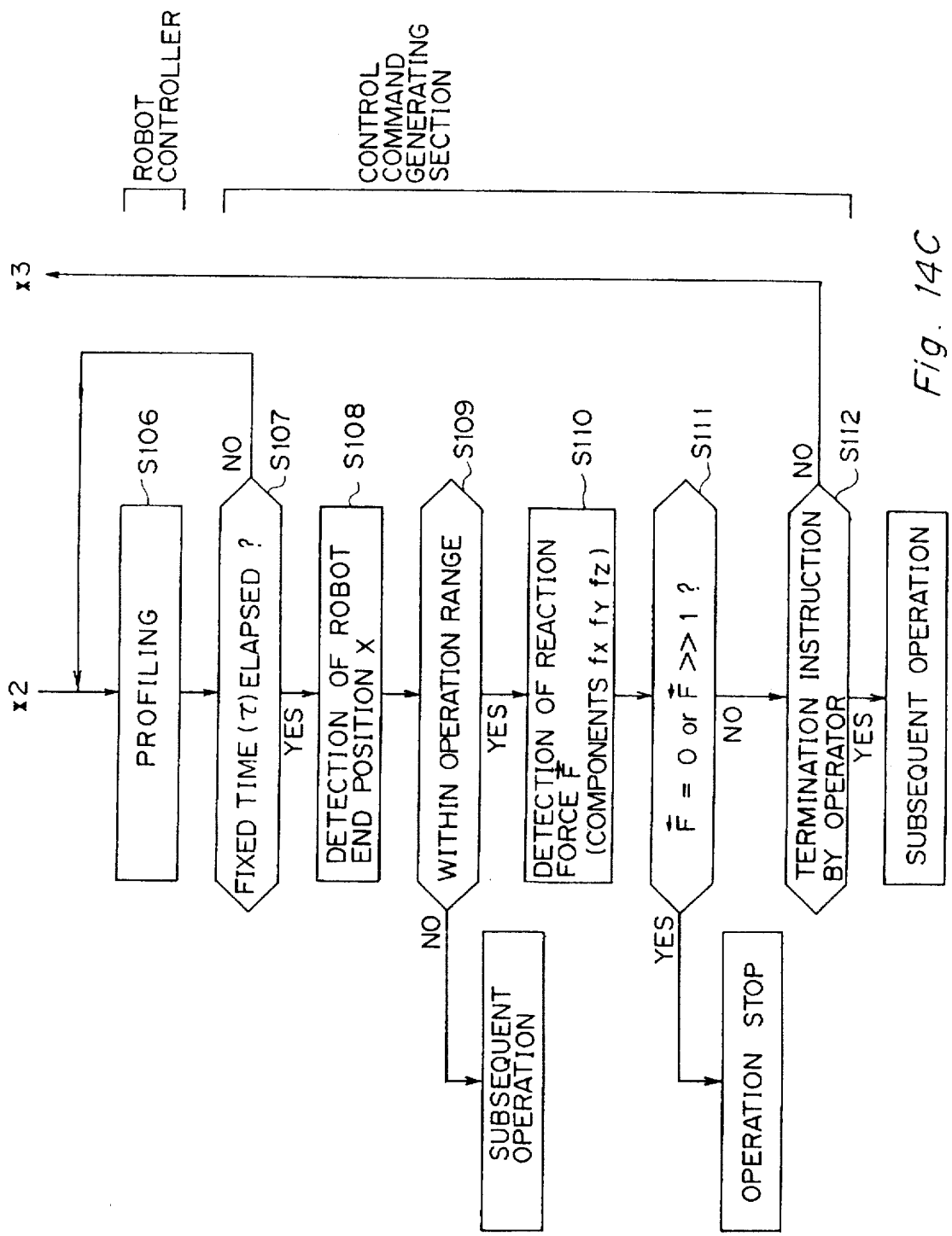

FIGS. 14A to 14C are flowcharts of the profile operation in the first embodiment where a vector in direction of movement at a start point is provided from operator. The flowchart of FIG. 14 is substantially the same as that of FIG. 12. Basic differences between the flowchart of FIG. 14 and the flowchart of FIG. 12 are that: a vector in direction of movement $°\vec{Oop}$ is given in step S78 in place of position vectors $°\vec{PB}$ and $°\vec{PE}$ at the start and end points in step S43 of FIG. 12; a decision is made as to whether or not a normal vector nB and a vector in direction of movement $±°\vec{Oop}$ coincide with each other in step S87 after step S86 corresponding to step S51, and when a coincidence occurs, steps beginning with step S78 are repeated; a vector $°\vec{aB}$ is calculated in step S88 without calculating $°\vec{LB}$ in step S52 of FIG. 12; and a decision is made as to whether or not the end position X of the robot is located within an operation range in step S96 in place of deciding whether or not the end position X has arrived at the end point PE in step S61 of FIG. 12.

Note that when reaction force $\vec{F}$ is much greater than 1 in step S98, the operation is stopped. This is to stop the operation, for example, when the robot collides with a wall and the reaction force thus becomes great. Also, there is a slight difference between the flowcharts of FIGS. 12 and 14 in steps following step S99 because of a difference in the methods of calculating the vector in direction of movement $°\vec{Oi}$. Furthermore, there is also a difference between the flowcharts in that the setting of a coordinate system is repeated in response to the decision that the robot end position X has not arrived at the end point in step S77 of FIG. 12, while it is repeated in response to the absence of a termination instruction from operator in step S112.

A second object of the present invention, that is, a robot's trajectory searching system for returning a robot to an original trajectory quickly when the robot' end is separated from a surface of a work object and permitting the robot to perform an profiling operation again will be described as a second embodiment of the present invention.

Figure 15:
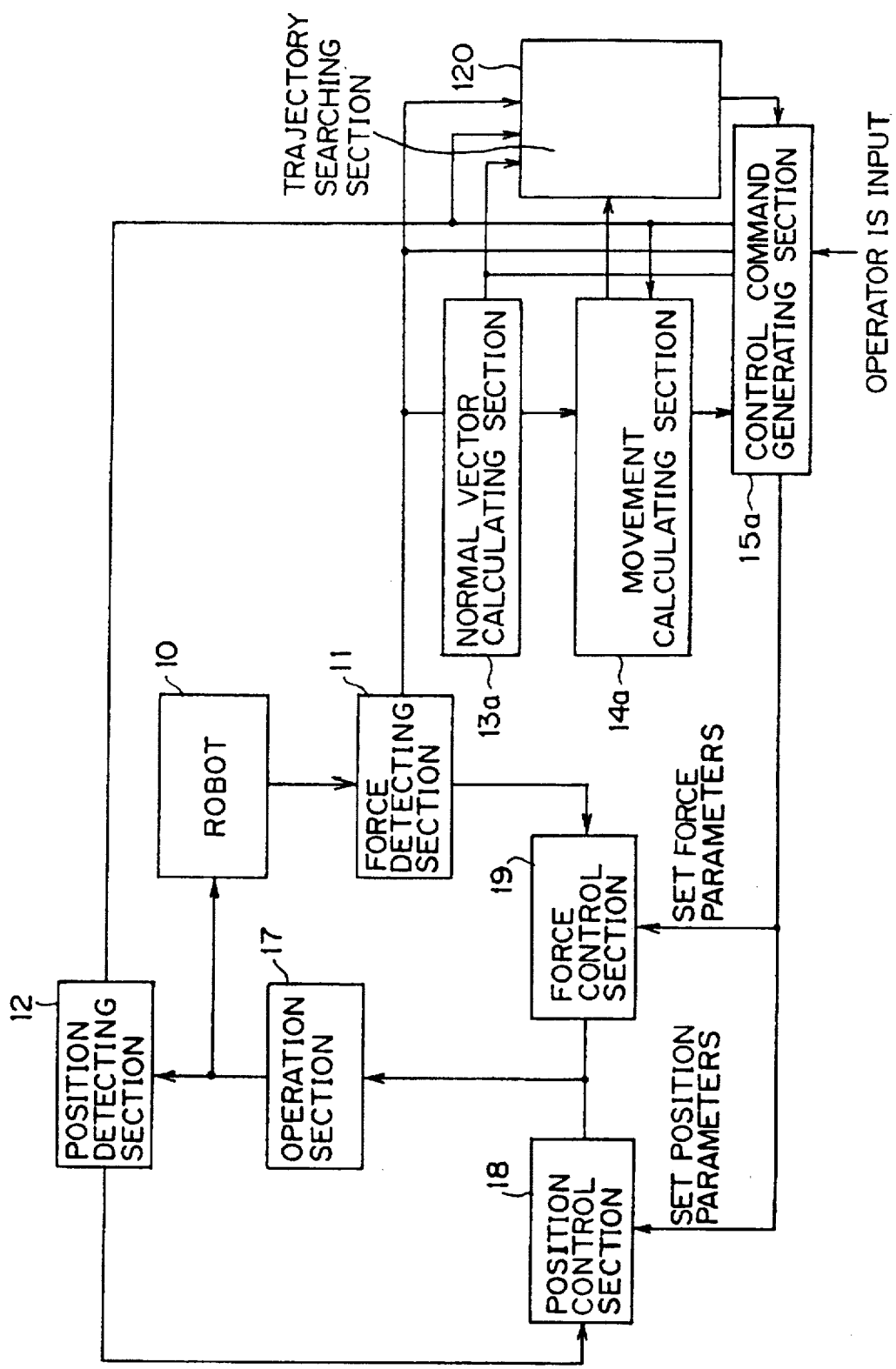
FIG. 15 is a basic block diagram of a second embodiment of the present invention.

FIG. 15 is a basic block diagram of the second embodiment. Distinct from the basic block diagram of the first embodiment shown in FIG. 5, the second embodiment is provided with a trajectory searching section 120 responsive to outputs of force detecting section 11, position detecting section 12, normal vector calculating section 13a and movement calculating section 14a for searching a trajectory when the robot's hand is separated from the work object, the output of trajectory searching section 120 being applied to control command generating section 15a.

Figure 16:
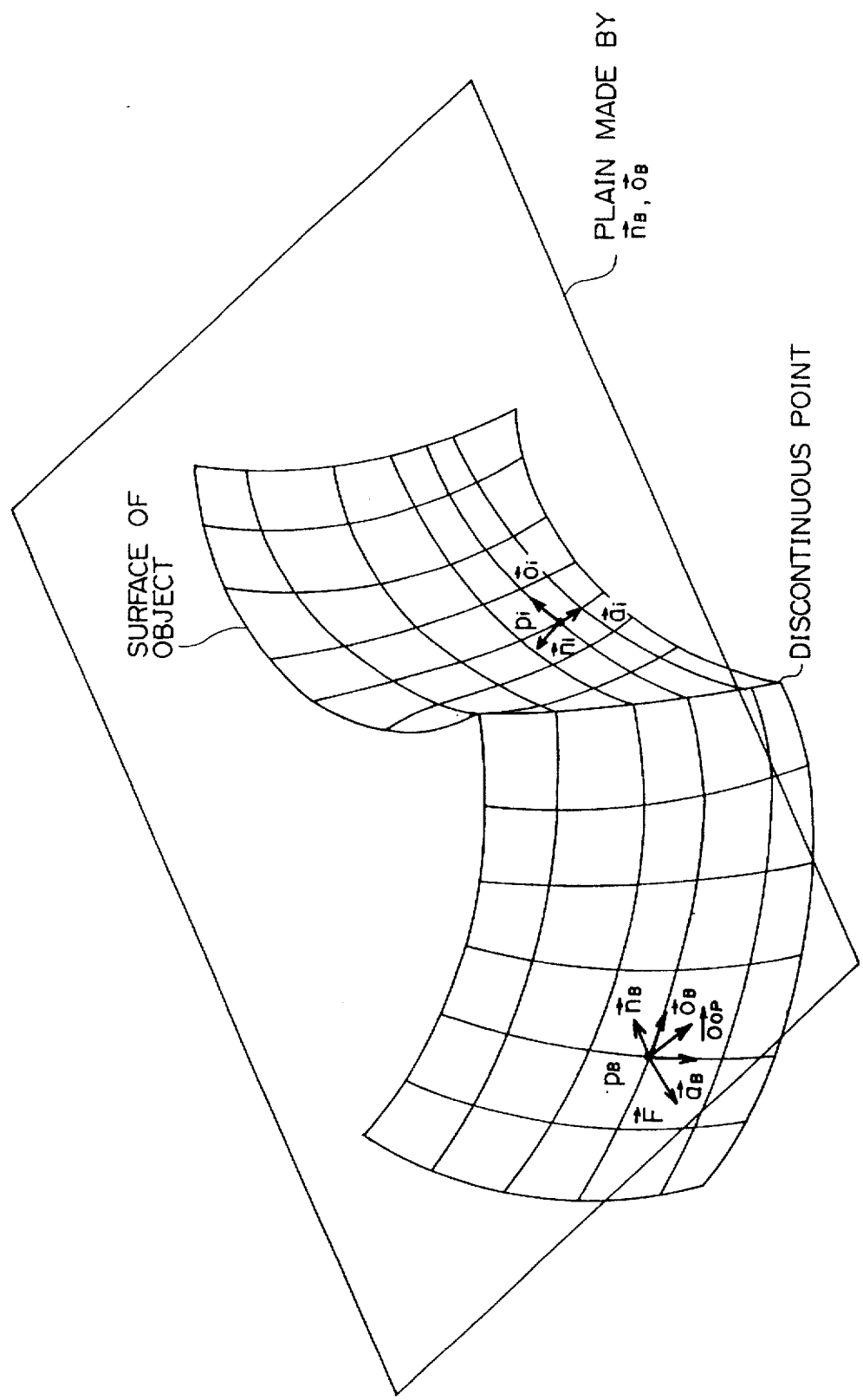
FIG. 16 is a diagram for use in explanation of a method of setting a profile coordinate system when a profile operation is performed on a work object having surfaces which are discontinuous.

FIG. 16 illustrates a method of setting a profile coordinate system in a profile operation on a work object with discontinuous surfaces. The Figure corresponds to the case where the direction of movement at start point PB is provided from operator as a vector in direction of movement $\vec{O}op$ in the first embodiment.

In general, in a profiling operation on a work object having discontinuous surfaces, there are a case where the robot's end keeps contacting a surface of the work object after it has passed a discontinuous point and a case where it separates from the work object. When the robot keeps contacting the work object, the profiling operation can be continued in exactly the same way as in the first embodiment.

Although FIG. 16 illustrates the case where vector in direction of movement $\vec{O}op$ at the start point PB of the profiling operation is provided from the operator, the same control as in the first embodiment is also possible in the case where the end point PE is provided as in FIG. 6.

When the robot separates from the work object, on the other hand, a search for a trajectory is made by trajectory searching section 120 of FIG. 15.

Figures 17A, 17B:
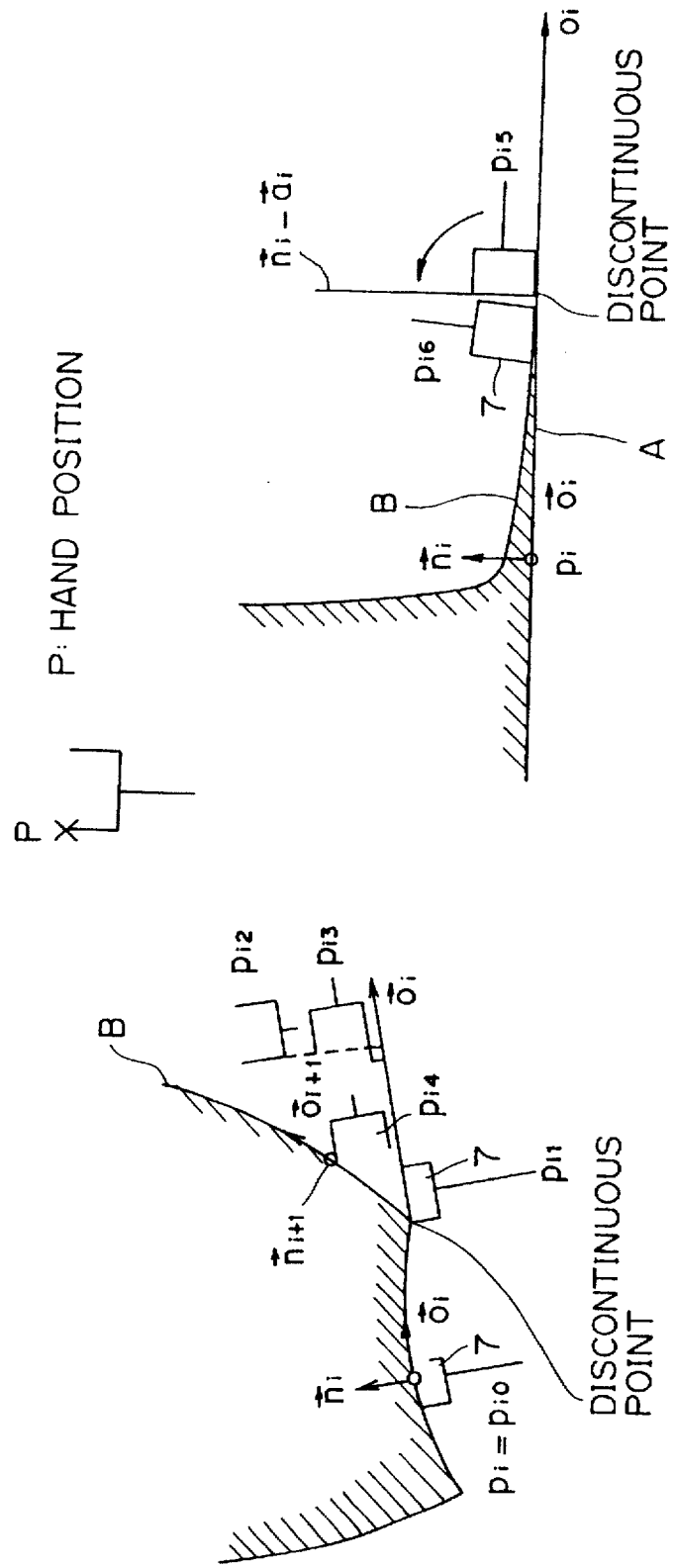
FIGS. 17A to 17B are diagrams illustrating a search for a robot's trajectory.

FIGS. 17A and 17B are diagrams illustrating a trajectory search, in which a section of a work object is seen from above and the operation of the robot in the vicinity of a discontinuous point is depicted. As may be seen from FIGS. 17A, B, the method of searching for a trajectory varies with the form of a work object.

Figure 18A:
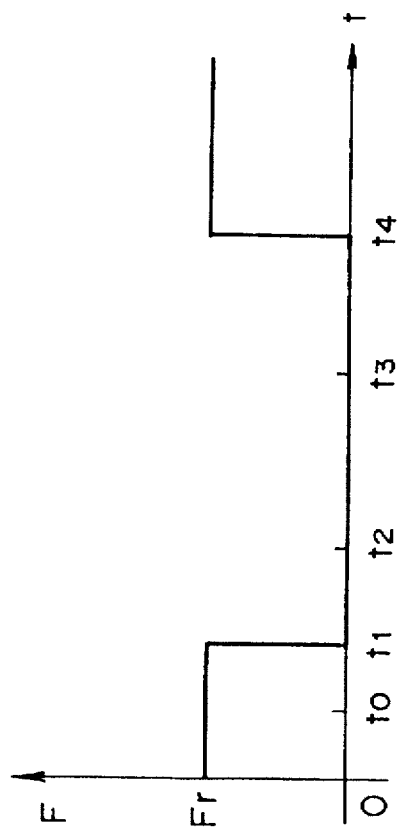
FIGS. 18A to 18B illustrate time response of pressing force F at the time of the search for the trajectory.
Figure 18B:
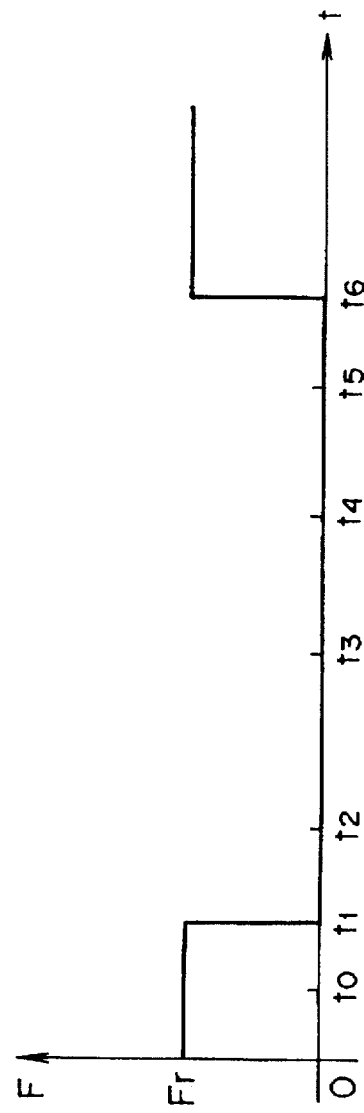

FIGS. 18A and 18B illustrate time responses of pressing force at the time of searching for a trajectory. FIGS. 18A and 18B correspond to FIGS. 17A and 17B, respectively, to, t1, t2, t3, t4, t5, t6 represent arrival times of the robot in positions Pi0, Pi1, Pi2, Pi3, Pi4, Pi5, Pi6, respectively. The position of the hand itself is expressed by the position of its leftmost end as shown. The trajectory searching method will be described in conjunction with FIGS. 17, 18 and 15.

(1) The Case of FIG. 17A

It is assumed that the profiling operation is performed in accordance with the control method described in the first embodiment at the i-th profile coordinate system set point Pi (=Pio). It is further assumed that the robot performs the profiling operation from Pio to Pi1 and arrives in position Pi1 at time t1 as shown in FIG. 17A. There is no work object on the right hand side of position Pi1. At time t1 a control command is not altered. Thus, the robot will move in the direction of $\vec{n}i$ so as to generate a pressing force in the direction of $\vec{n}i$. Since there is also a component of movement in the direction of $\vec{o}i$, the robot will advance from Pi1 to Pi2 in the end. In this way the robot may separate from the work object, depending on a relation between the form of the work object and the velocity at which the robot moves.

In this case pressing force $\vec{F}ni$ in the direction of $\vec{n}i$ detected by force detecting section 11 of FIG. 15 will exhibit such a time response as shown in FIG. 18A. Namely, although a fixed pressing force continues to be generated during a time interval (to–t1) when the robot contacts the work object, the pressing force is reduced to 0 at discontinuous point Pi1 where there is no reaction force because of the absence of the work object. Upon detection of such a variation in force as shown in FIG. 18A the control command generating section of FIG. 15 stores the coordinates of the hand in position Pi1 (discontinuous point) and commands the robot to stop. Upon receipt of the stop command from the control command generating section, force control section 19 of position control section 18 of FIG. 15 stops the robot. At this point the position of the robot is Pi2.

Next, the hand is rotated through an angle of 90° so that the hand moves to a position Pi3 in which its leftmost end is located on an extension of vector $\vec{o}i$. To change the attitude of the robot from Pi2 to Pi3, it is required that the hand be rotated clockwise by $-\pi/2$ about the ZH axis of the current hand coordinate system OH –XH, YH, ZH. The axis ZH is pointed downward from the drawing paper. The hand coordinate system is a coordinate system which is determined by the position and attitude of the hand relative to the manipulator. Unit vectors $\vec{n}H$, $\vec{o}H$ and $\vec{a}H$ are provided for coordinate axes XH, YH and ZH, respectively. A transformation matrix for transforming the hand coordinate system $\vec{n}H2$, $\vec{o}H2$, $\vec{a}H2$ at point Pi2 to the hand coordinate system $\vec{n}H3$, $\vec{o}H3$, $aH3$ at point Pi3 is expresses, using a rotatory coordinate matrix $E^{k(-\pi/2)}$, by $$(\vec{n}_{H3},\vec{o}_{H3},\vec{a}_{H3}) = E^{k(-\pi/2)}(\vec{n}_{H2},\vec{o}_{H2},\vec{a}_{H2}) \quad (24)$$

$$= \begin{bmatrix} 0 & 1 & 0 \\ -1 & 0 & 0 \\ 0 & 0 & 1 \end{bmatrix} (\vec{n}_{H2},\vec{o}_{H2},\vec{a}_{H2})$$

-continued $$E^{k(-\pi/2)} = \begin{pmatrix} \cos(-\pi/2) & -\sin(-\pi/2) & 0 \\ \sin(-\pi/2) & \cos(-\pi/2) & 0 \\ 0 & 0 & 1 \end{pmatrix}$$

Assuming $\vec{P}i1$, $\vec{P}i2$, $\vec{P}i3$ to be position vectors at points Pi1, Pi2, Pi3, since point Pi3 is a point on vector $\vec{o}i$, point Pi3 is given by $$\vec{P}_{i3}=\vec{P}_{i1}+r\vec{o}_i$$

$$r=(\vec{P}_{i2}-\vec{P}_{i1})\cdot\vec{o}_i \quad (25)$$

After the position and attitude of the hand is changed to Pi3, the robot is pressed in the direction opposite to vector $\vec{o}i$. The robot is pressed against the work object until the set force is reached. The robot contacts the work object in position Pi4. At time t4 the set force is generated as shown in FIG. 18(a). When the contact with the work object is restored, the profiling operation according to the control method described above becomes possible. Thus, the same control as in the first embodiment is performed again.

(2) The Case of FIG. 17B

In the case where the work object has such a form as shown in FIG. 18B, if a pressing force is merely generated in the direction opposite to the vector $\vec{o}i$ after the position and attitude of the hand have been changed to Pi5 as performed in the case (1), the hand will not come into contact with a surface B. Thus, a profile operation cannot be performed on surface B. For this reason, to perform the profile operation on surface B, the following control is performed after the pressing operation is performed from position Pi5.

As can be seen from FIG. 17B, it is when surface B exists in the quadrant IV of a coordinate system having a discontinuous point as its origin, $\vec{n}i$ as its X axis and $\vec{o}i$ as its Y axis that a force pressed against surface B has a component in the opposite direction to vector $\vec{n}i$. It is when the robot's end passes a $\vec{n}i-\vec{a}i$ plane that it enters the quadrant IV during profiling operation from Pi5 to Pi6. Thus, when any pressing force is not sensed after the robot's end has passed the $\vec{n}i-\vec{a}i$ plane, the surface B may be considered to be in the quadrant IV.

To restart the profiling operation from the discontinuous point, the instant the robot's end passes the $\vec{n}i-\vec{a}i$ plane, the pressing operation which has been performed from Pi5 is stopped. The position of the robot's end at this point is Pi5. Point Pi5 coincides with point Pi1. The hand is pressed while being rotated in the direction of a left-hand screw of vector $\vec{a}i$ (counterclockwise in FIG. 17) with the robot's end fixed at Pi5. The robot is pressed against the work object until the set force is reached. The robot contacts the work object in position Pi6(=Pi+1). As shown in FIG. 18B the set force is generated at time t6. When contact with the work object is restored, the profiling operation can be made possible in accordance with the above-described control method as with the case (1).

The profile control apparatus according to the second embodiment is substantially the same as that of FIG. 9, inclusive of the detailed arrangements of the position control section and the force control section of FIG. 10, except that host computer 37 involves trajectory searching section 120 which is responsive to coordinate transformation sections 29b, 30, normal vector calculating section 38, movement calculating section 39 and control command generating section 40 for making a search for a trajectory and outputs its result to control command generating section 40.

The system configuration of the profile control apparatus is also the same as that of FIG. 1-1 according to the first embodiment except that host computer 37 involves trajectory searching section 120 which communicates data with control command generating section 40 and the communication interface and is connected to communication control section 41, vector in direction of movement calculating section 39 and so on.

Figure 19A:
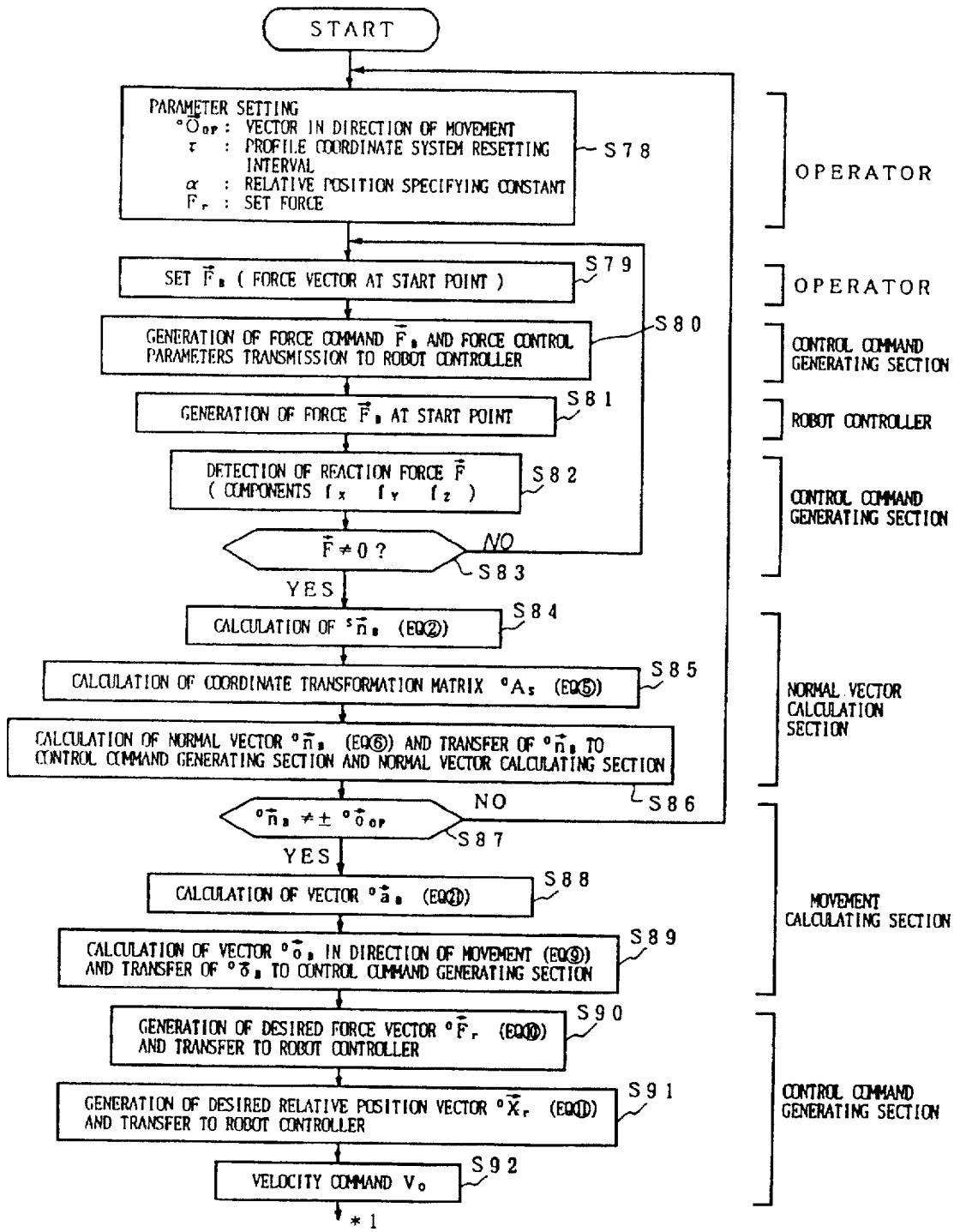
FIGS. 19A, 19B and 19C are flowcharts of a process when the robot's end contacts the work object in the second embodiment.
Figure 19B:
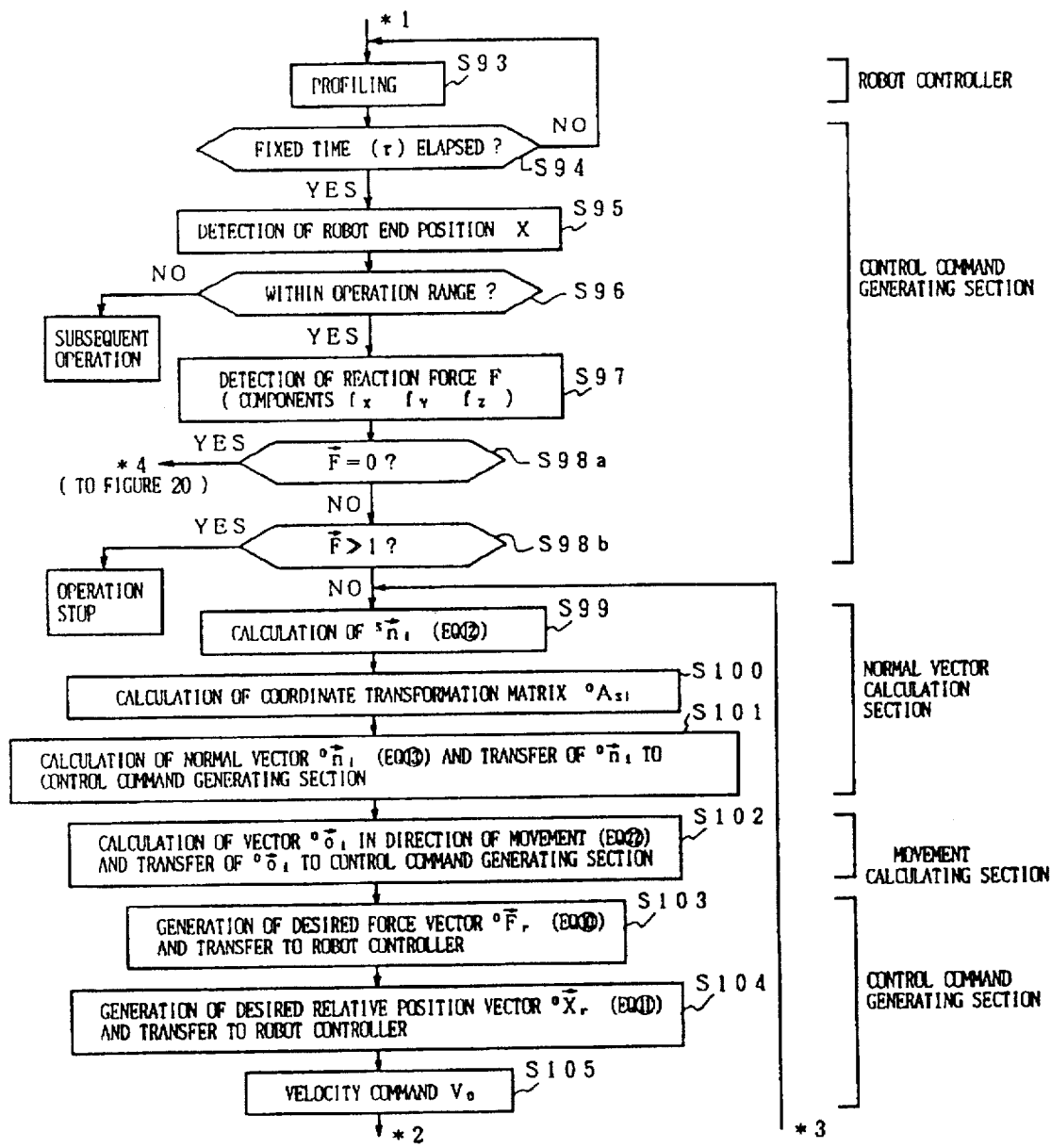
Figure 19C:
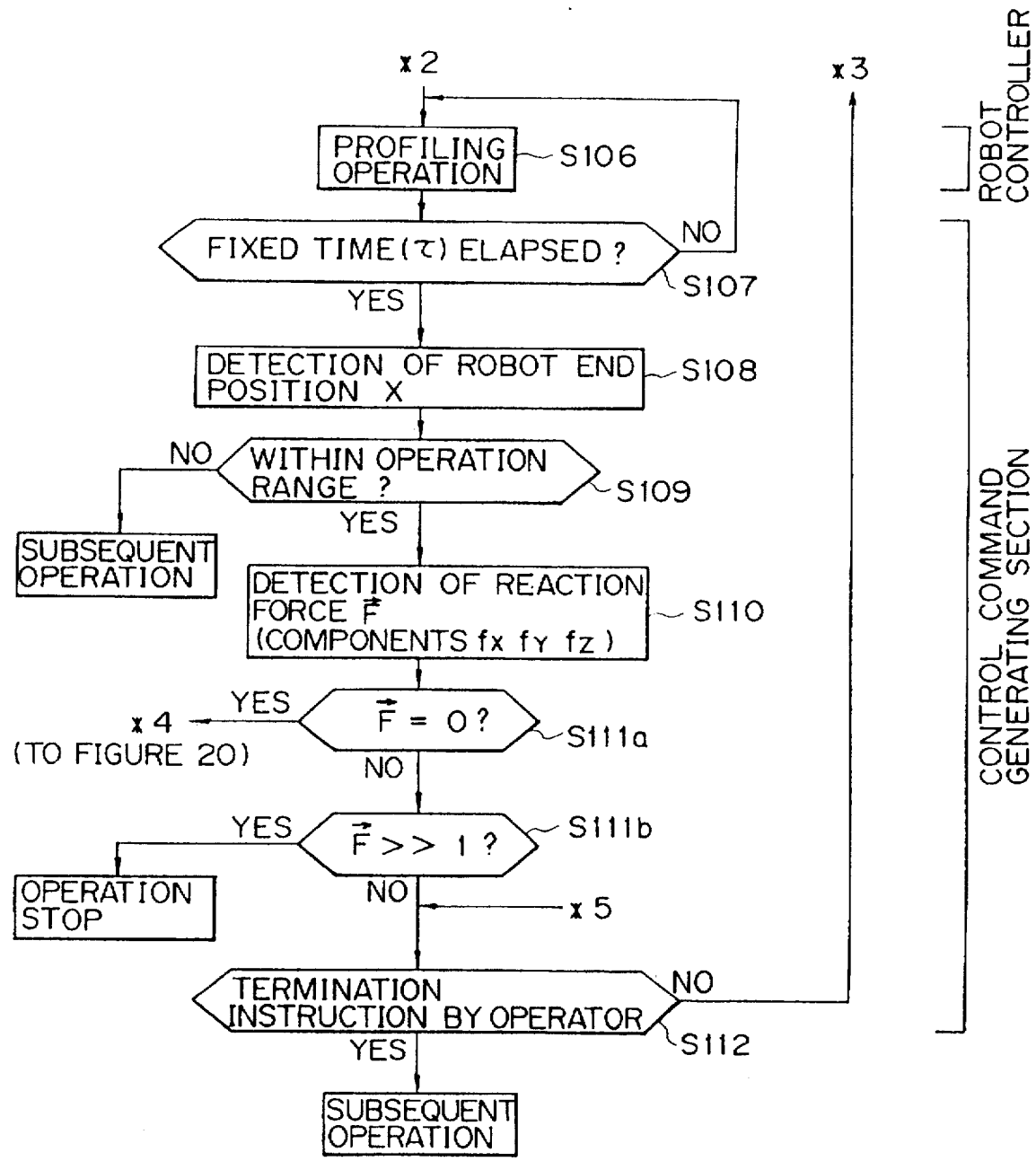
Figure 20A:
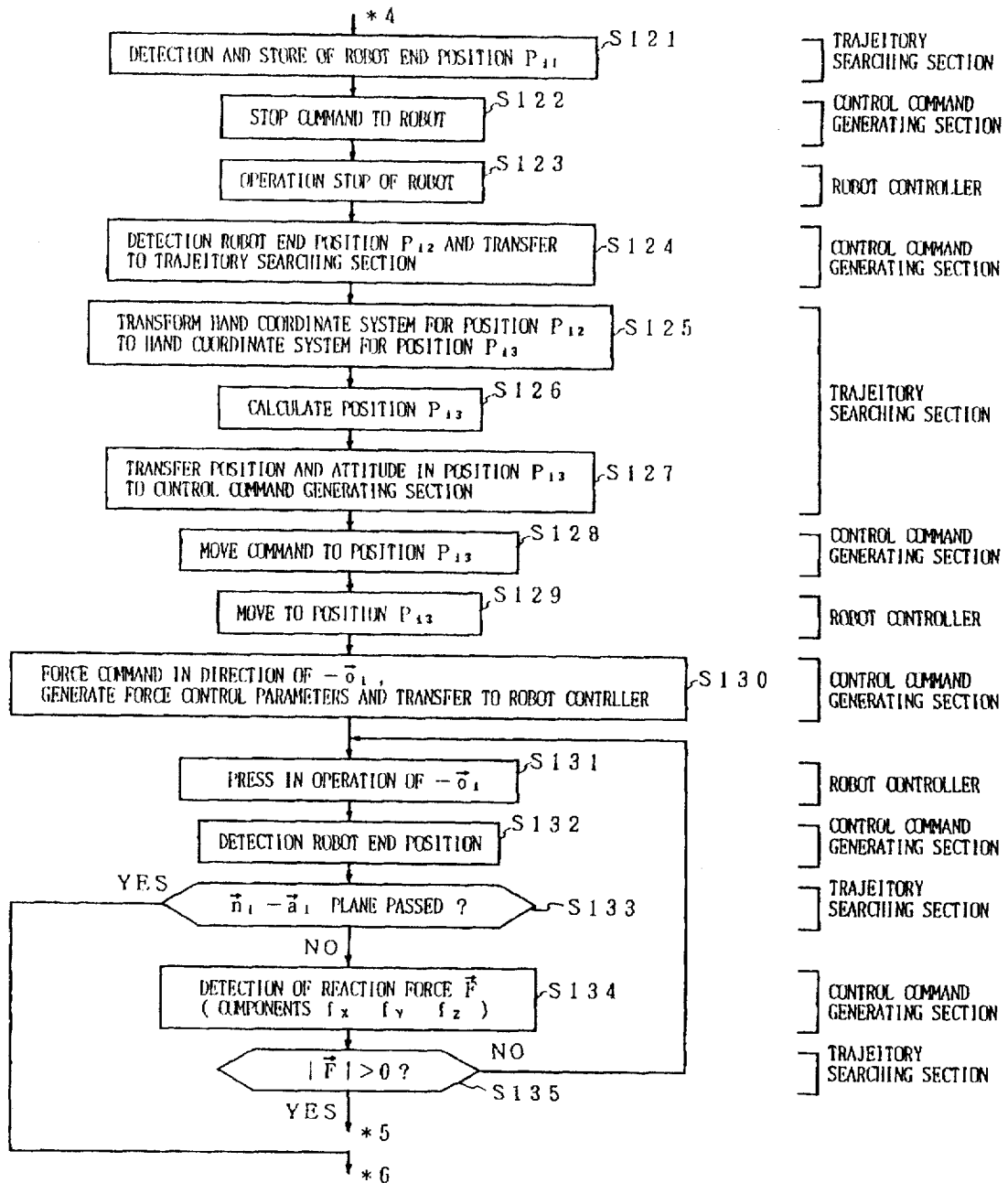
FIGS. 20A and 20B are flowcharts of a process when the robot's end separates from the work object in the second embodiment.
Figure 20B:
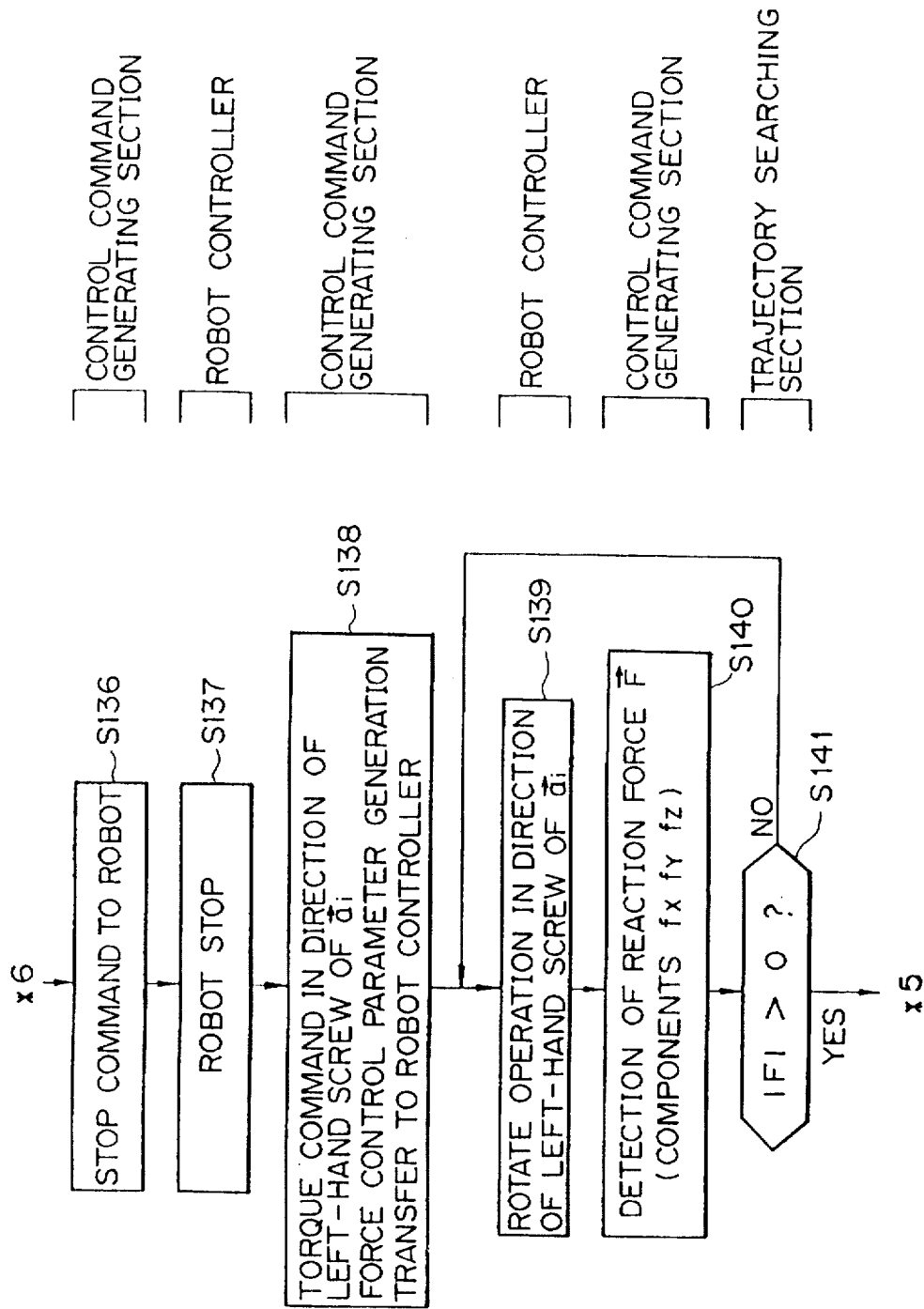

FIGS. 19A to 20B are flowcharts of the profiling operation according to the second embodiment. More specifically, FIGS. 19A to 19C are flowcharts of the profiling operation when the robot keeps in contact with the work object and FIGS. 20A and 20B are flowcharts when the robot separates from the work object. The flowchart of FIG. 19 is substantially the same as that of FIG. 14 of the first embodiment in which the vector $\vec{Oop}$ in direction of movement of the robot end at the start point of the profiling operation is provided from operator and thus corresponding parts are shown by like numerals. A difference between the flowcharts of FIGS. 19 and 14 is that the robot is stopped when reaction force F equals 0 in step S98 of FIG. 14, while, in FIG. 19, when $\vec{F}=0$ in step S98a, it is decided that the robot's hand passed a discontinuous point of the work object and separated from the object and then processes of FIGS. 20A and 20B are performed (the same in S111a).

A flowchart in which the end point PE of the profiling operation is provided from the operator as in FIG. 6 may be the same as that of FIG. 12 except that when reaction force F is 0 in step S63, the processes of FIGS. 20A and 20B are performed.

In FIGS. 20A and 20B, when the robot passes the discontinuous point and reaction force F is detected to be 0, the position Pi1 of the robot's end is detected and stored by the trajectory searching section in step S121, a robot stop command is issued from the control command generating section in step S122, and the robot is stopped by the robot controller in step S123. The stopped position Pi2 of the robot's end is detected and transferred to the trajectory searching section in step S124.

The hand coordinate system at the end stopped position Pi2 is transformed to the hand coordinate system at point Pi3 using equation (24) by trajectory searching section in step S125. Using equation (25) position Pi3 is calculated in step S126. Data on the position and attitude at Pi3 are transferred to the control command generating section in step S127. The control command generating section applies a command to move to position Pi3 to the robot controller in step S128 so that the robot's end is moved to position Pi3 in step S129. In step S130, the control command generating section generates a command of force in the opposite direction to vector $\vec{oi}$ and force control parameters, which are, in turn, transferred to the robot controller.

Upon receipt of the command the robot controller presses the robot in the direction opposite to vector $\vec{oi}$. The robot's end position is detected by the control command generating section in step S132. In step S133 a decision is made by the trajectory searching section as to whether or not the robot's end has passed $\vec{ni}-\vec{ai}$ plane. When the plane is not reached by the robot's end, reaction force F is detected by the control command generating section in step S134. In step S135 the trajectory searching section decides whether its absolute value is positive or not. When it is not positive, the robot's end has not come in contact with the work object yet. For this reason, the processes are repeated from step S131. When it is positive, the robot's end has been pressed against the work object. Thus, the operation returns to step S112 in which a decision is made as to whether or not the operator has instructed the robot to stop. When such an instruction is not issued yet, the processes are repeated from step S99.

When it is decided in step S133 that the robot's end has passed $\vec{ni}-\vec{ai}$ plane, on the other hand, the situation of FIG. 17B has been brought about. As a result, a robot stop command is issued from the control command generating section in step S136 so that the robot is stopped by the robot controller in step S137. In step S138 a command for torque in the direction of left-hand screw of vector $\vec{ai}$ and force control commands are generated by the control command generating section for transmission to the robot controller.

Upon receipt of the command the robot controller rotates the robot's end in step S139. Reaction force $\vec{F}$ is detected by the control command generating section in step S140 and a decision is made in step S141 by the trajectory searching section as to whether or not the absolute value of the reaction force $\vec{F}$ is positive. When it is not positive, the processes are repeated from step S139. When it is positive, on the other hand, the operation returns to the process in step S112.

It is, of course, possible to terminate the profiling operation when the end point is reached so as to perform the next operation in place of a termination instruction by the operator in step S112 of FIG. 19.

A third object of the present invention, that is, a position deviation compensating system for estimating, at a profile coordinate system setting point, a position deviation of the robot's end which may occur at the next coordinate system setting point from the curvature of a work object to keep a force applied to the work object constant will be described as a third embodiment of the present invention.

Figure 21:
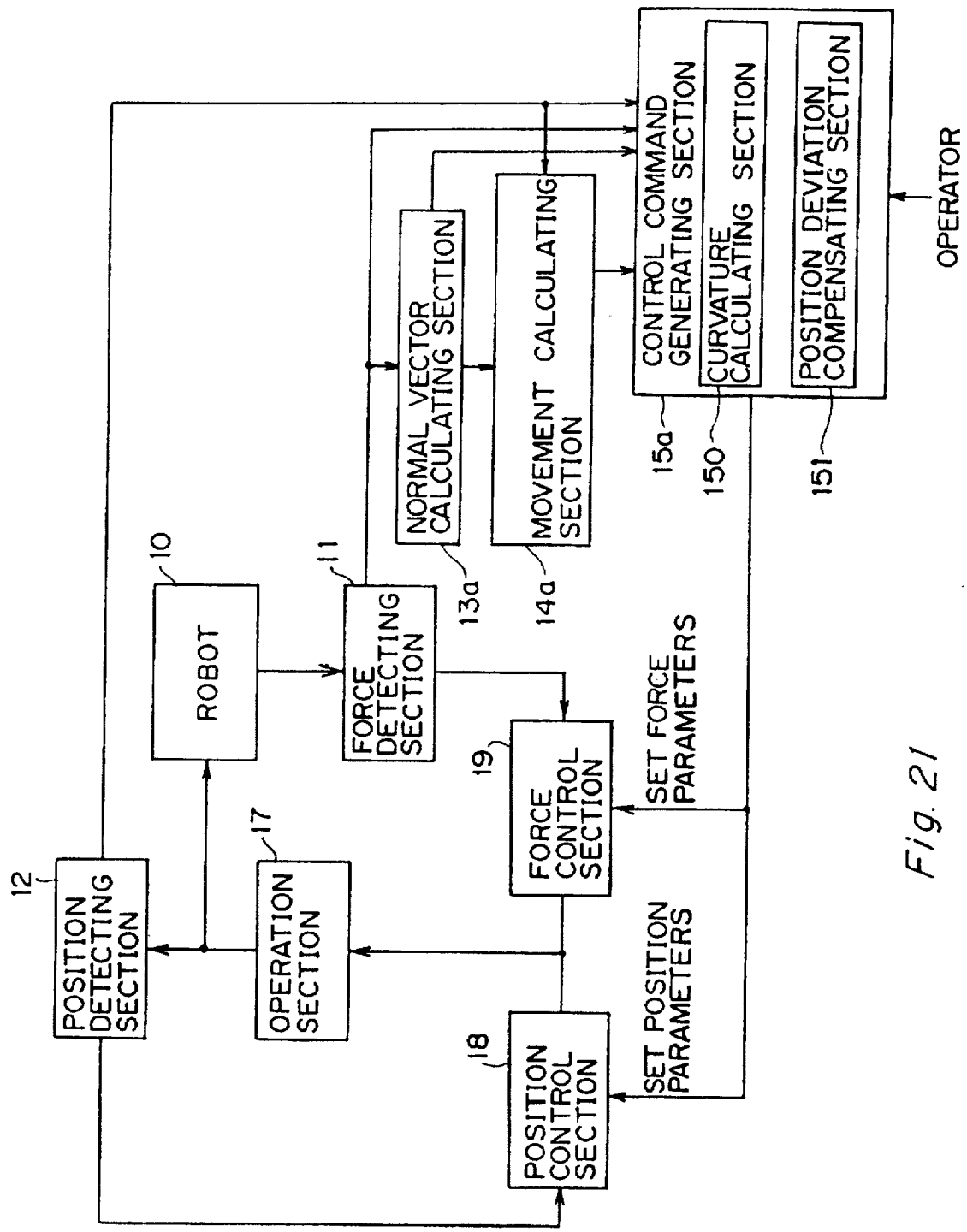
FIG. 21 is a basic block diagram of a third embodiment of the present invention.

FIG. 21 is a basic block diagram of the third embodiment of the present invention. In comparison with the basic block diagram of the first embodiment shown in FIG. 5, the third embodiment is substantially the same as the first embodiment except that control command generating section 15a involves a curvature calculating section 150 for calculating the curvature of a work object so as to estimate a position deviation of the robot's end from the curvature and a position deviation compensating section 151 for generating a force velocity command corresponding to the position deviation estimated from the curvature.

In the third embodiment, the setting of a profile coordinate system and the control of a profile operation are performed in the same manner as in the first embodiment. In the second and third embodiments, however, the position command and the force command are generated merely from a profile coordinate system at the current point to control the profiling operation. Therefore, a problem with the first and second embodiments is that, when profiling a surface with a large curvature, the robot will not follow a variation in the surface and a set force will not be held from a time of setting the profile coordinate system at the current point to a time of setting the next profile coordinate system.

Figure 22:
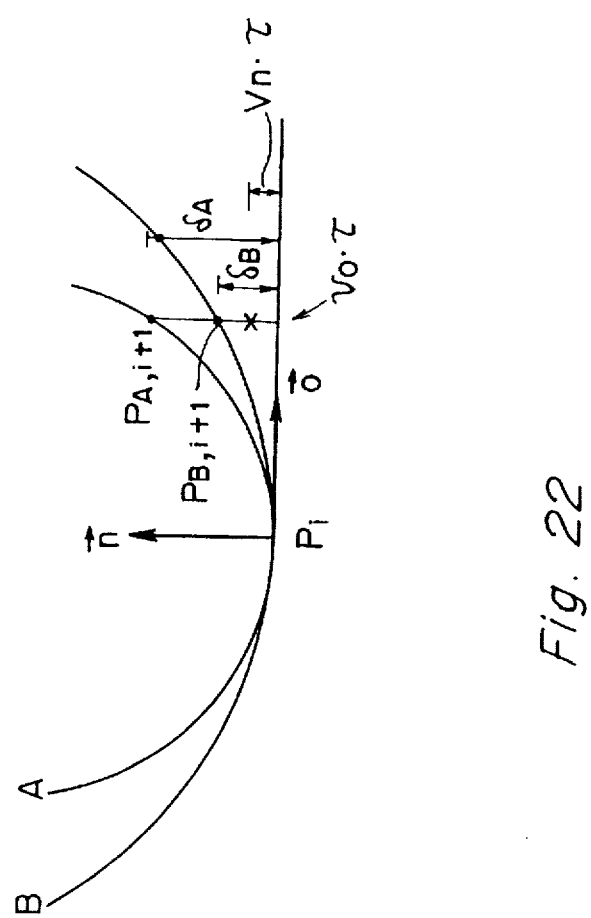
FIG. 22 is a diagram for use in explanation of a deviation of contact force from a set force.

FIG. 22 illustrates situations in profiling a surface A with a large curvature and a surface B with a small curvature at a constant velocity of movement. It is assumed that, as in FIG. 22, a profile coordinate system $\vec{n}$, $\vec{o}$ is set a point Pi on a work object and a force F is applied at point Pi. The robot's end moves in the direction of vector $\vec{o}$ up to vo τ at a constant velocity vo and is displaced in the direction of vector $\vec{n}$ up to a position which satisfies the balance of a spring system formed of the robot and the work object until the next sampling time τ. At this time, the robot's end moves up to point PA,i+1 on surface A and up to point PB,i+1 on surface B. The amounts of displacement to points PA,i+1 and PB,i+1 in the direction of vector $\vec{n}$ are assumed to be δA and δB, respectively. However, since a force velocity command v to compensate for a difference between a desired force and a contact force at point Pi is generated in the direction of vector $\vec{n}$, the effective amounts of displacement will be δA−vτ and δB−vτ. Assuming a spring constant of the spring system formed of the robot and the work object to be k, forces acting on the work object at points PA,i+1 and PB,i+1 in the direction of vector $\vec{n}$ will be F−k(δA−vτ) and F−k(δB−vτ), respectively. Since δA>δB, if the curvature of a surface is large, a deviation of a pressing force on the work object from a set force will also become large. Thus, if a work object having a curvature is profiled without taking a position deviation at the next contact point into consideration, a difference will be produced between a pressing force on the work object and a set force, depending on the magnitude of the curvature.

That is, if a profile coordinate system is set at a point at which the robot comes in contact with the work object at sampling intervals so as to instruct a correct direction of control, it becomes possible to hold a mechanical force between the robot and the work object constant at each of sampling points. If, however, a work surface varies to a large extent between sampling points as shown in FIG. 22, the contact force between the robot and the work object will deviate from a set force. In the third embodiment, therefore, a position deviation at the next sampling point is estimated from the curvature of a work surface and a force velocity command is generated which takes the estimated position deviation into account, to thereby control a mechanical force so that its deviation from the set force may be small.

Figure 23:
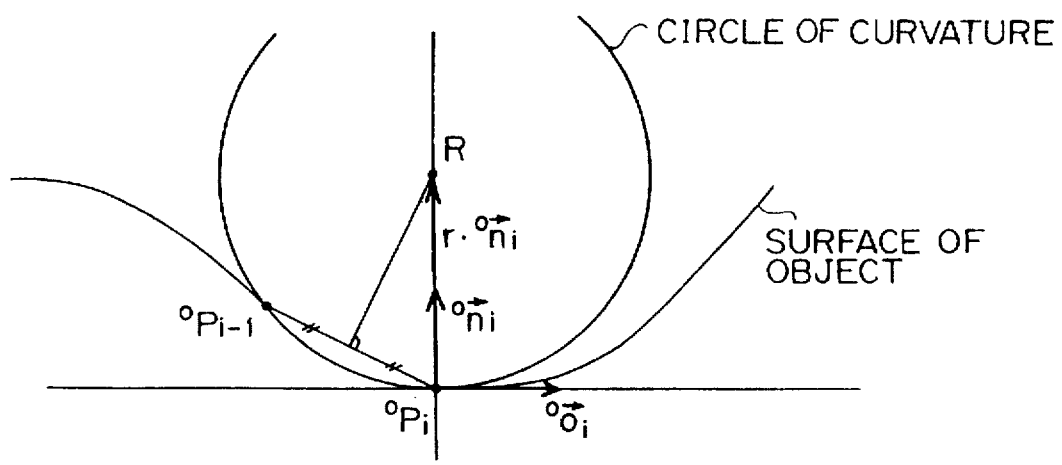
FIG. 23 is a diagram for use in explanation of a method of calculating the curvature of a surface of a work object.
Figure 24:
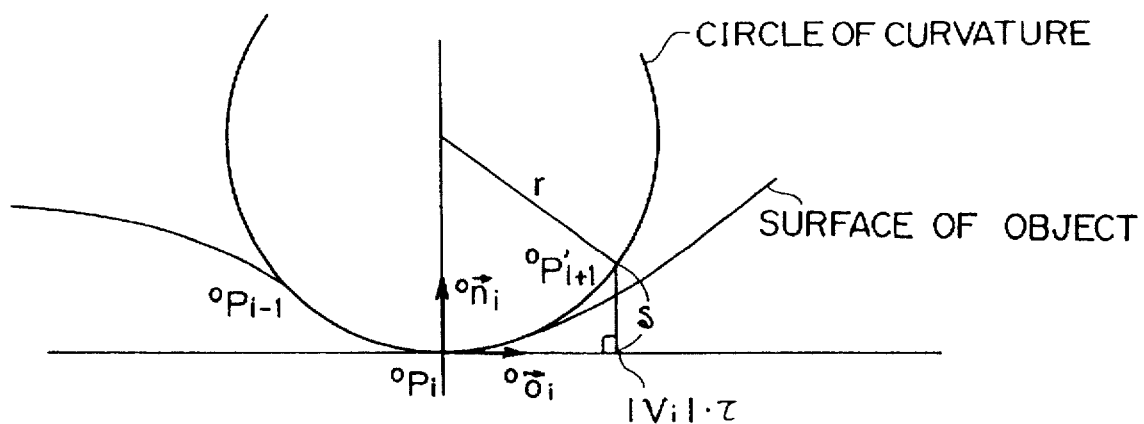
FIG. 24 is a diagram for use in explanation of a method of calculating a force velocity command.

FIG. 23 illustrates a method of calculating the curvature at point Pi. FIG. 24 illustrates a method of setting a force velocity command. Hereinafter a position deviation compensating apparatus for keeping contact force between a robot and a work object constant will be described with reference to FIGS. 21, 23 and 24.

(1) Calculation of the Curvature

For a work object having an unknown contour, the curvature up to a point at which the next sampling is made is estimated using information on the current point Pi and the point Pi−1 of one sampling step before. It is assumed here that the contour of the work object in the vicinity of points Pi and Pi−1 can be approximated by a sphere. Assuming the radius of the sphere to be r, the curvature κ is given by 1/r.

When the position vectors at points Pi and Pi−1 are $^o\vec{P}_i$ and $^o\vec{P}i-1$ and the normal vector at point Pi is $^o\vec{n}i$ as shown in FIG. 23, the curvature at point Pi will be found. Since it is assumed that the contour in the vicinity of point Pi can be expressed by a sphere, the center of a circle of curvature will be the intersection of normal vector $^o\vec{n}i$ and the perpendicular bisector of a line segment PiPi−1. The vector pointed from point Pi to center R of the circle of curvature will be represented, using normal vector $^o\vec{n}i$, to be ri, $^o\vec{n}i$ (ri is the radius of the circle of curvature at point Pi). It will be understood from FIG. 23 that the following relation hold.

$$\{r_i{}^o\vec{n}_i - ({}^o\vec{P}_i - {}^o\vec{P}_{i-1})/2\} \cdot ({}^o\vec{P}_i - {}^o\vec{P}_{i-1})/2 = 0 \tag{26}$$

Thus, the radius $r_i$ of the circle of curvature will be found to be $$r_i = \frac{1}{2} \cdot \frac{|{}^o\vec{P}_i - {}^o\vec{P}_{i-1}|^2}{{}^o\vec{n}_i \cdot ({}^o\vec{P}_i - {}^o\vec{P}_{i-1})} \tag{27}$$

$$\quad {}^o\vec{n}_i \cdot ({}^o\vec{P}_i - {}^o\vec{P}_{i-1})$$

where $^o\vec{n}i({}^o\vec{P}i - {}^o\vec{P}i-1)$ represents the inner product of vectors.

From equation (27) the curvature κ will be found to be $$\kappa = \frac{a}{r_i} = \frac{2 {}^o\vec{n}_i \cdot ({}^o\vec{P}_i - {}^o\vec{P}_{i-1})}{|{}^o\vec{P}_i - {}^o\vec{P}_{i-1}|^2} \tag{28}$$

(2) Position Deviation Compensating Apparatus

As indicated in FIG. 22, when the contact force at the current point agrees with the desired force, a force velocity command generated by a difference between the contact force and the desired force is zero. Thus, a deviation of the contact force in the direction of vector $\vec{n}$ from the set force at the next sampling point depends only on a displacement δ in the direction of vector $\vec{n}$ and the contact force varies from the set force by kδ. (k is a spring constant of the spring system formed of the robot and the work object.) It is therefore required to generate a force velocity command in the direction of the normal in such a way to cancel the estimated value δ of a displacement of force occurring after sampling time τ, which has been found on the assumption that the contour of the work object in the vicinity of points Pi, Pi−1 can be approximated by a sphere.

Assuming that δ is a force velocity command to be generated, τ is a sampling time and δ is a displacement in the direction of vector $\vec{n}$ after the sampling time, it is required to satisfy $$v_n \tau = \delta \tag{29}$$

A method of calculating a force velocity command to satisfy the above condition will be described using FIG. 24. In the Figure, the current position of the robot end is point Pi. If the robot travels from point Pi in the direction of vector $\vec{o}$ at a command velocity |Vo|, then the robot end will arrive at point Pi+1' on the circle of curvature (the estimated position at the time of the next sampling) after the next sampling time τ. A displacement δ in the direction of vector $\vec{n}$ which occurs when the robot arrives at Pi+1' will be found, using $r_i$ obtained in equation (27), to be $$\delta = r_i - \sqrt{r_i^2 - (V_o \tau)^2} \tag{30}$$

From equations (29) and (30) the force velocity command is given by $$v_n = (r_i - \sqrt{r_i^2 - (V_o \tau)^2}) / \tau \tag{31}$$

The force command velocity v is represented in vector form by $$\vec{^ov}_n = v_n {^o\vec{n}}_i \tag{32}$$

If a profile operation is performed using the command velocity $^o\vec{v}_n$ found by equation (32), it can be controlled in such a way that a deviation of a contact force working between the robot and the work object from a set force will not become large even during a time interval between sampling times.

The above calculation is performed by curvature calculating section 150 and position deviation compensating section 15 using the position of the robot end detected by position detecting section 12 of FIG. 21, the normal vector calculated by normal vector calculating section 13a, and the vector in direction of movement calculated by movement calculating section 14a.

The profile control apparatus according to the third embodiment is the same as that shown in FIG. 9 according to the first embodiment, inclusive of the position control section and the force control section of FIG. 10, except that control command generating section 40 incorporates curvature calculating section 150 for calculating the curvature at the current robot end position and position deviation compensating section 151 for calculating a force velocity command used to compensate for a position deviation estimated by the curvature. The system configuration of the profile control apparatus is also the same as that of FIG. 11 except that control command generating section 40 in host computer 37 contains the curvature calculating section and the position deviation compensating section.

Figure 25A:
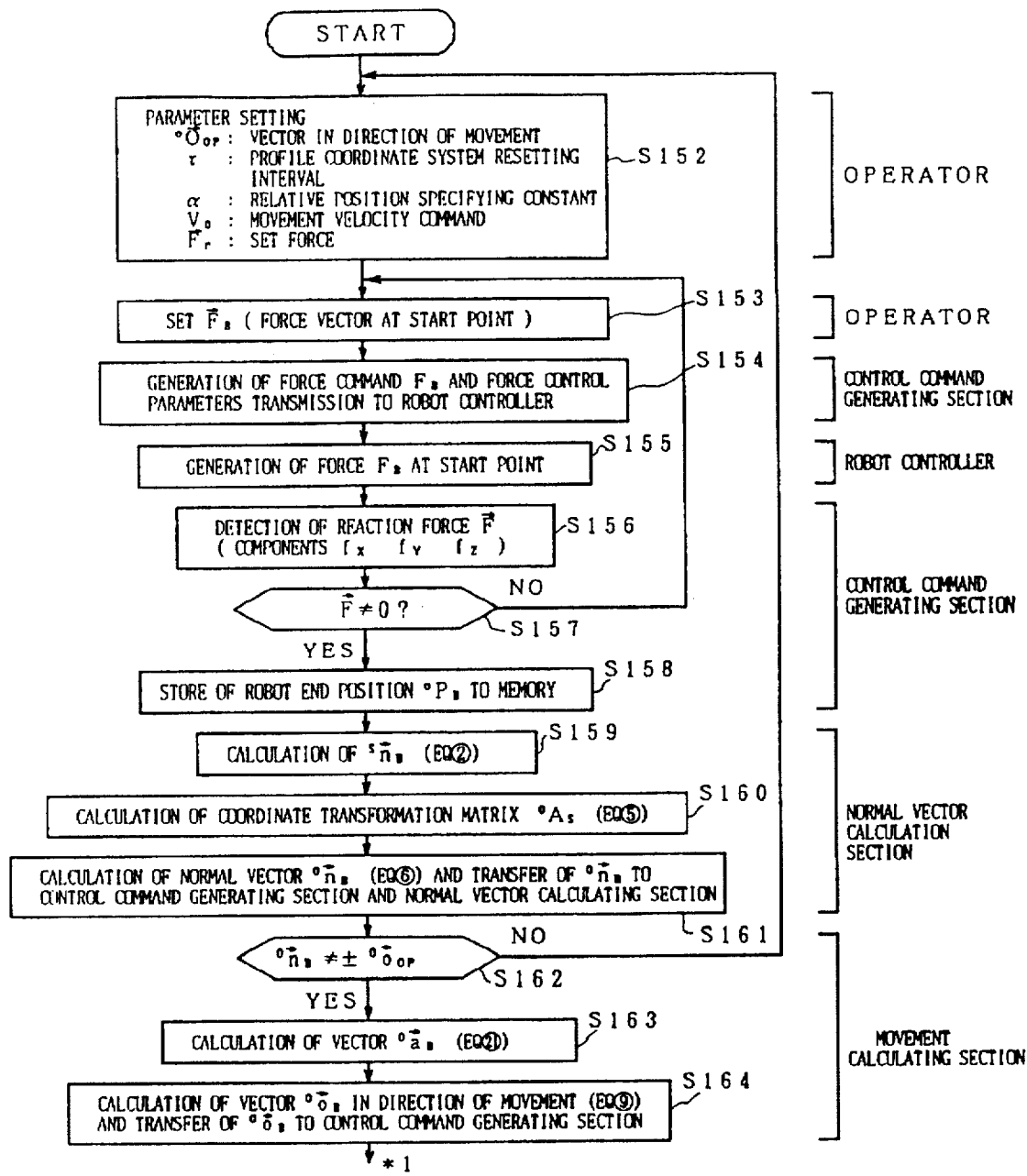
FIGS. 25A, 25B and 25C are flowcharts of a profiling operation in the third embodiment.
Figure 25B:
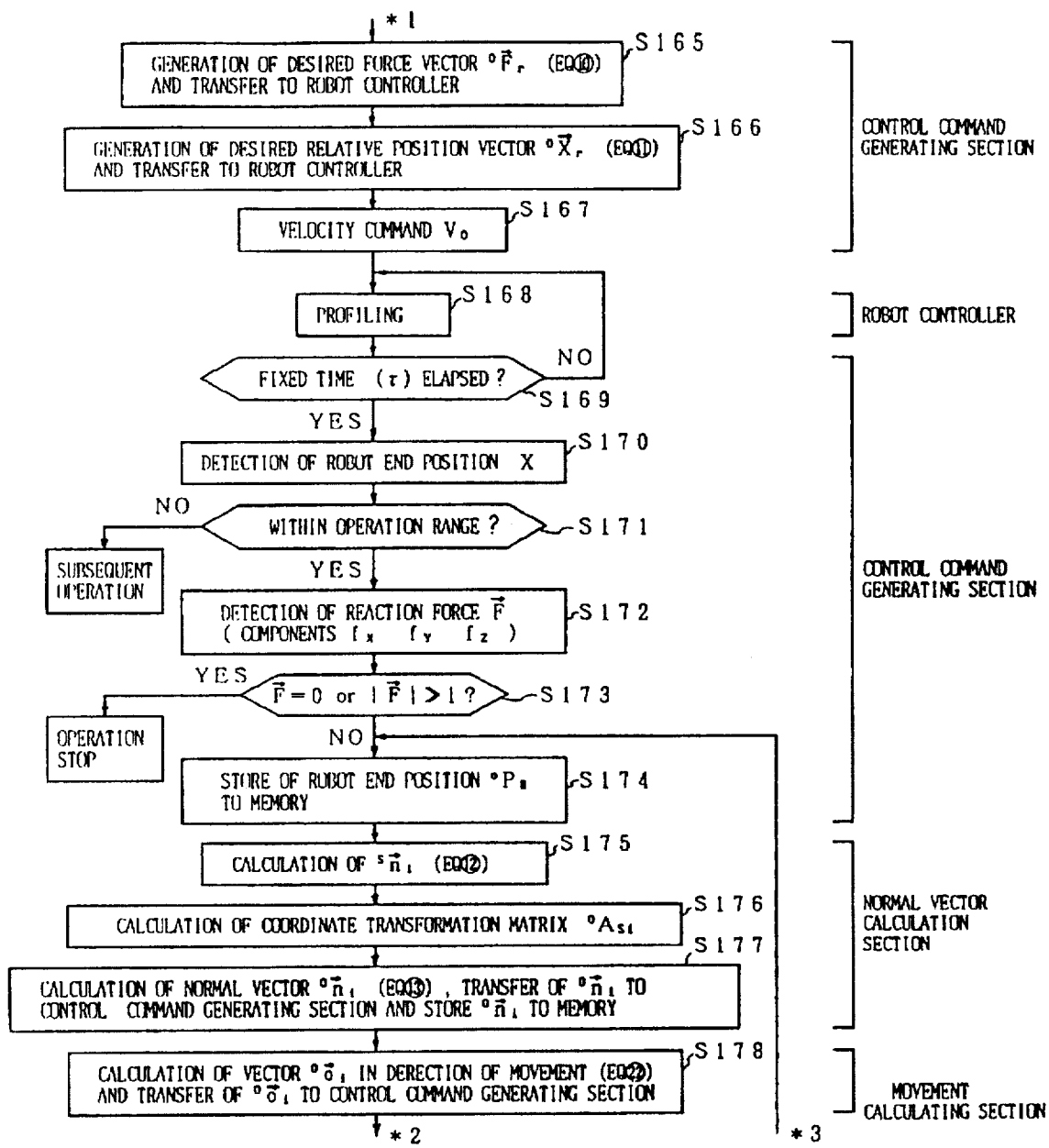
Figure 25C:
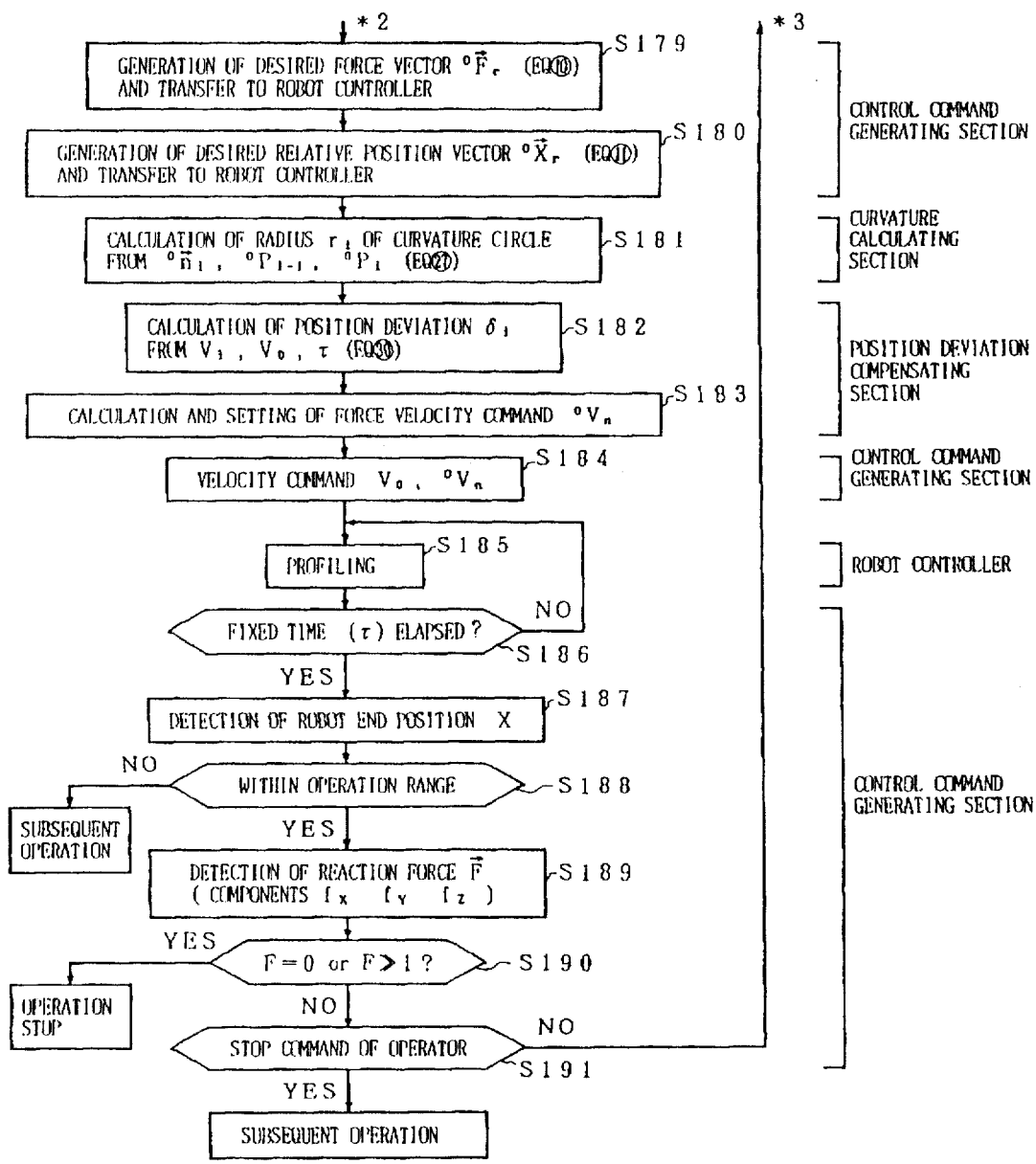

FIGS. 25A to 25C are flowcharts of a profile operation according to the third embodiment of the present invention. The flowchart is similar to that of the first embodiment shown in FIG. 14 and thus their differences will be described mainly. In FIGS. 25A to 25C, first, parameters are set in step S152 as in step S78 of FIG. 14 and then the same processes up to step S157 as those up to S78 in FIG. 14 are performed. In FIG. 25, to calculate the curvature, the robot end position PB is stored in a memory by the control command generating section prior to step S159 corresponding to step S84 in FIG. 14. In step S174 as well, the robot end position $\vec{Pi}$ is stored in the memory prior to the step corresponding to step S99 of FIG. 14. In step S177 corresponding to step S101 of FIG. 14, in addition to that normal vector $^o\vec{ni}$ is calculated and transferred to the control command generating section, it is stored in the memory.

In FIGS. 25A to 25C, the compensation for position deviation is performed by the curvature calculating section and the position deviation compensating section after step S180 corresponding to step S104 in FIG. 14. That is, in step S181, the radius of a circle of curvature is calculated in accordance with equation (27) using normal vector $^o\vec{ni}$, the robot end position of one sampling step before and the current robot end position. In step S183, a position deviation is calculated by the position deviation calculating section using equation (30). In step S183, a force velocity command $^o\vec{V}n$ is set using equation (32), and, in step S184, $^o\vec{V}n$ is commanded by the control command generating section in addition to Vo in step S105 of FIG. 14. The subsequent processes are the same as those in FIG. 14. The processes are repeated from step S174 until a termination instruction by the operator is detected in step S191.

It is, of course, possible to decide whether or not the end point of the profile operation is reached in place of the decision of the termination instruction by the operator in step S191.

A fourth object of the present invention, that is, a profile control system for performing a profiling operation while exerting a fixed force on a side surface of a work object having an unknown rectangular shape will be described as a fourth embodiment.

Figure 26:
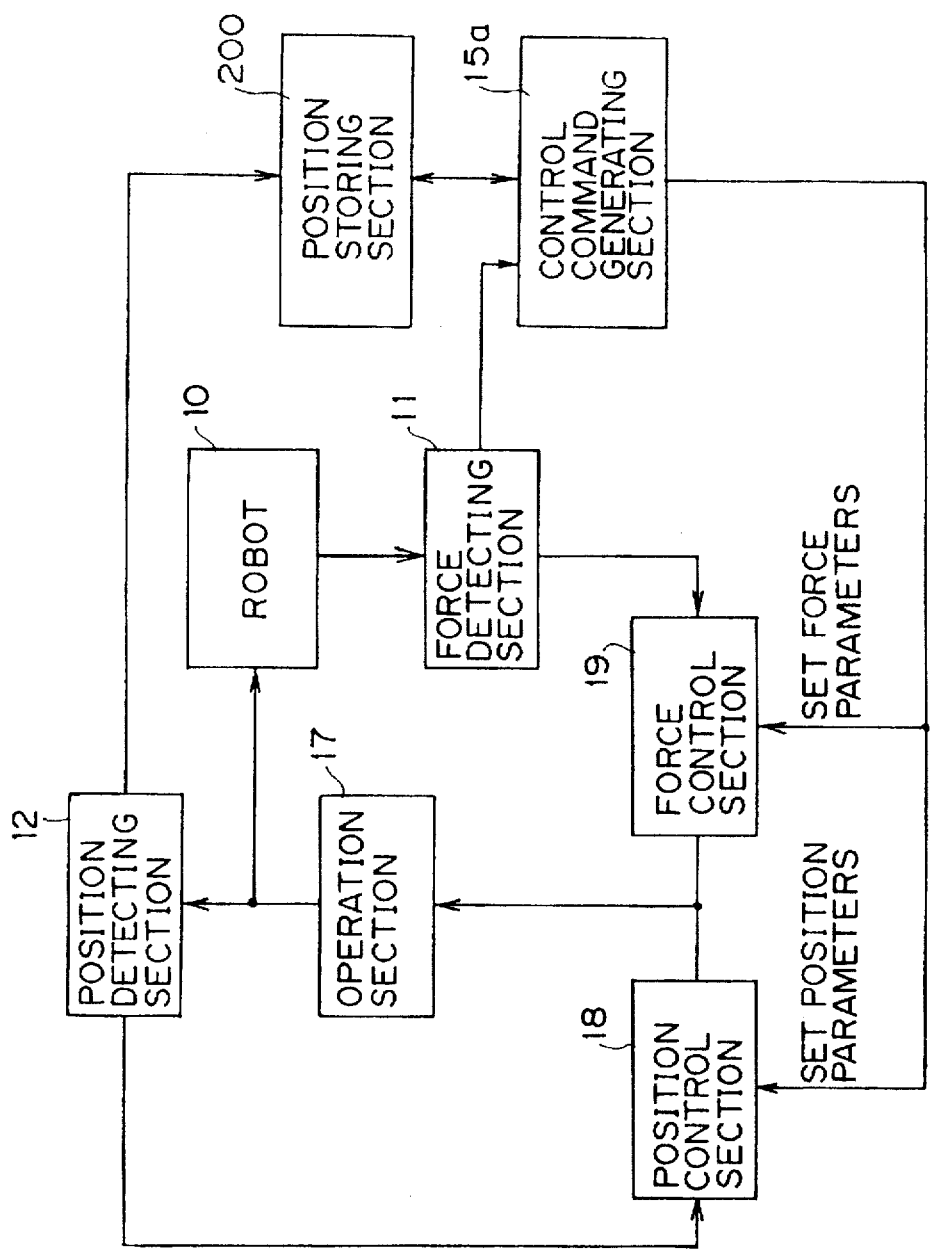
FIG. 26 is a basic block diagram of a fourth embodiment of the present invention.

FIG. 26 is a basic block diagram of the fourth embodiment of the present invention. In comparison with the first embodiment of FIG. 5, the fourth embodiment is provided with a position storing section 200 which is responsive to a command generated by control command generating section 15a when force detected by force detecting section 11 becomes approximately 0 to store a robot end position detected by position detecting section 12 in place of normal vector calculating section 13a and vector in direction of movement calculating section 14a.

Figure 27:
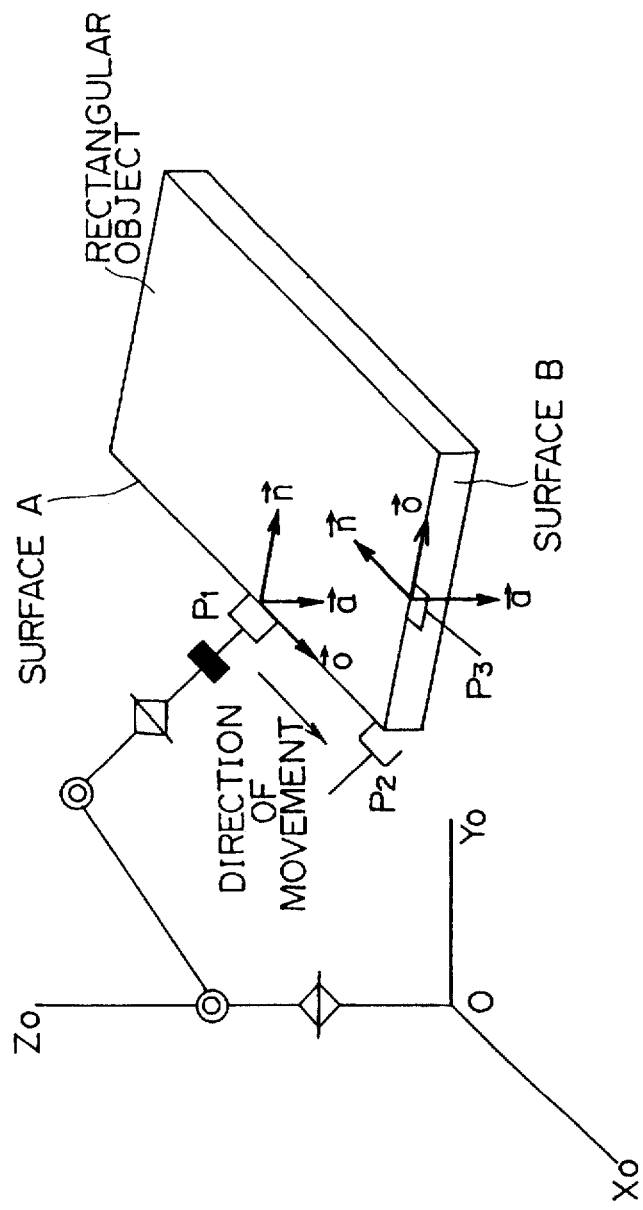
FIG. 27 is a diagram illustrating a relation between a work object and a manipulator in the fourth embodiment.

FIG. 27 illustrates a relation in position between a work object and a robot's manipulator. In the Figure P1, P2 and P3 designate respective positions of the robot's end. In performing a profile operation on a side surface A of a rectangular object in FIG. 27, a profile coordinate system is defined by a vector $\vec{n}$ perpendicular to the side surface and vectors $\vec{o}$ and $\vec{a}$ parallel to the side surface.

The profile coordinate system set in the position P1 in FIG. 27 needs not be altered so long as the profile operation is performed on the side surface A. However, since the profiled surface is changed from surface A to surface B when the robot moves from position P1 to position P2, the profile coordinate system also needs to be changed to a coordinate system for position P3.

Figure 28:
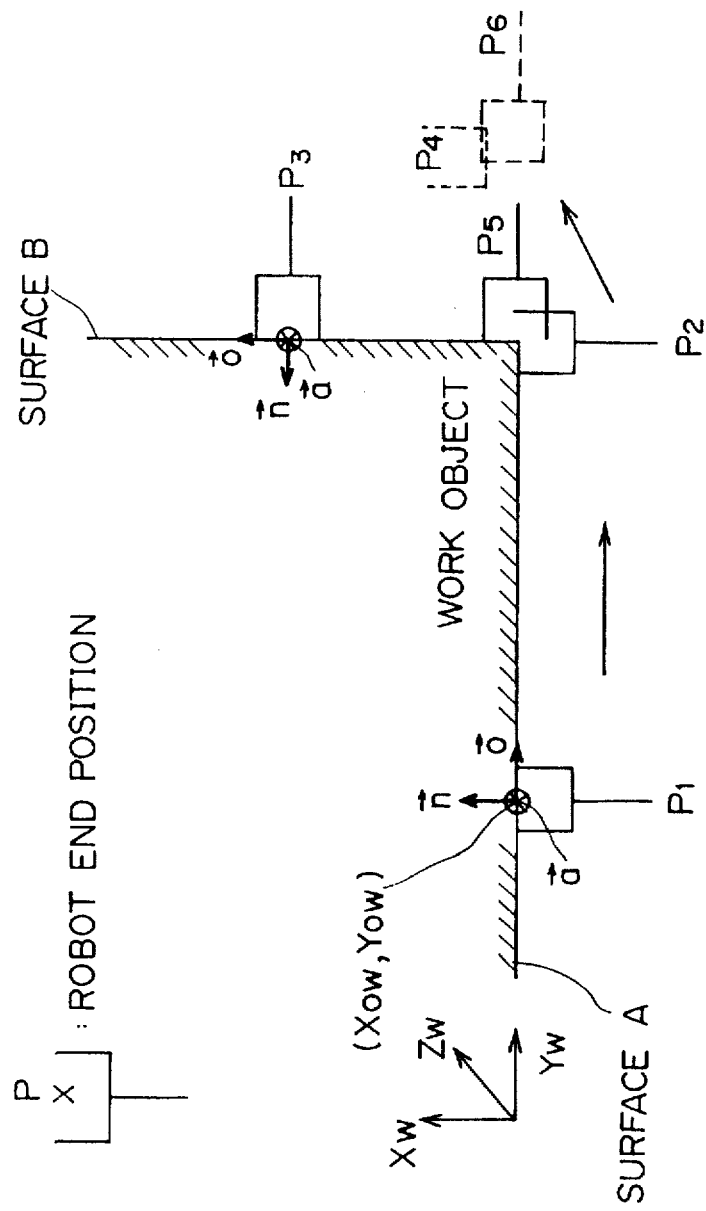
FIG. 28 is a diagram for use in explanation of a profile operation in the fourth embodiment.

FIG. 28 illustrates a profile operation. In the Figure, $\vec{a}$ is pointed downward in the direction perpendicular to the drawing paper. The Figure is a view of the work object seen from above (from the direction perpendicular to surfaces A and B) and illustrates how the robot operates in the vicinity of position P2.

Figure 29A:
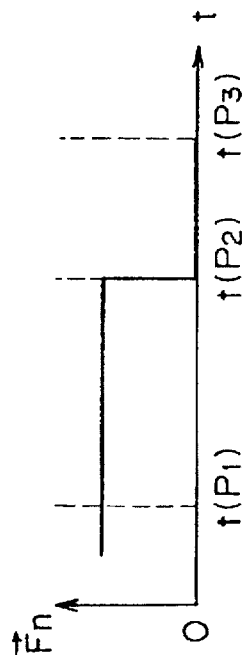
FIGS. 29A, 29B and 29C illustrate time responses of the force and position in the profile operation in the fourth embodiment.
Figure 29B:
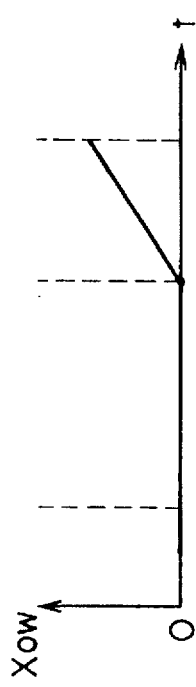
Figure 29C:
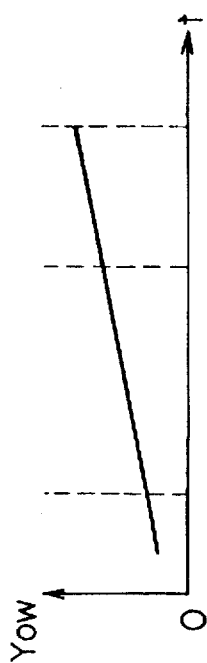

FIGS. 29A to 29C illustrate time responses of force and position at the time of a profile operation. In the Figure, t(P1), t(P2) and t(P4) represent times at which the robot arrives at positions P1, P2 and P4. As opposed to FIG. 17 of the second embodiment, in FIG. 28, the position of the robot's end is defined by the center of the hand holder.

FIGS. 29A to 29C illustrate: the time hysteresis of a pressing force $\vec{F}n$ in the direction of $\vec{n}$ and the robot end positions (Xow, Yow) at the time of the profile operation on surface A. (Coordinates of Zw axis are omitted.)

FIG. 26 is a block diagram of a control system of a force control robot for changing the profile coordinate system described in position P1 to the profile coordinate system described in position P3 and changing the robot attitude from P2 to P3. A control method of permitting the robot to perform a profiling operation on a rectangular object will be described below in conjunction with FIGS. 26, 28 and 29.

As shown in FIG. 28, it is assumed that the robot arrives at position P2 at time t(P2) while performing profiling operation on surface A from P1 to P2. There is no object on the right-hand side of position P2. At this point the control command is not altered. Thus, the robot is going to move in the direction of n so as to generate the pressing force in the direction of $\vec{n}$. Since there is also a component of movement in the direction of $\vec{o}$, the robot will move from position P2 to position P4 in the end. At this point, the pressing force $\vec{F}n$ in the direction of $\vec{n}$ detected by force detecting section 11 of FIG. 26 exhibits such a time response as shown in FIG. 29A. That is, the pressing force has a fixed magnitude during a period of time when the robot profiles surface A while moving from P1 to P2 and it becomes 0 due to the absence of the reaction force when the robot arrives in position P2 in which there is no object. The time responses of the robot end position Ow (Xow, Yow) detected by position detecting section 12 of FIG. 26 are shown in FIG. 29A, B. As seen, the robot also moves in the direction of Xw upon arrival in position P2. Note that the robot is assumed to move at a constant velocity in the directions of Xw and Yw.

Control command generating section 15a of FIG. 26 stores the coordinates of position P2 (Xow, Yow indicated by dots in FIG. 29B, C) and issues a command to stop the robot immediately upon detection of such a variation in force as shown in FIG. 29A. Upon receipt of the stop command, position control section 18 and force control section 19 stop the robot. At this point the position of the robot is P4.

To change the profile coordinate system from the one at P1 to the one at P3 and change the robot attitude from P2 to P5, the robot has only to be rotated clockwise through −90 degrees around vector $\vec{a}$. Thus, by multiplying the profile coordinate system $[\vec{n}p1, \vec{o}p1, \vec{a}p1]$ by a rotatory coordinate system E for the profile coordinate system Xw, Yw and Zw, the profile coordinate system $[\vec{n}p3, \vec{o}p3, \vec{a}p3]$ at P3 will be found to be $$[\vec{n}_{p3}, \vec{o}_{p3}, \vec{a}_{p3}] = E^{K(-\pi/2)} [\vec{n}_{p1}, \vec{o}_{p1}, \vec{a}_{p1}] \quad (33)$$

$$= \begin{bmatrix} 0 & 1 & 0 \\ -1 & 0 & 0 \\ 0 & 0 & 1 \end{bmatrix} [\vec{n}_{p1}, \vec{o}_{p1}, \vec{a}_{p1}]$$

The change of the robot attitude from P2 to P5 will also obtained by performing the same operation on the hand coordinate system describing the robot end.

When the profile coordinate system at P3 and the robot attitude at P5 are obtained, control command generating section 15a of FIG. 26 sets necessary parameters in position control section 18 and force control section 19. Next, the robot attitude is changed so as to correspond with the newly set coordinate system and the robot is moved until its position in the direction of Xw comes to correspond with Xow at the dot in FIG. 29B stored in position storage section 200 (position P6). Next, the robot is pressed in the direction of −Yw and, when the set force is reached (position P5), the profile operation on surface B is resumed.

By performing the above operation on the other corners, the four surfaces of the object can be profiled. For simplicity, the above description was made on the basis of the profile coordinate system Ow −Xw, Yw, Zw. However, if the profile coordinate system is transformed to the reference coordinate system as described above, the description can be made likewise on the basis of the reference coordinate system.

Figure 30:
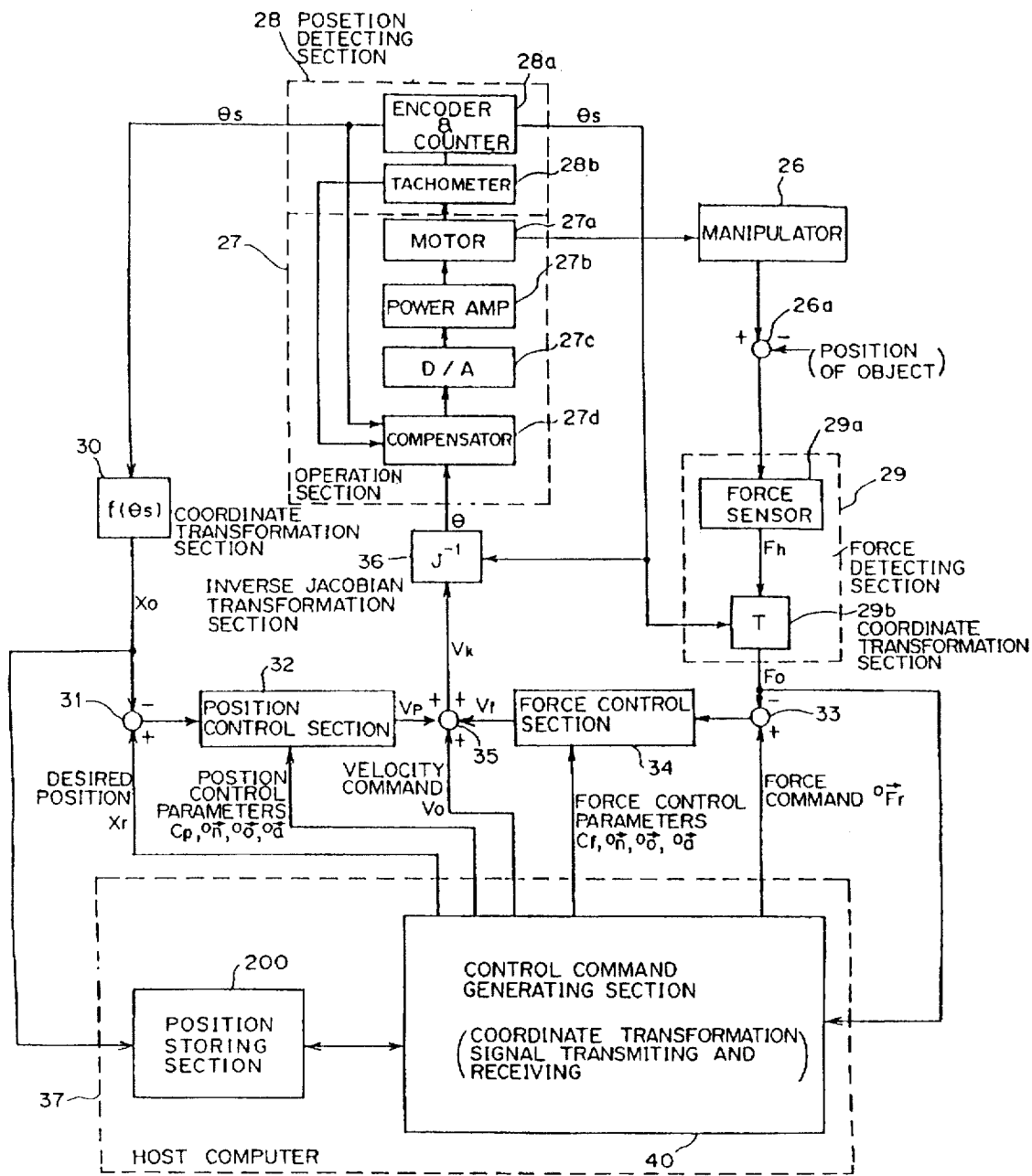
FIG. 30 is a block diagram of the robot profile control apparatus in the fourth embodiment.

FIG. 30 is a block diagram of a control apparatus according to the fourth embodiment of the present invention. In comparison with the control apparatus according to the first embodiment shown in FIG. 9, in the fourth embodiment, host computer 37 is provided with position storage section 200 for storing the robot end position using the output of coordinate transformation section 30 in place of normal vector calculating section 38 and vector in direction of movement calculating section 39. Position control section and force control section 34 of FIG. 30 are also the same as those in FIG. 10 in the first embodiment.

Figure 31:
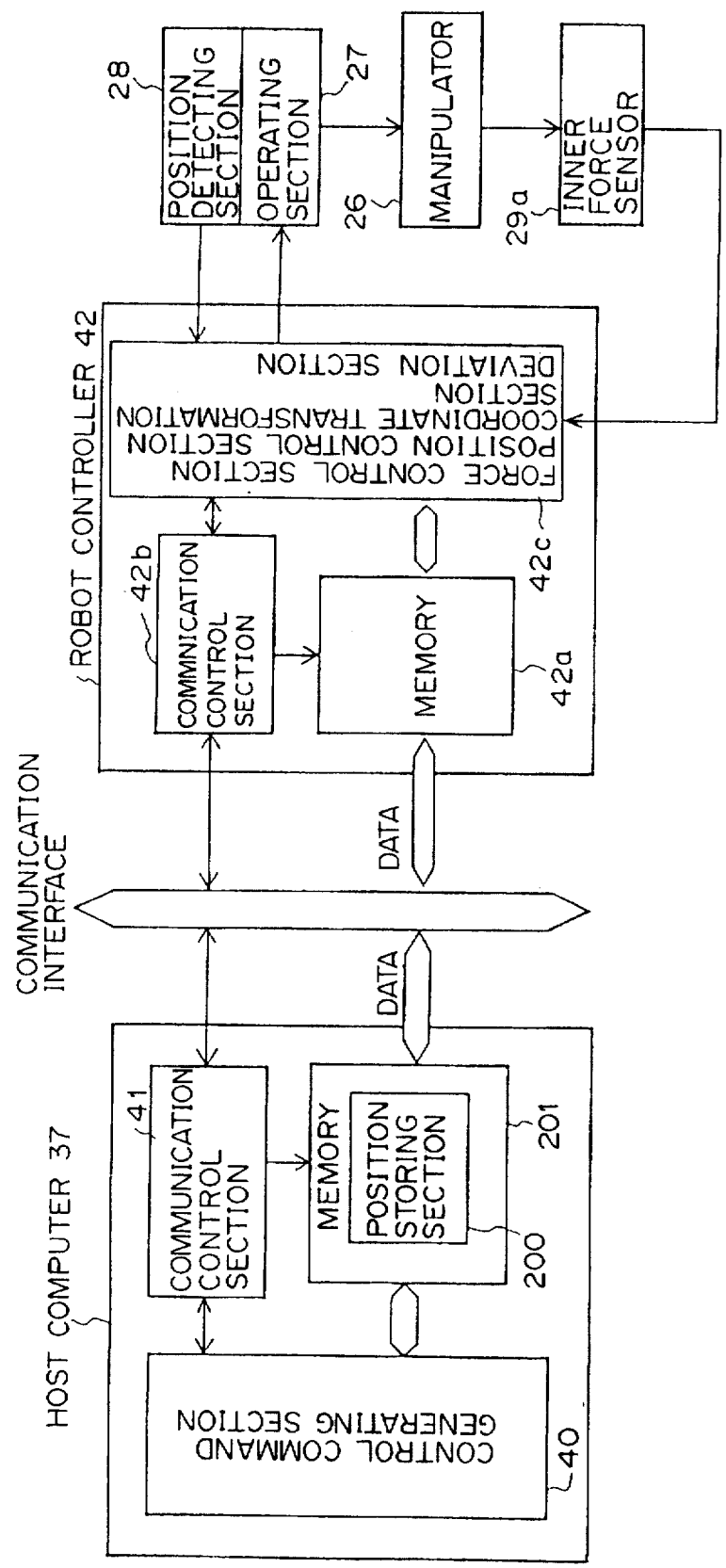
FIG. 31 illustrates a system configuration of the profile control apparatus in the fourth embodiment.

FIG. 31 illustrates a system configuration of the profile control apparatus according to the fourth embodiment. In comparison with FIG. 11 of the first embodiment, the host computer of the fourth embodiment is provided with memory 201 having position storage section 200 in place of normal vector calculating section 38 and of movement calculating section 39.

Figure 32A:
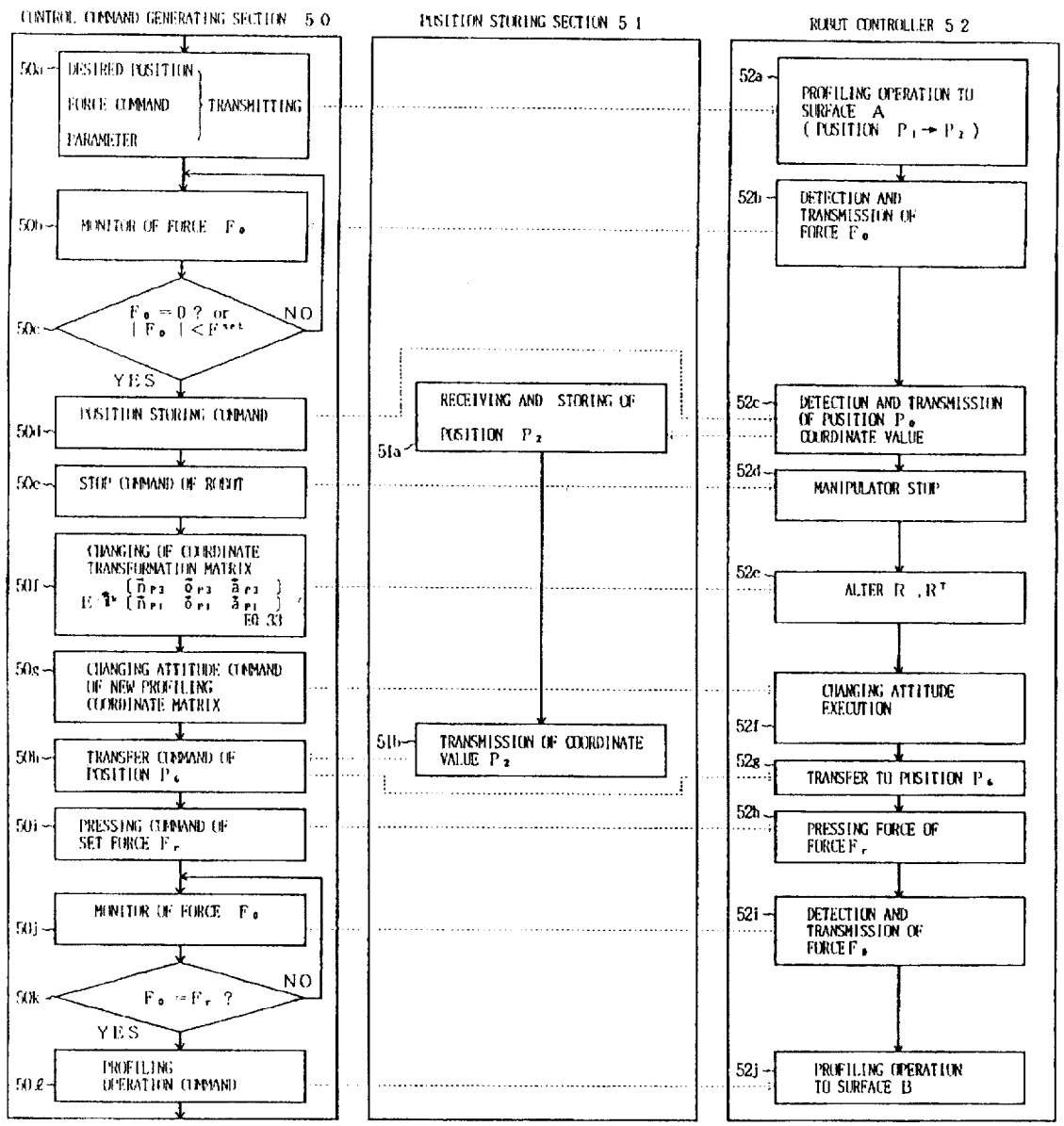
FIGS. 32A, 32B and 32C are flowcharts of the profiling operation in the fourth embodiment.
Figure 32B:
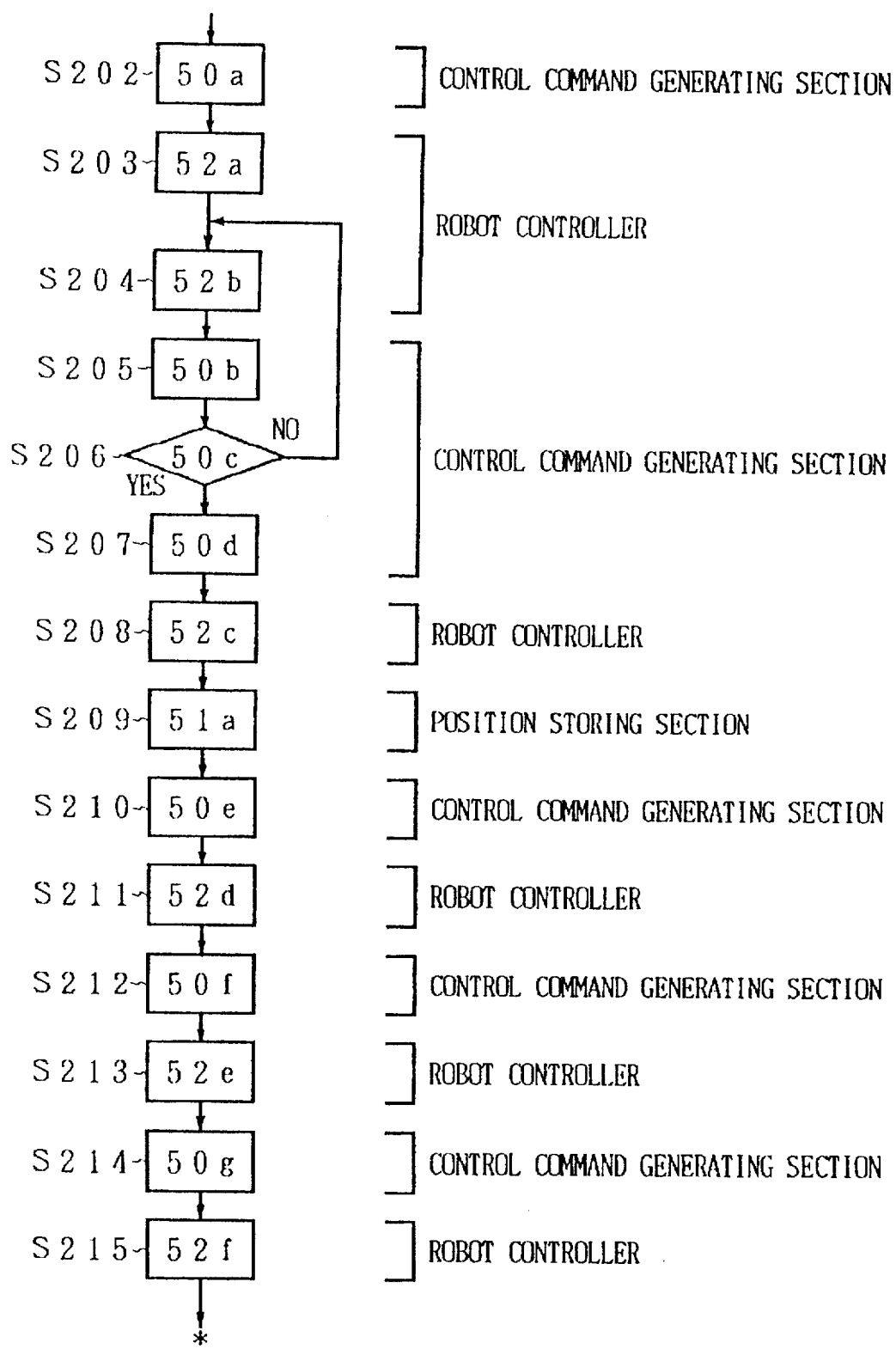
Figure 32C:
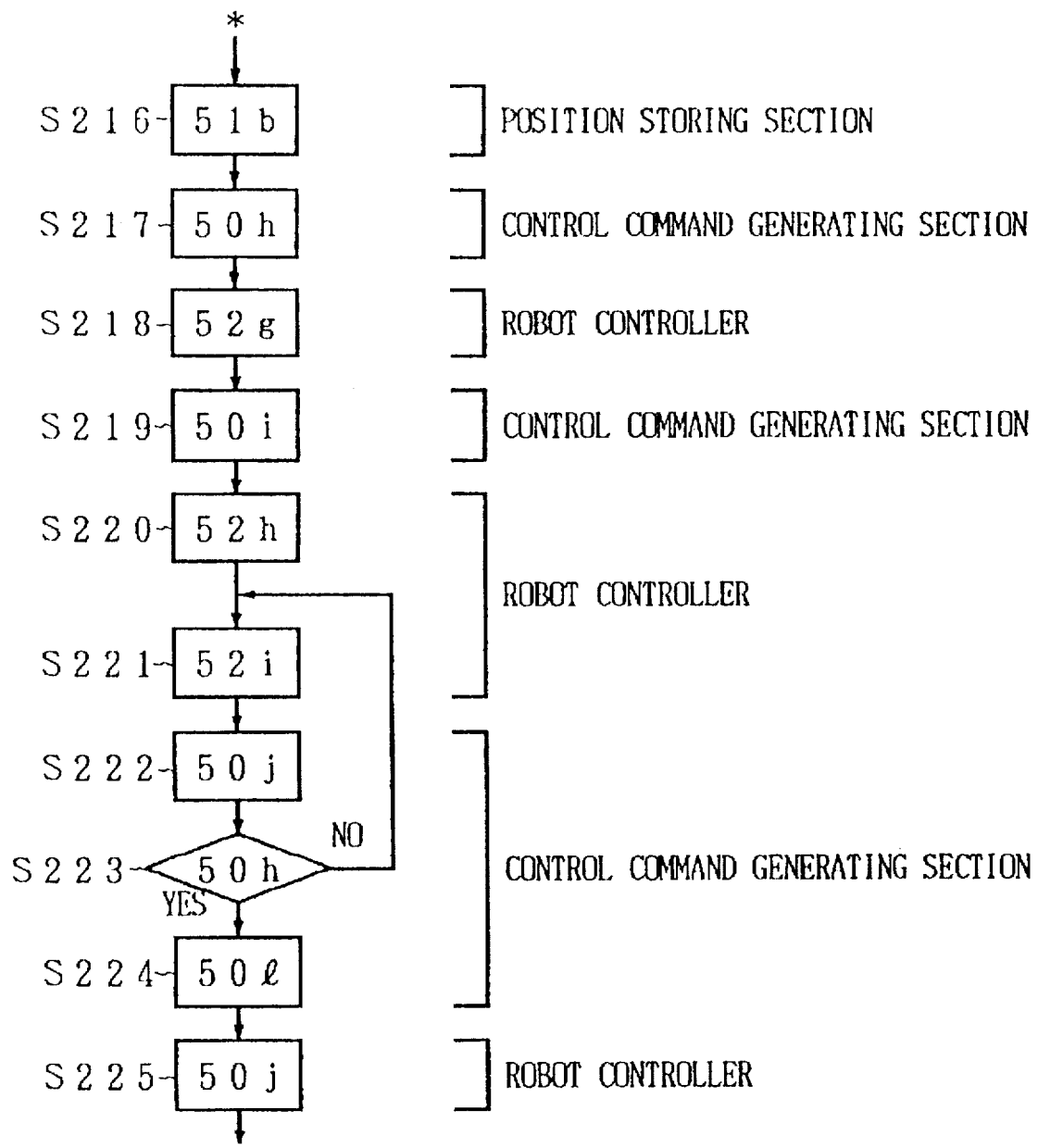

FIGS. 32A to 32C illustrate, in flowchart form, the flow of processes performed by control command generating section 40, position storage section 200 and robot controller 42 in host computer 37 of the fourth embodiment. In the following description, the method of changing the robot from position P2 to position P5 of FIG. 28 will be detailed. The description of how to move the robot end to position P1 for the profiling operation on surface A is omitted.

When the hand attached to the manipulator performs profile operation on surface A in position P1 as shown in FIG. 28, the process in step S202 has already been terminated and steps S203 and S204 are being processed by the robot controller.

Control command generating section 40 monitors pressing force Fo of the hand, which is transmitted from the robot controller in step S204, in step S205 and decides whether the reaction force is zero or not, namely, whether or not the hand arrived in position P2 in which there is no reaction force from the work object in step S206. In view of an error this decision may be made depending on whether or not the absolute value Fo of Fo is smaller than Fset (<1). When it is decided that the robot arrived in position P2 because of the absence of the reaction force (Fo=0), control command generating section 40 transfers the coordinates of position P2 detected by position control section 28 and coordinate transformation section 30 in the robot controller to position storage section 200 in step S207. Position storage section 200 accepts and stores the coordinates of the position P2 in step S209. Next, control command generating section 40 issues a force command Fr=0, a velocity command V0=0 and a desired position command Xr=the current position in step S210 and the manipulator is stopped by robot controller 42 in step S211. After the stop of the manipulator control command generating section 40 changes the coordinate transformation matrix R in accordance with equation (33) and transmits it to robot controller 42 in step S212. Robot controller 42 alters R, RT in position control section 32 and force control section 34 in step S213. The control command generating section calculates the attitude of the hand in according with the newly set profile coordinate system and sends a desired position Xr and a velocity command Vo to the robot controller in step S214. Responsive to the desired position Xr and the velocity command Vo the robot controller 42 changes the attitude of the hand and manipulator in step S215. Next, control command generating section 40 receives the coordinates (Xow, Yow, Zow) of position P2, which have been stored in position storage section 200 in step S209, in step S216 and issues a command to robot controller 42 to move to position P6 in step S217. After the stop of movement in step S218 control command generating section 40 issues a force command Fr and a velocity command Vo to robot controller 42 to press surface B at the set force Fr in step S219. After the commands have been issued, in step S222, control command generating section 40 monitors a force supplied from robot controller 42 in step S221 after the pressing in step S220. When it is decided in step S223 that the pressing force Fo has reached the set force Fr, the profiling operation command is issued again in step S224. Consequently a profiling operation is performed on surface B by robot controller 42 in step S225.

By repeating the above operation, the profiling operation can be performed on other surfaces.

A fifth object of the present invention, that is, a profiling operation control system for a work object in which a surface for the next profiling operation makes an acute angle with another surface, will be described as a fifth embodiment of the present invention.

Figure 33:
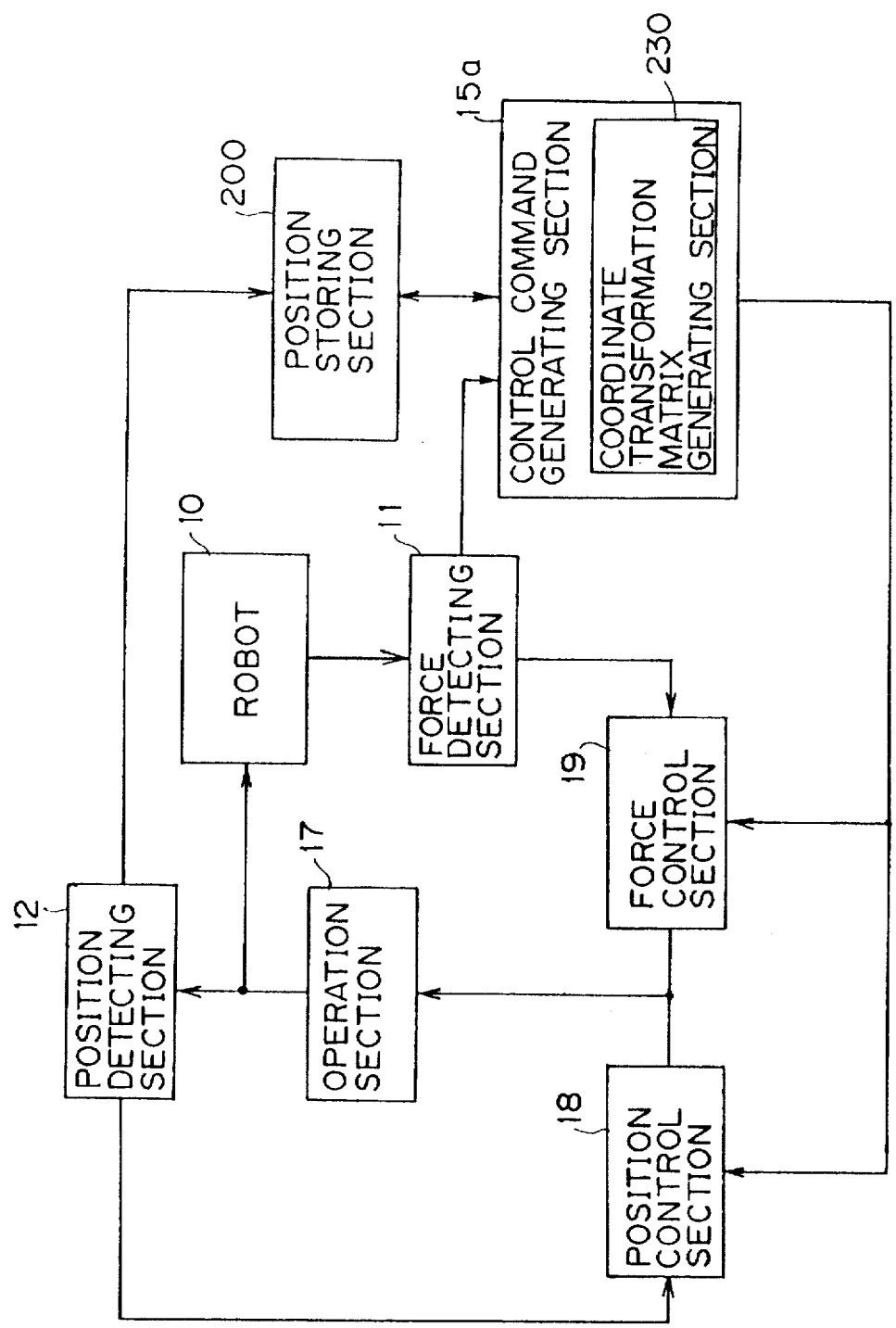
FIG. 33 is a basic block diagram of a fifth embodiment of the present invention.

FIG. 33 is a basic block diagram of the fifth embodiment. In comparison with the fourth embodiment in FIG. 26, the fifth embodiment is provided with a coordinate transformation matrix generating section 230 in control command generating section 15a.

Figure 34:
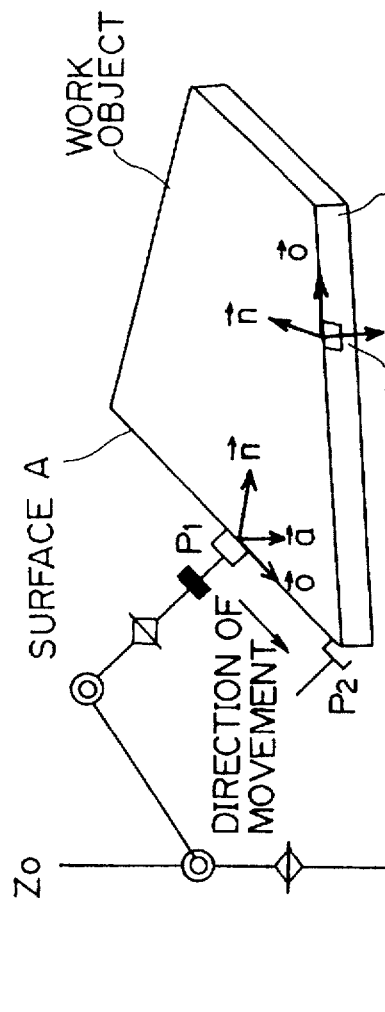
FIG. 34 is a diagram illustrating a position relation between a work object and a manipulator in the fifth embodiment.

FIG. 34 illustrates a relation in position between a work object having an acute angle and manipulator. In the Figure, the angle made by surface A and surface B is an acute angle and P1, P2 and P3 represent robot end positions.

The profile coordinate system when the robot performs an profiling operation on a surface (for example, surface A) is set as shown in position P1 of FIG. 34. As shown, vector $\vec{n}$ is perpendicular to the surface, while vectors $\vec{o}$ and $\vec{a}$ are parallel to the surface.

The profile coordinate system set in position P1 of FIG. 34 needs not be altered so long as surface A is profiled. However, when the robot moves from position P1 to position P2, the profile coordinate system needs to be changed to the one set in position P2 because the profiling surface is changed from surface A to surface B.

Figure 35:
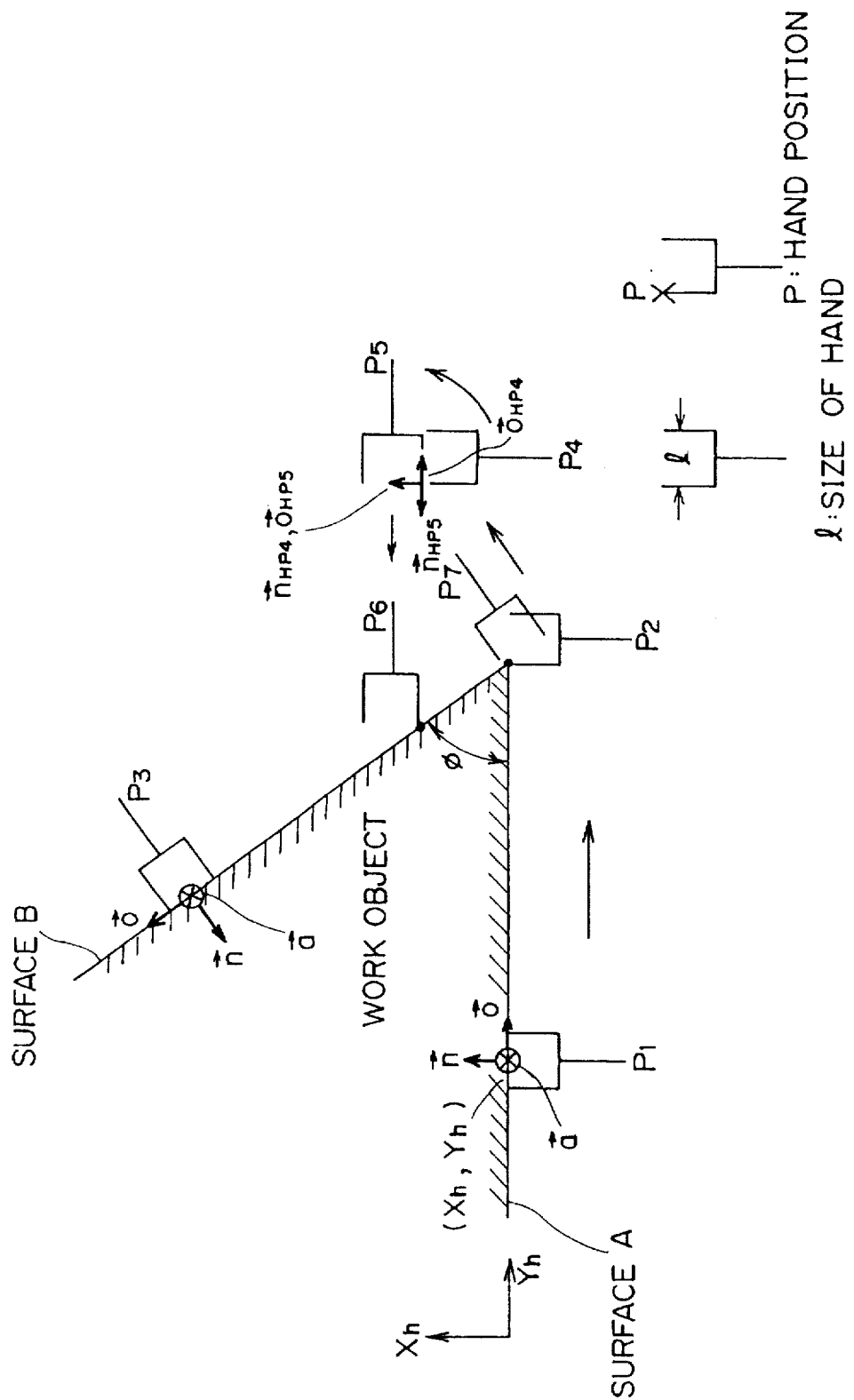
FIG. 35 is a diagram for use in explanation of a profile operation in the fifth embodiment.

FIG. 35 illustrates the profiling operation. FIG. 35 is a view of the work object seen from above (from the direction normal to surfaces A and B) and illustrates how the robot operates in the vicinity of position P2.

FIG. 36 illustrates time responses of force and position at the time of profiling operation. FIG. 36 illustrates time hysteresis of the pressing force $\vec{F}n$ in the direction of n and the robot's hand position (Xh, Yh) at the time of profiling operation on surface A. t(P1), t(P2), t(P4), t(P5) and t(P6) are times of arrival of the robot in positions P1, P2, P4, P5 and P6. The hand position corresponds with that of FIG. 17 in the second embodiment.

FIG. 33 is a block diagram of a force control robot control system for changing the profile coordinate system described in position P1 to the profile coordinate system in position P3 and changing the attitude of the robot from P2 through P7 to P3. A control method for performing an profiling operation on a work object having an acute angle will be described below in conjunction with FIGS. 33, 35 and 36.

First, the position (Xh, Yh) of the hand at start point P1 of the profiling operation is stored in position storage section 200 of FIG. 33. It is assumed that the robot arrived in position P2 at time t(P2) as the result of profiling operation from P1 to P2 as shown in FIG. 35. There is no object on the right-hand side of position P2. At this time the control command is not altered so that the robot keeps moving in the direction of $\vec{n}$ so as to generate pressing force in the direction of $\vec{n}$. Since there is 10 also a component of movement in the direction of $\vec{o}$, the robot will move from position P2 to position P4 in the end. At this point, the pressing force $\vec{F}n$ in the direction of $\vec{n}$ detected by force detecting section 11 of FIG. 33 exhibits such a time response as shown in FIG. 36(a). That is, the pressing force has a fixed magnitude during a period of time (t(P1)–t(P2)) when the robot profiles surface A while moving from P1 to P2 and it becomes 0 due to the absence of the reaction force when the robot arrives in position P2 in which there is no object. The time responses of the robot hand position (Xh, Yh) detected by position detecting section 12 of FIG. 33 are shown in FIG. 36 A, B. As seen, the robot will also move in the direction of Xh upon arrival in position P2. Note that the robot is assumed to move at a constant velocity in the directions of Xh and Yh.

Control command generating section 15a of FIG. 33 stores the coordinates of hand position P2 (Xh, Yh indicated by dots in FIG. 36 B, C) and issues a command to stop the robot immediately upon detection of such a variation in force ($\vec{F}n=0$) as shown in FIG. 36A. Upon receipt of the stop command, position control section 18 and force control section 19 stop the robot. At this point the position of the robot is P4.

To change the robot attitude from P2 to P5, the hand has only to be rotated clockwise through $-\pi/2$ around Zh axis of the hand coordinate system OH–Xh, Yh, Zh. The hand coordinate system is defined by the position and attitude of the hand relative to the manipulator and unit vectors $\vec{n}$H, $\vec{o}$H, $\vec{a}$H are defined for coordinate axes XH, YH, ZH. In FIG. 35, the hand coordinate system in position P4 is represented by $\vec{n}$HP4, $\vec{o}$HP4, $\vec{a}$HP4 and the hand coordinate system in position P3 is represented by $\vec{n}$HP5, $\vec{o}$HP5, $\vec{a}$HP5. Note that vectors $\vec{a}$HP4 and $\vec{a}$HP5 are pointed downward in the direction normal to the drawing paper.

A transformation equation for changing the hand attitude from P4 to P5 is expressed, using a rotatory coordinate transformation matrix $E^{K(-\pi/2)}$ for the hand coordinate system OH –XH, YH, ZH, by $$[\vec{n}_{HP5}\ \vec{o}_{HP5}\ \vec{a}_{HP5}] = E^{k-\frac{\pi}{2}}[\vec{n}_{HP4}\ \vec{o}_{HP4}\ \vec{a}_{HP4}] \quad (34)$$

$$= \begin{bmatrix} 0 & 1 & 0 \\ -1 & 0 & 0 \\ 0 & 0 & 1 \end{bmatrix} [\vec{n}_{HP4}\ \vec{o}_{HP4}\ \vec{a}_{HP4}]$$

After the hand coordinate system has been changed to P5, the robot is pressed in the direction of –Yh until the set force is reached. The set force is reached in position P6. The response of force in the direction of $\vec{n}_H$ becomes as shown in FIG. 36(a) and the force $\vec{F}n$ is held constant after time t(P6).

Upon detection that the set force is reached at time t(P6), control command generating section of FIG. 33 issues a command to store the hand coordinates (Xh, Yh indicated by black triangles in FIGS. 35, 36(b), (c)) of position P6 to position storage section 200 of FIG. 33 and thus position storage section 200 stores the position of P6.

A method of finding the profile coordinate system for surface B from the coordinates of positions P1, P2, P6 which are stored in position storage section 200 of FIG. 33 in that way will be described. Let the position vector and the coordinates of the hand position be IP$_1$ (P$_{1x}$, P$_{1y}$, P$_{1z}$), IP$_2$ (P$_{2x}$, P$_{2y}$, P$_{2z}$), IP$_6$ (P$_{6x}$, P$_{6y}$, P$_{6z}$)

In FIGS. 35 and 36, no Z coordinates are given because only the Xh-Yh plane is considered. To deal with generally, the Z coordinates are contained in the following description.

To change from the profile coordinate system in position P1 to the one in position P3 in FIG. 35, an angle Φ made by surface A and surface B has to be found.

The angle Φ is represented, using position vectors IP1, IP2 and IP6, by $$\phi = \cos^{-1}\left[\frac{\{(lP_1 - lP_2) \cdot (lP_6 - lP_2)\}}{|lP_1 - lP_2||lP_6 - lP_2|}\right] \quad (35)$$

where · indicates the inner product and | | indicates the absolute value.

Figure 37:
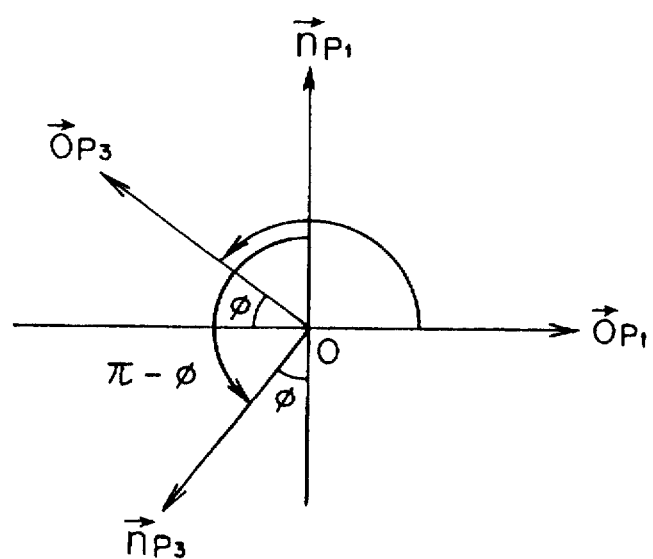
FIG. 37 illustrates a relation between the profile coordinate system in position P1 and the profile coordinate system position P3.
Figure 38A:
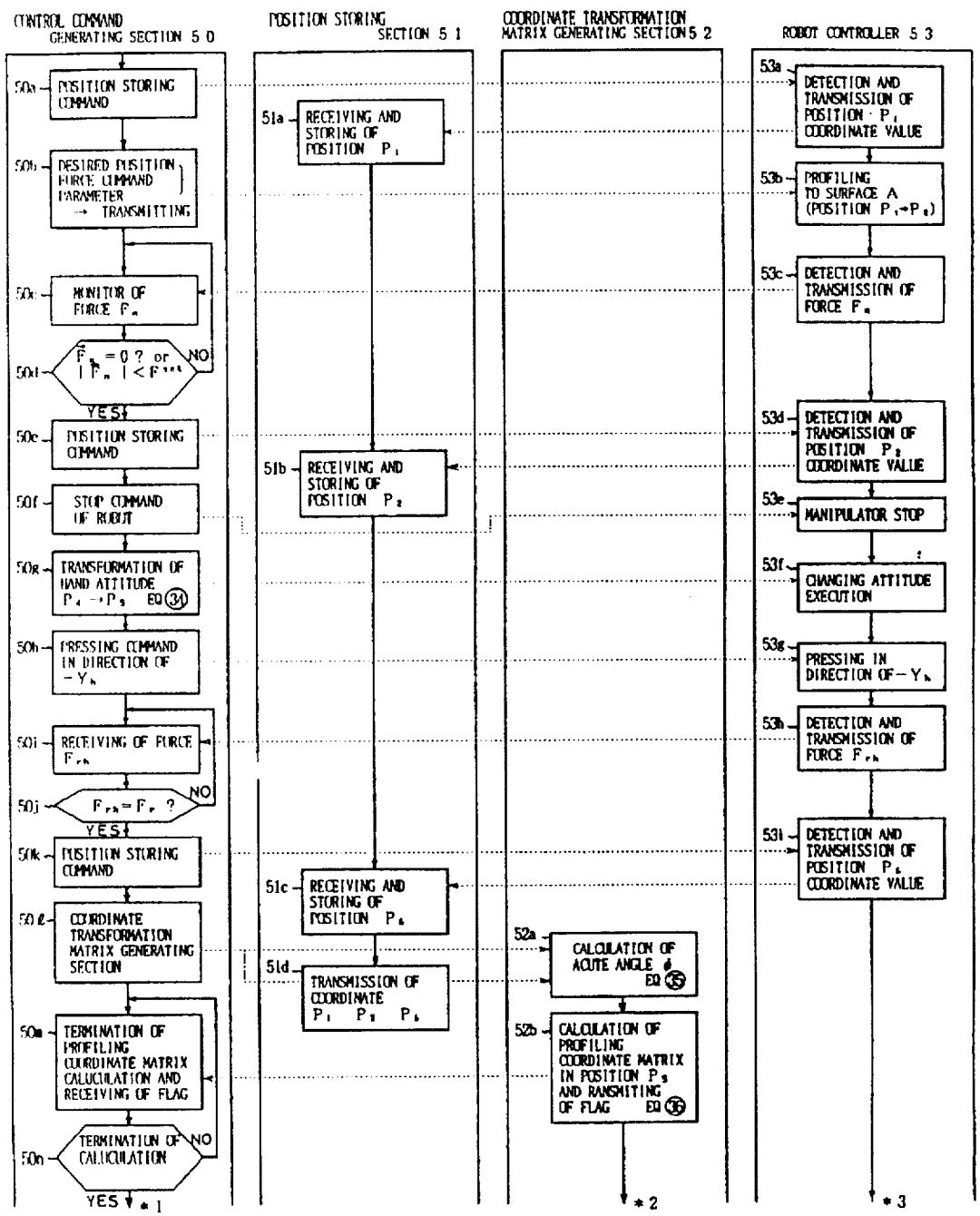
FIGS. 38A, 38B, 38C, 38D and 38E illustrate profiling operation in the fifth embodiment.
Figure 38B:
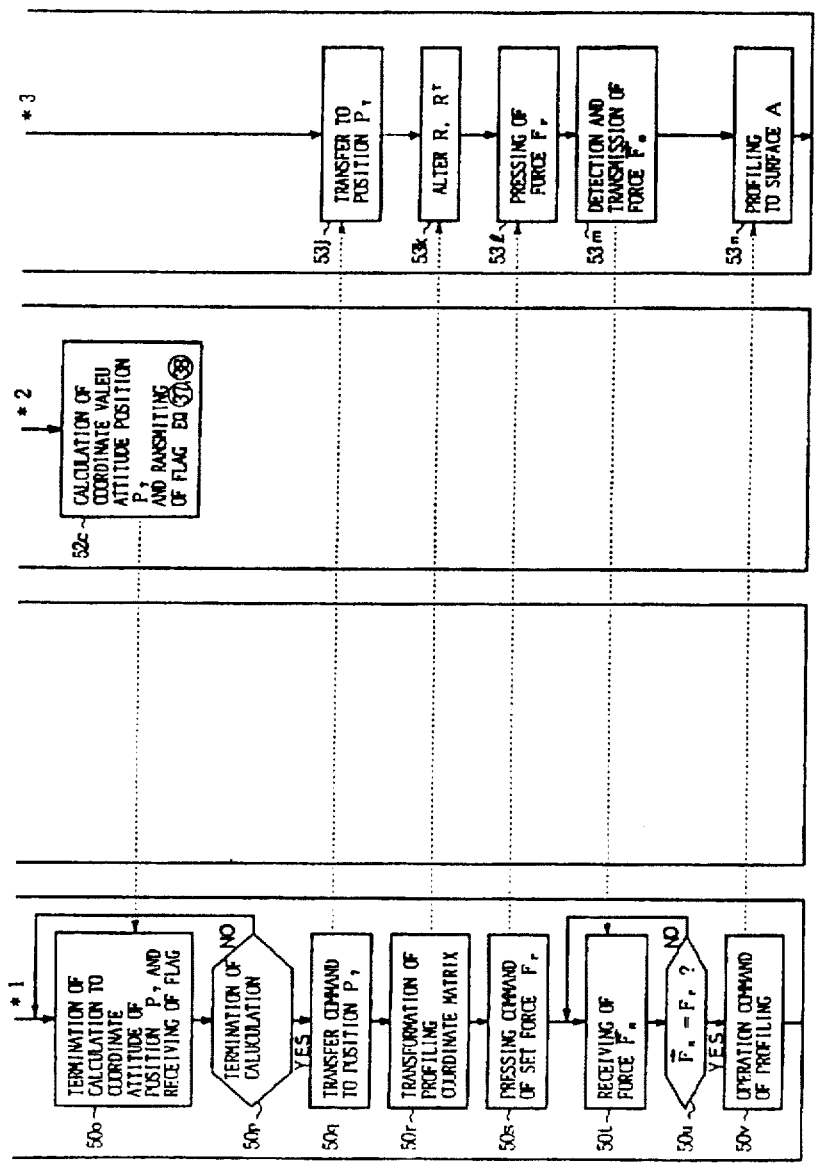
Figure 38C:
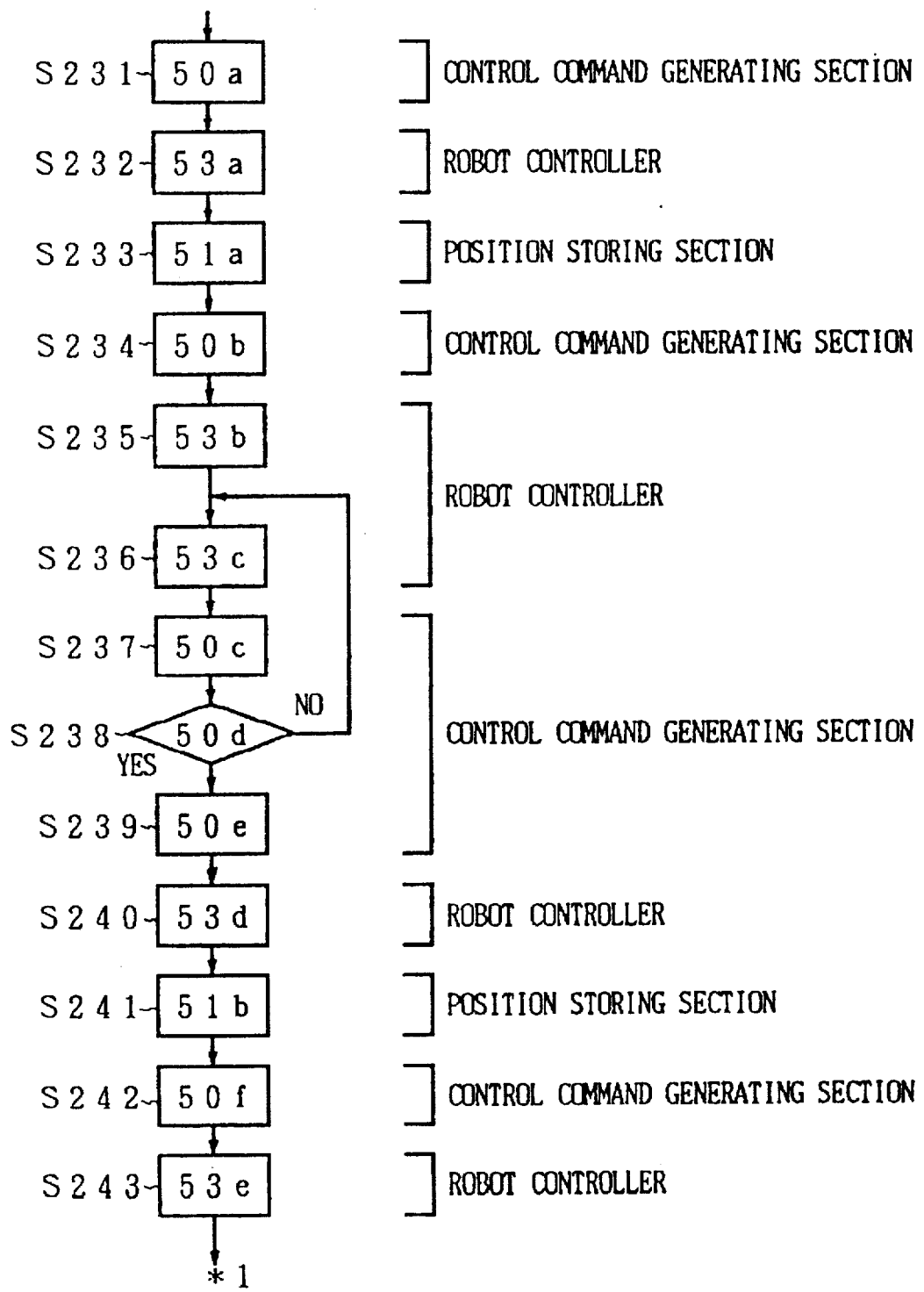
Figure 38D:
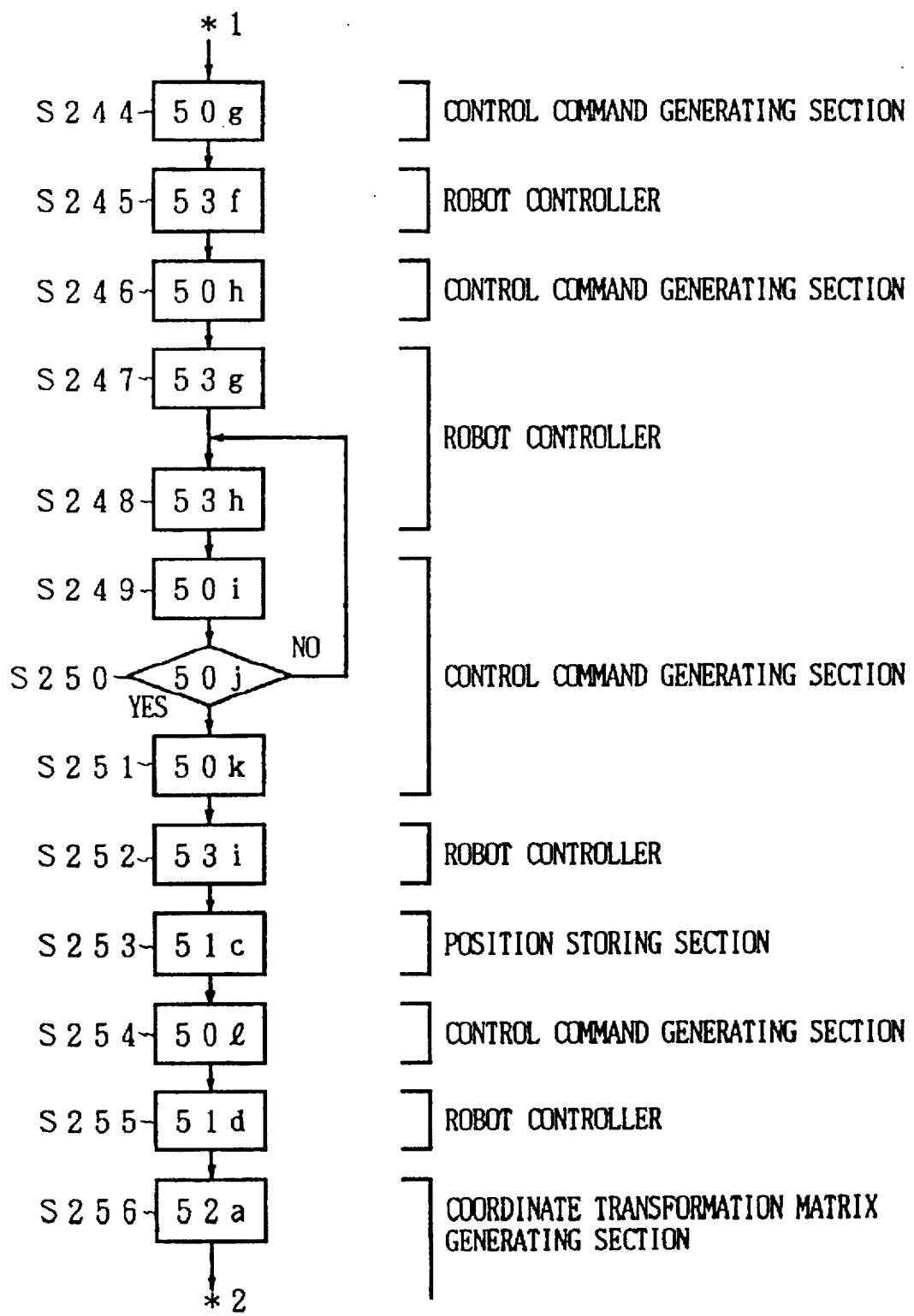
Figure 38E:
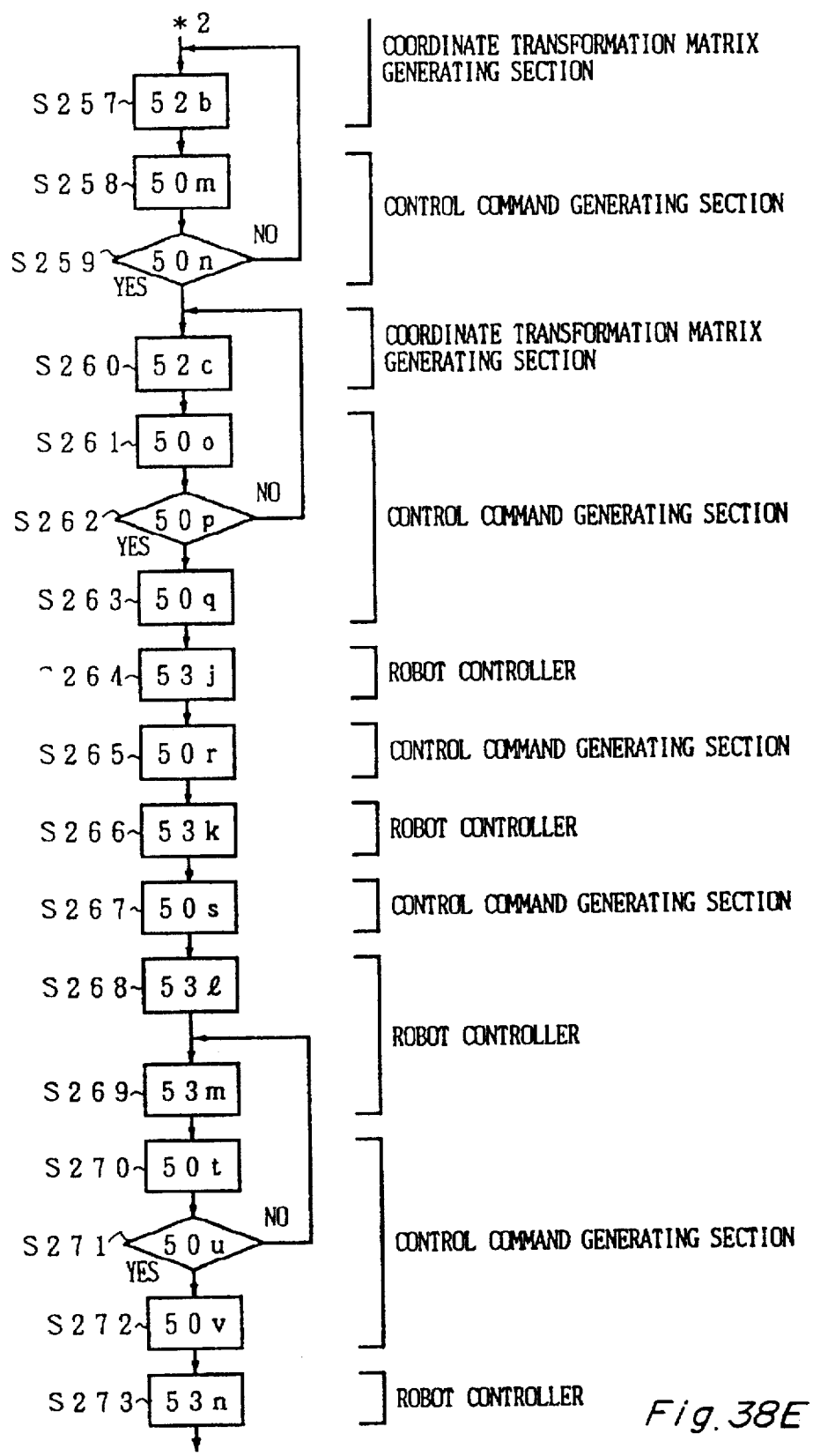

To change the profile coordinate system $[\vec{n}P1, \vec{o}P1, \vec{a}P1]$ at P1 to the coordinate system $[\vec{n}P3, \vec{o}P3, \vec{a}P3]$ at P3, $[\vec{n}P1, \vec{o}P1, \vec{a}P1]$ has only to be rotated through $\pi-\Phi$ about axis $\vec{a}P1$ as can be seen from the relation between the coordinate systems at P1 and P3 of FIG. 37. From the profile coordinate system at P1 the profile coordinate system is found, using rotatory coordinate transformation matrix $E^{k()}$ for the profile coordinate system at P1, to be $$[\vec{n}_{P3}\,\vec{o}_{P3}\,\vec{a}_{P3}] = E^{k(\pi-\phi)}[\vec{n}_{P1}\,\vec{o}_{P1}\,\vec{a}_{P1}] \quad (36)$$

$$= \begin{bmatrix} -\cos\phi & -\sin\phi & 0 \\ \sin\phi & -\cos\phi & 0 \\ 0 & 0 & 1 \end{bmatrix}[\vec{n}_{P1}\,\vec{o}_{P1}\,\vec{a}_{P1}]$$

To change the attitude of the robot's hand from the status in position P2 to the status in position P7 as well, the hand coordinate system $[\vec{n}MP2\,\vec{o}MP2\,\vec{a}MP2]$ may be multiplied by the rotatory coordinate transformation matrix $E^{\pi-\Phi)}$ used in equation (36) to obtain the hand coordinate system at P7. At the time of movement of the robot's hand from p6 to P7, the hand is moved displaced by 1 in the direction of the extension of surface B in view of the size of the hand (indicated by 1 in FIG. 35). At this point the coordinates and attitude of the hand are expressed by $$lP_7 = lP_2 + l(lP_2 - lP_6)/|lP_2 - lP_6| \quad (37)$$

$$[\vec{n}_{HP7}\,\vec{o}_{HP7}\,\vec{a}_{HP7}] = E^{k(\pi-\phi)}[\vec{n}_{HP1}\,\vec{o}_{HP2}\,\vec{a}_{HP2}] \quad (38)$$

$$= \begin{bmatrix} -\cos\phi & -\sin\phi & 0 \\ \sin\phi & -\cos\phi & 0 \\ 0 & 0 & 1 \end{bmatrix}[\vec{n}_{HP2}\,\vec{o}_{HP2}\,\vec{a}_{HP2}]$$

The calculation of the coordinate transformation matrix and the vectors used in equations (34) to (38) is performed by coordinate transformation matrix generating section 230 of FIG. 33.

When the profile coordinate system at P3, the position of the robot and the hand coordinate system at P7 are obtained, control command parameters are set in position control section 18 and force control section 19 by control command generating section of FIG. 33. The robot moves from P4 to P7 while altering its attitude to perform pressing operation on surface B. The direction of the pressing operation at this point follows the profile coordinate system indicated in position P3. When the set force is reached in position P7, the profiling operation on surface B is resumed.

For simplicity the above description was given in terms of the Xh-Yh plane. By the use of the general equations (34) to (38) and the above-described coordinate transformation of the profile coordinate. system to the reference coordinate system, the description can be given likewise in terms of the reference coordinate system.

The control apparatus according to the fifth embodiment is the same as that of FIG. 30 according to the fourth embodiment, inclusive of position control section 32 and force control section 34, except that control command generating section 40 contains coordinate transformation matrix generating section 230. The system configuration is also the same as that of FIG. 31 according to the fourth embodiment.

FIGS. 38A to 38E are flowcharts of the profiling operation according to the fifth embodiment, which illustrates the flow of processes performed by control command generating section 40, position storage section 200 and coordinate transformation matrix generating section 230 in host computer 37 and robot controller 42. In the following description a method of changing from position P2 to position P7 of FIG. 35 will be detailed, but a description of how to move the hand to position P1 to perform the profiling operation on surface A will be omitted.

In FIGS. 38A to 38E, control command generating section 40 issues a position storage command to robot controller 42 in step S231 when the hand comes in contact with surface A of the object. Robot controller 42 detects the coordinates of position P1 in step S232 and position storage section 200 stores the position in step S233. Control command generating section 40 issues a command for profiling operation on surface A in step S234 and robot controller 42 performs the profiling operation on surface A in step S235. The detailed description of the profiling operation on surface A is omitted.

Figure 39C:
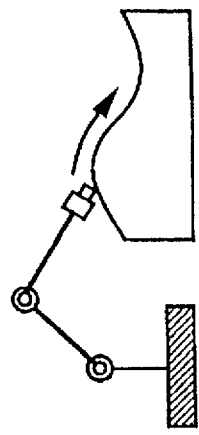
FIGS. 39A, 39B and 39C illustrate the industrial applicability of the present invention.
Figure 39C:
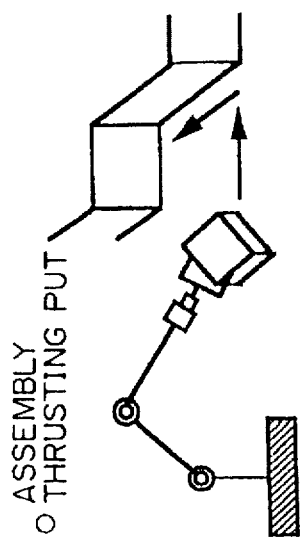
Figure 39C:
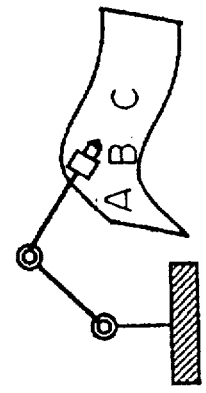
Figure 39B:
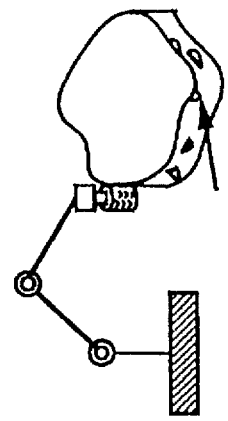
Figure 39B:
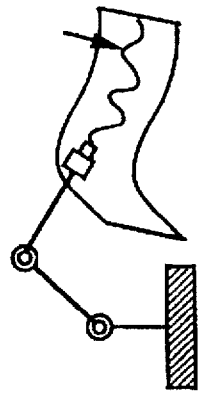
Figure 39B:
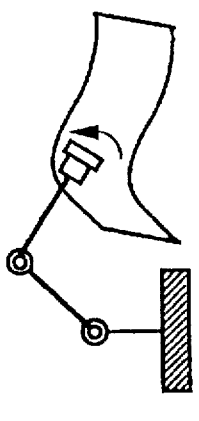
Figure 39A:
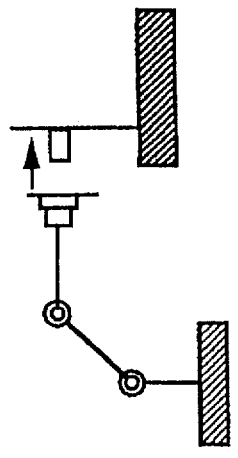
Figure 39A:
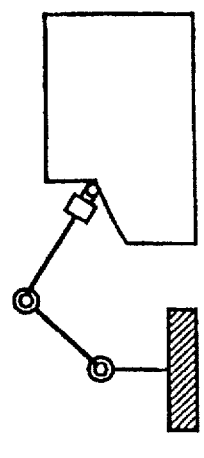

In step S237, control command generating section 40 monitors hand pressing force F sent from robot controller 42 in step S236 while the hand profiles surface A. A decision is made in step S238 as to whether or not Fn is zero, that is, whether or not the reaction force is lost as a result of arrival of the hand in position P2. This decision may be made depending on whether or not the absolute value $|\vec{F}_n|$ of $\vec{F}_n$ is smaller than Fset ($\leq 1$) in view of an error. When deciding that the hand has arrived in position P2 ($\vec{F}n = 0$), control command generating section 40 transfers the coordinates (Xh, Yh) of the position P2 detected by position detecting section 28 and coordinate transformation section 30 in the robot controller to position storage section 200. In step S241 position storage section 200 receives and stores the coordinates of position P2 transmitted from robot controller 42 in step S240. Next, control command generating section 40 issues a force command Fr=0, a velocity command Vo=0 and a desired position command Xr (=current position) in step S242 and robot controller 42 stops the manipulator in step S243. After the manipulator has been stopped, control command generating section 40 calculates the attitude of the hand after being rotated through $-\pi/2$ around the Z axis of the hand coordinate system using equation (34) and sends a desired position command Xr and a velocity command Vo to robot controller 42 in step S244. Upon receipt of Xr and Vo, robot controller 42 changes the attitude of the manipulator and the hand in step S245. After the attitude has been changed, control command generating section 40 generates a pressing command in the negative direction of the Yh axis shown in FIG. 35 in step S246 and sends a force command Fr and a velocity command Vo to robot controller 42, which, in turn, performs a pressing operation in the —Yh direction in step S247. To monitor a force, control command generating section 40 receives the force, which is detected by robot controller 42 in step S248, in step S249. When deciding, in step S250, that the pressing force $\vec{F}yh$ reached the set force $\vec{F}r$, control command generating section 40 issues to robot controller 42 a command to store position P6 in which the hand contacts surface B in step S251. Robot controller 42 detects the coordinates of P6 and sends them to position storage section 200 in step S252. Position storage section 200 receives and stores the coordinates of P6 in step S253. Control command generating section 40 issues a command to generate a matrix for coordinate transformation of the profile coordinate system and a command to transmit the coordinates of positions P1, P2 and P6 stored in position storage section 200 to coordinate transformation matrix generating section 230 in step S254. Coordinate transformation matrix generating section 230 calculates an angle Φ made by surface A and surface B in accordance with equation (35) on the basis of the coordinates of positions P1, P2 and P6 sent from position storage section 200. Also, coordinate transformation matrix generating section 230 calculates the profile coordinate system at position P2 in step S257 and the coordinates of position P7 in the hand coordinate system and the attitude in position P7 in step S260. In steps S257 and S260, the results of calculation and a calculation termination flag is sent to control command generating section 40 at each calculation. Upon receipt of the termination flag, control command generating section 40 performs subsequent steps S258, S259, S261 and S262. Next, to contact surface B with a correct attitude, control command generating section 40 issues to robot controller a command to move to position P7 in step S263. Robot controller 42 moves the robot from P6 to P7 and changes its attitude in accordance with the received desired position, attitude Xr and velocity command Vo in step S264. After movement the profile coordinate system is switched to the coordinate system obtained in step S257 (steps S265, S266) and the pressing is performed in the direction of n in the new coordinate system (steps S267, S268). Control command generating section 40 decides whether the force Fn sent from the robot controller in step S269 has reached the set force (steps S270, S271). When the set force is reached, control command generating section 40 sends a profiling operation command again to robot controller 42 in step S272. Robot controller 42 permits the robot to profile surface B while generating a constant force Fr using the new coordinate system in step S273. The industrial applicability of the invention The present invention detailed above can be applied to various works using robots. The works to which the present invention can be applied will be described in conjunction with FIGS. 39A to 39C. FIG. 39A illustrates works, which can be done by prior art systems, including fitting and cutting of an object whose contour is recognized. FIG. 39B illustrates works, which can be done by the prior art systems when a work object has a contour known in advance, including trimming, coating, polishing and rubbing. However, when the contour of a work object is unknown, the works of FIG. 39A are impossible. By the use of the present invention, the works of FIG. 39B can be done to a work object having an unknown contour. Furthermore, FIG. 39C illustrates works which cannot be done by any prior art system. The works includes recognition of an object's contour, assembly, and writing on a curved surface. Such works cannot be done until the present invention is used.

What is claimed is:

1. A profile control system for a force control robot system including a robot, a force detecting section for detecting a force acting between an end of said robot and a work object and a position detecting section for detecting a position of the end of said robot and permitting said robot to perform a profiling operation on a surface of said work object comprising:

normal vector calculating means responsive to an output of said force detecting section for calculating a normal vector n at a point of contact between the end of said robot and said work object;

vector in direction of movement calculating means responsive to outputs of said normal vector calculating means and a vector in the direction of movement of the end of said robot at an end point or a start point of an profile operation provided from an operator for calculating a vector in the direction of movement of the end of said robot;

control command generating means responsive to outputs of said vector in direction of movement calculating means and said normal vector calculating means for generating control commands to said robot; and force and position control means responsive to outputs of said control command generating section, said force detecting section and said position detecting section for controlling the force of said robot and a position of the end of said robot, thereby permitting said robot to perform an profiling on a surface of said work object having an unknown contour while resetting a profile coordinate system defined by said normal vector and said vector in direction of movement, in which said normal vector calculating means corresponds to a normal vector calculating section, said vector in direction of movement calculating means corresponds to a vector in direction of movement calculating section, said control command generating section corresponds to a control command generating section and said force and position control means correspond to a position control section, a force control section and an operation section.

2. A profile control system according to claim 1, in which said profile coordinate system is defined by a unit vector $\vec{n}$ in the direction in which the end of said robot is pressed which coincides with the direction of an inward normal of the surface of said work object at a point of contact between the end of said robot and said work object, a unit vector $\vec{o}$ in the direction of movement of the end of said robot and a third unit vector $\vec{a}$ which is the outer product of said unit vectors $\vec{n}$ and $\vec{o}$.

3. A profile control system according to claim 1, in which said vector in direction of movement calculating section finds a third unit vector $\vec{a}$ of said profile coordinate system as a unit vector pointing in the same direction as the outer product $\vec{n} \times \vec{L}$ of a normal vector $\vec{n}$ output from said normal vector calculating section and a unit vector $\vec{L}$ pointing in the direction of the end point of a profiling operation provided from an operator from a current position of the end of said robot output from said position detecting section and finds a unit vector $\vec{o}$ in the direction of movement as the outer product of said third unit vector $\vec{a}$ and said normal vector $\vec{n}$.

4. A profile control system according to claim 1, in which the resetting of said profile coordinate system is performed when a fixed time elapses from previous setting of said profile coordinate system.

5. A profile control system according to claim 1, in which said force control section and said position control section are built in a robot controller, and said normal vector calculating section, said vector in direction of movement calculating section and said control command generating section are implemented by a host computer.

6. A trajectory searching system for a force control robot system including a robot, a force detecting section for detecting a force acting between an end of said robot and a work object, a position detecting section for detecting a position of the end of said robot and an operation section for applying control inputs to said robot, comprising:

a normal vector calculating section responsive to an output of said force detecting section for calculating a normal vector at a point of contact between the end of said robot and said work object;

a vector in direction of movement calculating section responsive to outputs of said normal vector calculating section and said position detecting section for calculating a vector in direction of movement of the end of said robot;

a trajectory searching section responsive to outputs of said force detecting section, said normal vector calculating section and said vector in direction of movement calculating section for searching an original trajectory when the end of said robot separates from said work object;

a control command generating section responsive to outputs of said normal vector calculating section and said trajectory searching section for outputting set force parameters and set position parameters;

a force control section responsive to said set force parameters from said control command generating section for controlling the force of said robot; and a position control section responsive to said set position parameters from said control command generating section for controlling a position of said robot, thereby permitting said robot to perform a profiling operation on a surface of said work object having discontinuous surfaces of unknown contours while resetting a profile coordinate system defined by said normal vector and said vector in direction of movement.

7. A profile control system according to claim 6, in which said normal vector calculating section transforms a unit vector in the direction opposite to a reaction force, that is received by the end of said robot from said work object at a point of contact between said robot and said work object and that is sensed by an inner force sensor serving as said force detecting section, from a profile coordinate system representation to a reference coordinate system representation for said robot.

8. A profile control system according to claim 6, in which said profile coordinate system is defined by a unit vector $\vec{n}$ in the direction in which the end of said robot is pressed which coincides with the direction of an inward normal of the surface of said work object at a point of contact between the end of said robot and said work object, a unit vector $\vec{o}$ in the direction of movement of the end of said robot and a third unit vector $\vec{a}$ a which is the outer product of said unit vectors $\vec{n}$ and $\vec{o}$.

9. A profile control system according to claim 6, in which said vector in direction of movement calculating section finds a third unit vector $\vec{a}$ of said profile coordinate system as a unit vector pointing in the same direction as the outer product $\vec{n} \times \vec{L}$ of a normal vector $\vec{n}$ output from said normal vector calculating section and a unit vector $\vec{L}$ pointing in the direction of the end point of a profiling operation provided from an operator from a current position of the end of said robot output from said position detecting section and finds a unit vector $\vec{o}$ in the direction of movement as the outer product of said third unit vector $\vec{a}$ and said normal vector $\vec{n}$.

10. A profile control system according to claim 6, in which said control command generating section multiplies a normal vector $\vec{n}$ output from said normal vector calculating section by the magnitude of a set force which is set to act on said work object in a profiling operation to generate a force command, and multiplies a vector $\vec{o}$ in direction of movement output from said vector in direction of movement calculating section by a constant α corresponding to a distance to a point at which the resetting of said profile coordinate system is made to generate a relative position command.

11. A profile control system according to claim 6 in which the resetting of said profile coordinate system is performed when a fixed time elapses from previous setting of said profile coordinate system.

12. A profile control system according to claim 6, in which said vector in direction of movement calculating section finds said third unit vector $\vec{n}$ as the outer product of said normal vector $\vec{n}$ and a vector $\vec{o}$ in direction of movement at a point of contact between said robot and said work object at the time of setting said profile coordinate system immediately before a current point of contact between said robot and said work object when a coincidence occurs between said unit vector $\vec{L}$ and said normal vector $\vec{n}$, and a vector in direction of movement $\vec{o}$ at the current point of contact as the outer product of said unit vector $\vec{a}$ and said normal vector $\vec{n}$.

13. A profile control system according to claim 6, in which said force control section and said position control section are built in a robot controller, and said normal vector calculating section, said vector in direction of movement calculating section, said trajectory searching section and said control command generating section are implemented by a host computer.

14. A profile control system according to claim 6, in which said force control section comprises a transposed orthogonal transformation matrix calculating section for calculating a transposed orthogonal transformation matrix (RT) which is a transposed matrix of an orthogonal transformation matrix R for transformation from a profile coordinate system defined by said unit vectors $\vec{n}$, $\vec{o}$ and $\vec{a}$ to a robot's reference coordinate system to transform a difference between an output of said force detecting section represented in said robot's reference coordinate system and a force command output from said control command generating section, a selection matrix calculating section for multiplying an output of said transposed orthogonal transformation matrix calculating section by a selection matrix Sf in order to determine in which of the directions of three coordinate axes of said profile coordinate system the force is to be controlled, an orthogonal matrix calculating section for multiplying an output of said selection matrix calculating section by said orthogonal transformation matrix R for transformation from profile coordinate system to reference coordinate system, and a force feedback gain calculating section for multiplying an output of said orthogonal matrix calculating section by a force feedback gain in the direction of each of coordinate axes of said reference coordinate system, in which said position control section comprises a transposed orthogonal transformation matrix (RT) calculating section for transforming a difference between a position command represented in said reference coordinate system output from said control command generating section and an output of said position detecting section to a profile coordinate system, a selection matrix calculating section for multiplying an output of said transposed orthogonal transformation matrix calculating section by a difference I−Sf between a unit matrix I and said selection matrix Sf, an orthogonal matrix calculating section for multiplying an output of said selection matrix calculating section by said orthogonal transformation matrix R to transform said output of said selection matrix calculating section to said reference coordinate system, and a position feedback gain calculating section for multiplying an output of said orthogonal matrix calculating section by a position feedback gain in the direction of each of coordinate axes of said reference coordinate system, and in which outputs of said force feedback gain calculating section and said position feedback gain calculating section and a velocity command output from said control command generating section are added together and the result of addition is converted to an angle of rotation of a motor installed in said operation section and applied to said operation section.

15. A profile control system according to claim 6, in which said vector in direction of movement calculating section finds a third unit vector $\vec{a}B$ in said profile coordinate system at the start point as a. unit vector pointing in the same direction as the outer vector $\vec{n}B \times \vec{O}op$ of a normal vector $\vec{n}B$ output from said normal vector calculating section and said vector in direction of movement $\vec{O}op$ of the robot end at the start point of said profile operation provided from said operator and finds a unit vector in direction of movement $\vec{OB}$ at the start point as the outer vector of a unit vector $\vec{a}B$ and said normal vector $\vec{n}B$ at the start point.

16. A profile control system according to claim 6, in which said vector in direction of movement calculating section finds a unit vector $\vec{o}$ in direction of movement at a point at which said profile coordinate system is reset as the outer product of a unit vector $\vec{a}B$ at the start point of said profiling operation and a normal vector $\vec{n}$ output from said normal vector calculating section.

17. A profile control system according to claim 6, in which said control command generating section causes said normal vector calculating section to calculate normal vectors at the start point of said profiling operation and a resetting point of said profile coordinate system when the magnitude of a reaction force that the end of said robot receives from said work object is not zero at the start point and the resetting point of said profile coordinate system.

18. A profile control system according to claim 6, in which said control command generating section stops said profile operation when the end point of said profile operation specified by the operator is reached by the end of said robot whose position is detected by said position detection section.

19. A profile control system according to claim 6, in which said control command generating section stops the profiling operation when a reacting force detected by an inner force sensor serving as said force detecting section at each of points at which said profile coordinate system is reset becomes too large.

20. A profile control system according to claim 6, in which said control command generating section stops the profiling operation when a termination instruction is given by the operator.

21. A profile control system according to claim 6, in which said control command generating section stops the profiling operation when the end of said robot goes out of its operation range as detected by said position detecting section.

22. A profile control system according to claim 6, in which, when said robot is in the process of performing an profile operation on a surface A of said work object having discontinuous surfaces, said control command generating section stores a position P7 detected by said position detecting section when the force detected by said force detecting section becomes 0 in said trajectory searching section, issues a command to stop said robot to said robot controller and stores the position P2 of the end of said robot in said trajectory searching section after said robot is stopped, and said trajectory searching section finds a new profile coordinate system which is obtained by rotating a profile coordinate system at position P2 counterclockwise through 90 degrees about said unit vector $\vec{a}$ and position P3 which forms the foot of the perpendicular which is dropped from said position P2 to a straight line pointing in the direction of movement of said robot end in said surface A from said position P1, and said control command generating section issues a command to move the end of said robot to said position P3, issues a command to press said robot on a surface B adjacent to said surface A of said work object, decides whether the end of said robot has passed said position P1 and permits said robot to start a profile operation on said surface B when the force detected by said force detecting section becomes positive before the end of said robot passes said position P1.

23. A profile control system according to claim 22, in which said control command generating section issues a command to stop said robot to said robot controller when it decides that the end of said robot has passed said position P1, commands said robot controller to rotate a unit vector $\vec{a}$ in said new profile coordinate system in the direction of rotation of a left-hand screw and to press the end of said robot on said work object, and decides that said robot end has arrived at an end point of surface A when the force detected by said force detecting section becomes positive.

24. A robot profile control system for a force control robot system including a robot, a force detecting section for detecting a force acting between an end of said robot and a work object, a position detecting section for detecting a position of the end of said robot and an operation section for applying control inputs to said robot, comprising:

a normal vector calculating section responsive to an output of said force detecting section for calculating a normal vector at a point of contact between the end of said robot and said work object;

a vector in direction of movement calculating section responsive to outputs of said normal vector calculating section and said position detecting section for calculating a vector in direction of movement of the end of said robot;

a curvature calculating section responsive to outputs of said normal vector calculating section and said position detecting section for calculating the curvature of said work object at a point of contact between the end of said robot and said work object;

a position deviation compensating section responsive to an output of said curvature calculating section for compensating for a position deviation of the end of said robot at a next point at which a profile coordinate system is set;

a control command generating section responsive to outputs of said position deviation compensating section, said normal vector calculating section and said vector in direction of movement calculating section for generating parameters for a set force and a set position;

a force control section responsive to said set force parameters from said control command generating section for controlling the force of said robot; and a position control section responsive to said set position parameters for controlling the position of the end of said robot, thereby permitting said robot to perform a profiling operation on a surface of said work object having curved surfaces of unknown contours while resetting a profile coordinate system defined by said normal vector and said vector in direction of movement.

25. A profile control system according to claim 24, in which said normal vector calculating section transforms a unit vector in the direction opposite to a reaction force, that is received by the end of said robot from said work object at a point of contact between said robot and said work object and that is sensed by an inner force sensor serving as said force detecting section, from a profile coordinate system representation to a reference coordinate system representation for said robot.

26. A profile control system according to claim 24, in which said control command generating section stores the positions of the end of said robot at a start point of said profiling operation and at a point at which said profile coordinate system is reset, and said curvature calculating section finds, at a next point at which the profile coordinate system is reset, the center of a circle of curvature as the intersection of the perpendicular bisector between the stored point and the current position of the end of said robot and an extension of said normal vector calculated by said normal vector calculating section and finds the curvature at said next point at which the profile coordinate system is reset as an inverse number of the radius of said circle of curvature.

27. A profile control system according to claim 24, in which said profile coordinate system is defined by a unit vector $\vec{n}$ in the direction in which the end of said robot is pressed which coincides with the direction of an inward normal of the surface of said work object at a point of contact between the end of said robot and said work object, a unit vector $\vec{o}$ in the direction of movement of the end of said robot and a third unit vector $\vec{a}$ which is the outer product of said unit vectors $\vec{n}$ and $\vec{o}$.

28. A profile control system according to claim 24, in which said vector in direction of movement calculating section finds a third unit vector $\vec{a}$ of said profile coordinate system as a unit vector pointing in the same direction as the outer product $\vec{n} \times \vec{L}$ of a normal vector $\vec{n}$ output from said normal vector calculating section and a unit vector $\vec{L}$ pointing in the direction of the end point of a profiling operation provided from an operator from a current position of the end of said robot output from said position detecting section and finds a unit vector $\vec{o}$ in the direction of movement as the outer product of said third unit vector $\vec{a}$ and said normal vector $\vec{n}$.

29. A profile control system according to claim 24, in which said control command generating section multiplies a normal vector $\vec{n}$ output from said normal vector calculating section by the magnitude of a set force which is set to act on said work object in a profiling operation to generate a force command, and multiplies a vector $\vec{o}$ in direction of movement output from said vector in direction of movement calculating section by a constant α corresponding to a distance to a point at which the resetting of said profile coordinate system is made to generate a relative position command.

30. A profile control system according to claim 34, in which the resetting of said profile coordinate system is performed when a fixed time elapses from previous setting of said profile coordinate system.

31. A profile control system according to claim 24, in which said position deviation compensating section finds the magnitude of a force velocity command of said normal vector for compensating for the position deviation in accordance with the following equation $$V_n = (r - \sqrt{r^2 - (V_0 \tau)^2})/\tau$$

where r is the radius of a circle of curvature calculated by said curvature calculating section, τ a time interval at which said profile coordinate system is reset and Vo is the magnitude of the force velocity command Vn for position deviation compensation in the direction of said normal vector.

32. A profile control system according to claim 24, in which said vector in direction of movement calculating section finds said third unit vector $\vec{n}$ as the outer product of said normal vector $\vec{n}$ and a vector $\vec{o}$ in direction of movement at a point of contact between said robot and said work object at the time of setting said profile coordinate system immediately before a current point of contact between said robot and said work object when a coincidence occurs between said unit vector $\vec{L}$ and said normal vector $\vec{n}$, and a vector in direction of movement $\vec{o}$ at the current point of contact as the outer product of said unit vector $\vec{a}$ and said normal vector $\vec{n}$.

33. A profile control system according to claim 24, in which said force control section and said position control section are built in a robot controller, and said normal vector calculating section, said vector in direction of movement calculating section, said curvature calculating section and said control command generating section are implemented by a host computer.

34. A profile control system according to claim 24, in which said force control section comprises a transposed orthogonal transformation matrix calculating section for calculating a transposed orthogonal transformation matrix (RT) which is a transposed matrix of an orthogonal transformation matrix R for transformation from a profile coordinate system defined by said unit vectors $\vec{n}$, $\vec{o}$ and $\vec{a}$ to a robot's reference coordinate system to transform a difference between an output of said force detecting section represented in said robot's reference coordinate system and a force command output from said control command generating section, a selection matrix calculating section for multiplying an output of said transposed orthogonal transformation matrix calculating section by a selection matrix Sf in order to determine in which of the directions of three coordinate axes of said profile coordinate system the force is to be controlled, an orthogonal matrix calculating section for multiplying an output of said selection matrix calculating section by said orthogonal transformation matrix R for transformation from profile coordinate system to reference coordinate system, and a force feedback gain calculating section for multiplying an output of said orthogonal matrix calculating section by a force feedback gain in the direction of each of coordinate axes of said reference coordinate system, in which said position control section comprises a transposed orthogonal transformation matrix (RT) calculating section for transforming a difference between a position command represented in said reference coordinate system output from said control command generating section and an output of said position detecting section to a profile coordinate system, a selection matrix calculating section for multiplying an output of said transposed orthogonal transformation matrix calculating section by a difference I−Sf between a unit matrix I and said selection matrix Sf, an orthogonal matrix calculating section for multiplying an output of said selection matrix calculating section by said orthogonal transformation matrix R to transform said output of said selection matrix calculating section to said reference coordinate system, and a position feedback gain calculating section for multiplying an output of said orthogonal matrix calculating section by a position feedback gain in the direction of each of coordinate axes of said reference coordinate system, and in which outputs of said force feedback gain calculating section and said position feedback gain calculating section and a velocity command output from said control command generating section are added together and the result of addition is converted to an angle of rotation of a motor installed in said operation section and applied to said operation section.

35. A profile control system according to claim 24, in which said vector in direction of movement calculating section finds a third unit vector $\vec{aB}$ in said profile coordinate system at the start point as a unit vector pointing in the same direction as the outer vector $\vec{nB} \times \vec{Oop}$ of a normal vector $\vec{nB}$ output from said normal vector calculating section and said vector in direction of movement $\vec{Oop}$ of the end of said robot at the start point of said profile operation provided from said operator and finds a unit vector in direction of movement $\vec{OB}$ at the start point as the outer vector of a unit vector $\vec{aB}$ and said normal vector $\vec{nB}$ at the start point.

36. A profile control system according to claim 24, in which said vector in direction of movement calculating section finds a unit vector $\vec{o}$ in direction of movement at a point at which said profile coordinate system is reset as the outer product of a unit vector $\vec{aB}$ at the start point of said profiling operation and a normal vector $\vec{n}$ output from said normal vector calculating section.

37. A profile control system according to claim 24, in which said control command generating section causes said normal vector calculating section to calculate normal vectors at the start point of said profiling operation and a resetting point of said profile coordinate system when the magnitude of a reaction force that the end of said robot receives from said work object is not zero at the start point and the resetting point of said profile coordinate system.

38. A profile control system according to claim 24, in which said control command generating section stops said profile operation when the end point of said profile operation specified by the operator is reached by the robot end whose position is detected by said position detection section.

39. A profile control system according to claim 24, in which said control command generating section stops the profiling operation when a reaction force detected by an inner force sensor serving as said force detecting section at each of points at which said profile coordinate system is reset becomes zero or too large.

40. A profile control system according to claim 24, in which said control command generating section stops the profiling operation when a termination instruction is given by the operator.

41. A profile control system according to claim 24, in which said control command generating section stops the profiling operation when the end of said robot goes out of its operation range as detected by said position detecting section.

42. A profile control system for a force control robot system having a robot, a force detecting section for detecting a force acting between and end of said robot and a work object, a position detecting section for detecting a position of the end of said robot and an operation section for entering control inputs to said robot and permitting said robot to perform a profile operation on a surface of said work object, comprising:

a position storage section responsive to an output of said force detecting section for storing the position of the end of said robot;

a control command generating section responsive to outputs of said position storage section and said force detecting section for outputting control commands to said robot;

a force control section responsive to outputs of said control command generating section and said force control section for controlling the force of said robot; and a position control section responsive to outputs of said control command generating section and position detecting section for controlling the position of the end of said robot, thereby permitting said robot to perform the profile operation on a side surface of said work object rectangular in shape while applying a constant force to said side surface.

43. A profile control system according to claim 42, in which said profile operation is controlled using a profile coordinate system defined by a unit vector $\vec{n}$ in the direction of pressing force at a point of contact between the end of said robot and said work object, a unit vector $\vec{o}$ in the direction of movement of said robot end and the outer product $\vec{n} \times \vec{o}$ of said two unit vectors $\vec{n}$ and $\vec{o}$.

44. A profile control system according to claim 42, in which said force control section and said position control section are built in a robot controller, and said position storage section and said control command generating section are implemented by a host computer.

45. A profile control system according to claim 42, in which said force control section comprises a transposed orthogonal transformation matrix calculating section for calculating a transposed orthogonal transformation matrix (RT) which is a transposed matrix of an orthogonal transformation matrix R for transformation from a profile coordinate system defined by said unit vectors $\vec{n}$, $\vec{o}$ and $\vec{a}$ to a robot's reference coordinate system to transform a difference between an output of said force detecting section represented in said robot's reference coordinate system and a force command output from said control command generating section, a selection matrix calculating section for multiplying an output of said transposed orthogonal transformation matrix calculating section by a selection matrix Sf in order to determine in which of the directions of three coordinate axes of said profile coordinate system the force is to be controlled, an orthogonal matrix calculating section for multiplying an output of said selection matrix calculating section by said orthogonal transformation matrix R for transformation from profile coordinate system to reference coordinate system, and a force feedback gain calculating section for multiplying an output of said orthogonal matrix calculating section by a force feedback gain in the direction of each of coordinate axes of said reference coordinate system, in which said position control section comprises a transposed orthogonal transformation matrix (RT) calculating section for transforming a difference between a position command represented in said reference coordinate system output from said control command generating section and an output of said position detecting section to a profile coordinate system, a selection matrix calculating section for multiplying an output of said transposed orthogonal transformation matrix calculating section by a difference I–Sf between a unit matrix I and said selection matrix Sf, an orthogonal matrix calculating section for multiplying an output of said selection matrix calculating section by said orthogonal transformation matrix R to transform said output of said selection matrix calculating section to said reference coordinate system, and a position feedback gain calculating section for multiplying an output of said orthogonal matrix calculating section by a position feedback gain in the direction of each of coordinate axes of said reference coordinate system, and in which outputs of said force feedback gain calculating section and said position feedback gain calculating section and a velocity command output from said control command generating section are added together and the result of addition is converted to an angle of rotation of a motor installed in said operation section and applied to said operation section.

46. A profile control system according to claim 42, in which, when said robot is in the process of performing an profiling operation while applying a constant force to a side surface A of said work object rectangular in shape, said control command generating section stores in said position storage section the position of the end of said robot detected by said position detecting section when deciding that the end of said robot has arrived at an end point of said side surface A, issues a command to stop said robot to said robot controller, finds a new profile coordinate system by rotating the profile coordinate system in said side surface counterclockwise through 90 degrees about said unit vector $\vec{a}$, sets in said robot controller a transformation matrix for transformation from the robot reference coordinate system to the profile coordinate system and a transposed matrix RT of said transformation matrix R as parameters based on the new profile coordinate system, issues to said robot controller a command to make the attitude of said robot correspond with said new profile coordinate system, issues to said robot controller a command to move said robot to the position stored in said position storage section, and issues to said robot controller a profile operation command to permit said robot to perform a profile operation on a side surface B adjacent to said side surface A when the force detected by said force detecting section reaches the set force.

47. A profile control system according to claim 46, in which said control command generating section decides that said robot end has arrived at an end point of said side surface A when the force detected by said force detecting section becomes 0 or smaller than a predetermined small preset value.

48. A profile control system for a force control robot system having a robot, a force detecting section for detecting a force acting between an end of said robot and a work object, a position detecting section for detecting a position of the end of said robot and an operation section for entering control inputs into said robot and permitting said robot to perform a profile operation on a surface of said work object, comprising:

a position storage section responsive to an output of said force detecting section for storing the position of the end of said robot;

a coordinate transformation matrix generating section responsive to position information stored in said position storage section for calculating a new profile coordinate system for said robot;

a control command generating section for generating control commands for said robot;

a position control section responsive to outputs of said control command generating section and said position detecting section for controlling the position of said robot; and a force control section responsive to outputs of said control command generating section and said force detecting section for controlling the position of said robot, thereby permitting said robot to perform a profile operation on a work object of an unknown contour with an acute angle while applying a constant force to said work object.

49. A profile control system according to claim 48, in which said profile operation is controlled using a profile coordinate system defined by a unit vector $\vec{n}$ in the direction of pressing force at a point of contact between the end of said robot and said work object, a unit vector $\vec{o}$ in the direction of movement of the end of said robot and the outer product $\vec{n} \times \vec{o}$ of said two unit vectors $\vec{n}$ and $\vec{o}$.

50. A profile control system according to claim 48, in which said force control section and said position control section are built in a robot controller, and said position storage section, said control command generating section and said coordinate transformation matrix generating section are implemented by a host computer.

51. A profile control system according to claim 48, in which said force control section comprises a transposed orthogonal transformation matrix calculating section for calculating a transposed orthogonal transformation matrix (RT) which is a transposed matrix of an orthogonal transformation matrix R for transformation from a profile coordinate system defined by said unit vectors $\vec{n}$, $\vec{o}$ and $\vec{a}$ to a robot's reference coordinate system to transform a difference between an output of said force detecting section represented in said robot's reference coordinate system and a force command output from said control command generating section, a selection matrix calculating section for multiplying an output of said transposed orthogonal transformation matrix calculating section by a selection matrix Sf in order to determine in which of the directions of three coordinate axes of said profile coordinate system the force is to be controlled, an orthogonal matrix calculating section for multiplying an output of said selection matrix calculating section by said orthogonal transformation matrix R for transformation from profile coordinate system to reference coordinate system, and a force feedback gain calculating section for multiplying an output of said orthogonal matrix calculating section by a force feedback gain in the direction of each of coordinate axes of said reference coordinate system, in which said position control section comprises a transposed orthogonal transformation matrix (RT) calculating section for transforming a difference between a position command represented in said reference coordinate system output from said control command generating section and an output of said position detecting section to a profile coordinate system, a selection matrix calculating section for multiplying an output of said transposed orthogonal transformation matrix calculating section by a difference I–Sf between a unit matrix I and said selection matrix Sf, an orthogonal matrix calculating section for multiplying an output of said selection matrix calculating section by said orthogonal transformation matrix R to transform said output of said selection matrix calculating section to said reference coordinate system, and a position feedback gain calculating section for multiplying an output of said orthogonal matrix calculating section by a position feedback gain in the direction of each of coordinate axes of said reference coordinate system, and in which outputs of said force feedback gain calculating section and said position feedback gain calculating section and a velocity command output from said control command generating section are added together and the result of addition is converted to an angle of rotation of a motor installed in said operation section and applied to said operation section.

52. A profile control system according to claim 48, in which said control command generating section stores the position P1 detected by said position detecting section when the end of said robot contacts a side surface A of said work object, commands a robot controller to permit said robot to perform on said surface A after the position P1 has been stored in said position storage section, monitors whether or not the end of said robot has arrived at an end point of said side surface A, stores position P2 detected by said position detecting section in said position storage section when the end of said robot arrives at the end point of said side surface A, issues to said robot controller a command to stop said robot, issues to said robot controller a command to rotate said robot end counterclockwise through 90 degrees about said unit vector $\vec{a}$, issues to said robot controller a command to press said robot on said work object, monitors whether or not the pressing force of the end of said robot detected by said force detecting section equals a set value, stores in said position storage section position P6 detected by said position detecting section when said robot collides with a side surface B of said work object that adjoins said side surface A and forms an acute angle with said side surface A and the pressing force becomes equal to the set value, issues a command to generate a matrix for coordinate transformation of the profile coordinate system and sends the coordinates of the position P1, P2 and P6 stored in said position storage section to said coordinate transformation matrix generating section, causes said coordinate transformation matrix generating section to find a profile coordinate system for said side surface B and a start point P7 of a profiling operation on said side surface B on the basis of the positions P1, P2 and P6, and commands said robot controller to move the end of said robot to the position P7, press the end of said robot on said side surface B and switch the profile coordinate system to the profile coordinate system for said side surface B and starts the profile operation on said side surface B when the force detected by said force detecting section becomes equal to the set value.

53. A profile control system according to claim 52, in which said coordinate transformation matrix generating section finds an angle $\Phi$ made by a line connecting the positions P1 and P2 and a line connecting the positions P2 and P6, finds the profile coordinate system for said side surface B by rotating the profile coordinate system set for said side surface A counterclockwise through $\pi - \Phi$ about said unit vector $\vec{a}$, and calculates the sum of the product of the width l of a robot hand in the direction of movement of said robot hand and a unit vector pointing from P6 to P2 and a position vector in the position P2 to obtain the position P7.

54. A profile control system according to claim 52, in which said control command generating section decides that said robot end has arrived at an end point of said side surface A when the force detected by said force detecting section becomes 0 or smaller than a small preset value.

* * * * *